United States Patent
Nowakowska et al.

(10) Patent No.: US 12,495,790 B2
(45) Date of Patent: Dec. 16, 2025

(54) USE OF POLYELECTROLYTES AS CRYOPROTECTANTS AND A METHOD OF CRYOPRESERVATION WITH THEIR USE

(71) Applicant: UNIWERSYTET JAGIELLONSKI, Cracow (PL)

(72) Inventors: Maria Nowakowska, Cracow (PL); Ewa Zuba-Surma, Cracow (PL); Krzysztof Szczubialka, Krzywaczka (PL); Mateusz Zajac, Krosno (PL); Kamil Kaminski, Cracow (PL); Elzbieta Karnas, Cracow (PL); Katarzyna Kmiotek-Wasylewska, Tarnow (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 641 days.

(21) Appl. No.: 17/772,738

(22) PCT Filed: Oct. 31, 2020

(86) PCT No.: PCT/PL2020/050080
§ 371 (c)(1),
(2) Date: Apr. 28, 2022

(87) PCT Pub. No.: WO2021/086211
PCT Pub. Date: May 6, 2021

(65) Prior Publication Data
US 2023/0021326 A1 Jan. 26, 2023

(30) Foreign Application Priority Data
Oct. 31, 2019 (PL) ................................ P.431691

(51) Int. Cl.
*A01N 1/125* (2025.01)

(52) U.S. Cl.
CPC ................................ *A01N 1/125* (2025.01)

(58) Field of Classification Search
CPC ..................... A01N 1/0221; A01N 1/0205
See application file for complete search history.

(56) References Cited

U.S. PATENT DOCUMENTS

2018/0325830 A1* 11/2018 Ganey ................ A61L 27/3608
2020/0054788 A1    2/2020 Temple et al.

FOREIGN PATENT DOCUMENTS

EP          3957713 A1    2/2022
WO     2020/213682 A1    4/2020

OTHER PUBLICATIONS

Chang T, Zhao G. Ice inhibition for cryopreservation: materials, strategies, and challenges. Advanced Science. Mar. 2021;8(6): 2002425. (Year: 2021).*

(Continued)

*Primary Examiner* — Manjunath N Rao
(74) *Attorney, Agent, or Firm* — Arrigo, Lee, Guttman & Mouta-Bellum LLP

(57) ABSTRACT

The subject of the invention is the use of selected polyelectrolytes from the group of synthetic and natural polyelectrolytes for the cryopreservation of human and animal extracellular vesicles. The invention also relates to a method for the cryopreservation of these vesicles, which uses said poly electrolytes.

5 Claims, 38 Drawing Sheets

(56) References Cited

OTHER PUBLICATIONS

Kazemi-Khasragh E, Fernández Blázquez JP, Garoz Gómez D, González C, Haranczyk M. Facilitating polymer property prediction with machine learning and group interaction modelling methods. International Journal of Solids and Structures. Jan. 2024;286-287: 112547. (Year: 2024).*

Eastwood E, Viswanathan S, O'Brien CP, Kumar D, Dadmun MD. Methods to improve the properties of polymer mixtures: optimizing intermolecular interactions and compatibilization. Polymer. May 2005;46(12):3957-70. (Year: 2005).*

Antosiak-Iwanska, M. et al. Cryopreservation of Cells Encapsulated Within Nano-thin Polyelecrolyte Coatings. Recent Developments and Achievements in Biocybernetics and Biomedical Engineering. PCBBE 2017. Advances in Intelligent Systems and Computing, vol. 647. (Year: 2017).*

Nakai K, Ishihara K, Kappl M, Fujii S, Nakamura Y, Yusa S ichi. Polyion complex vesicles with solvated phosphobetaine shells formed from oppositely charged diblock copolymers. Polymers. Feb. 4, 2017;9(2):49. (Year: 2017).*

* cited by examiner

Fig. 10. Analysis of the influence of selected polymers on cell proliferation, cytotoxicity and apoptosis *in vitro*.

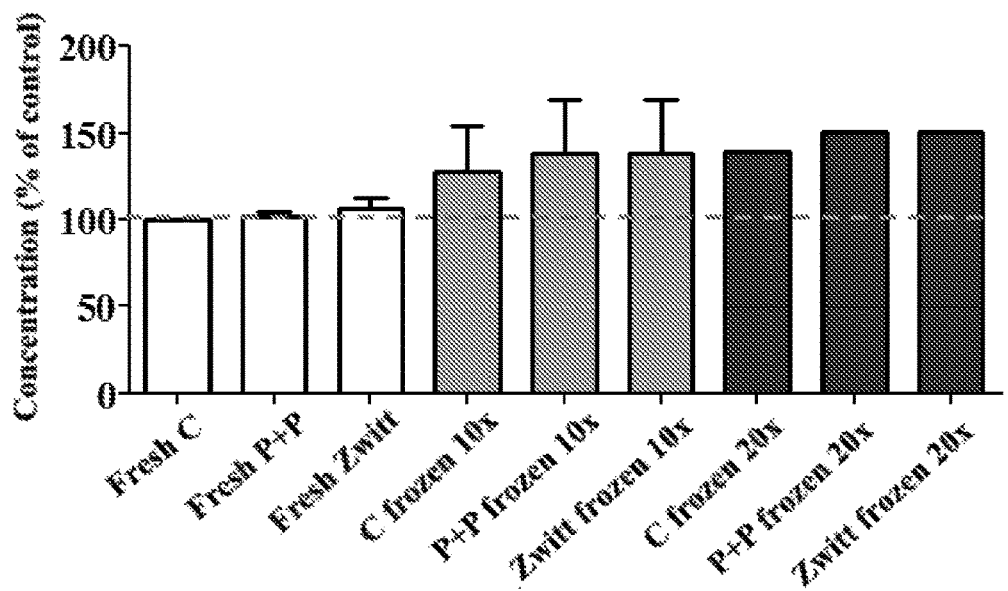
Fig. 13. NTA analysis.
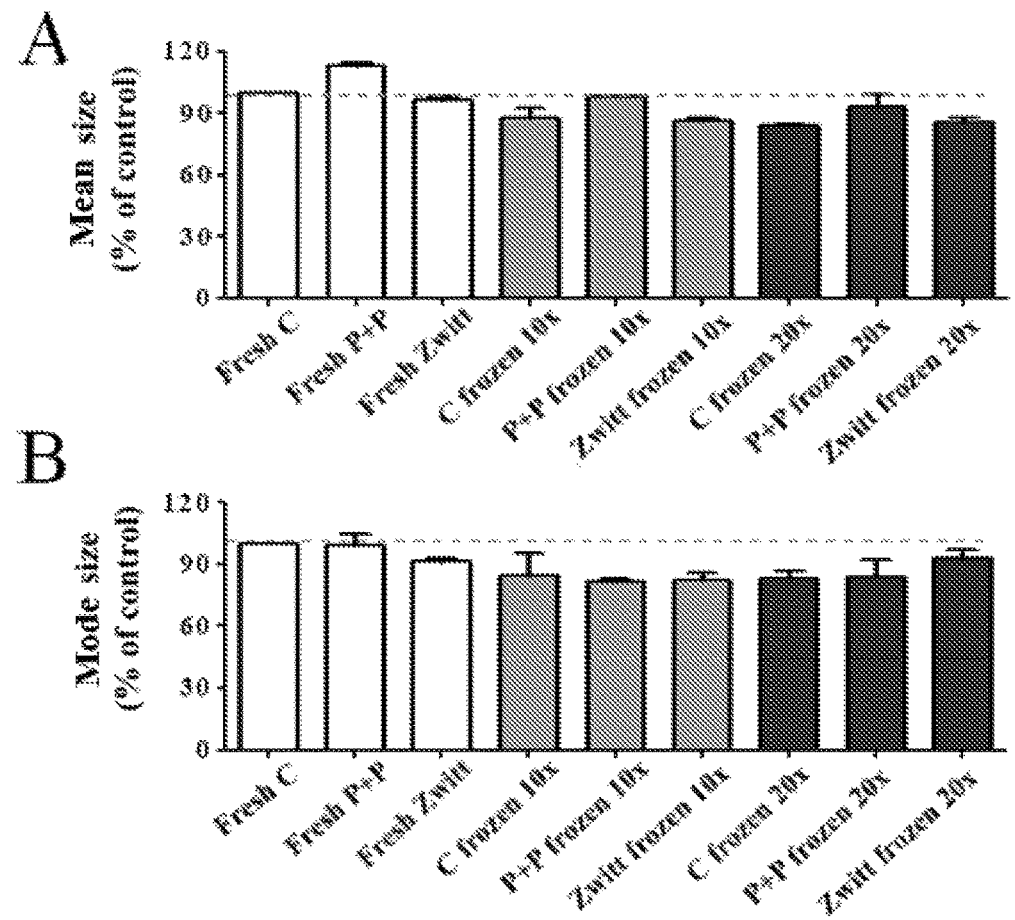
Fig. 14. NTA analysis.

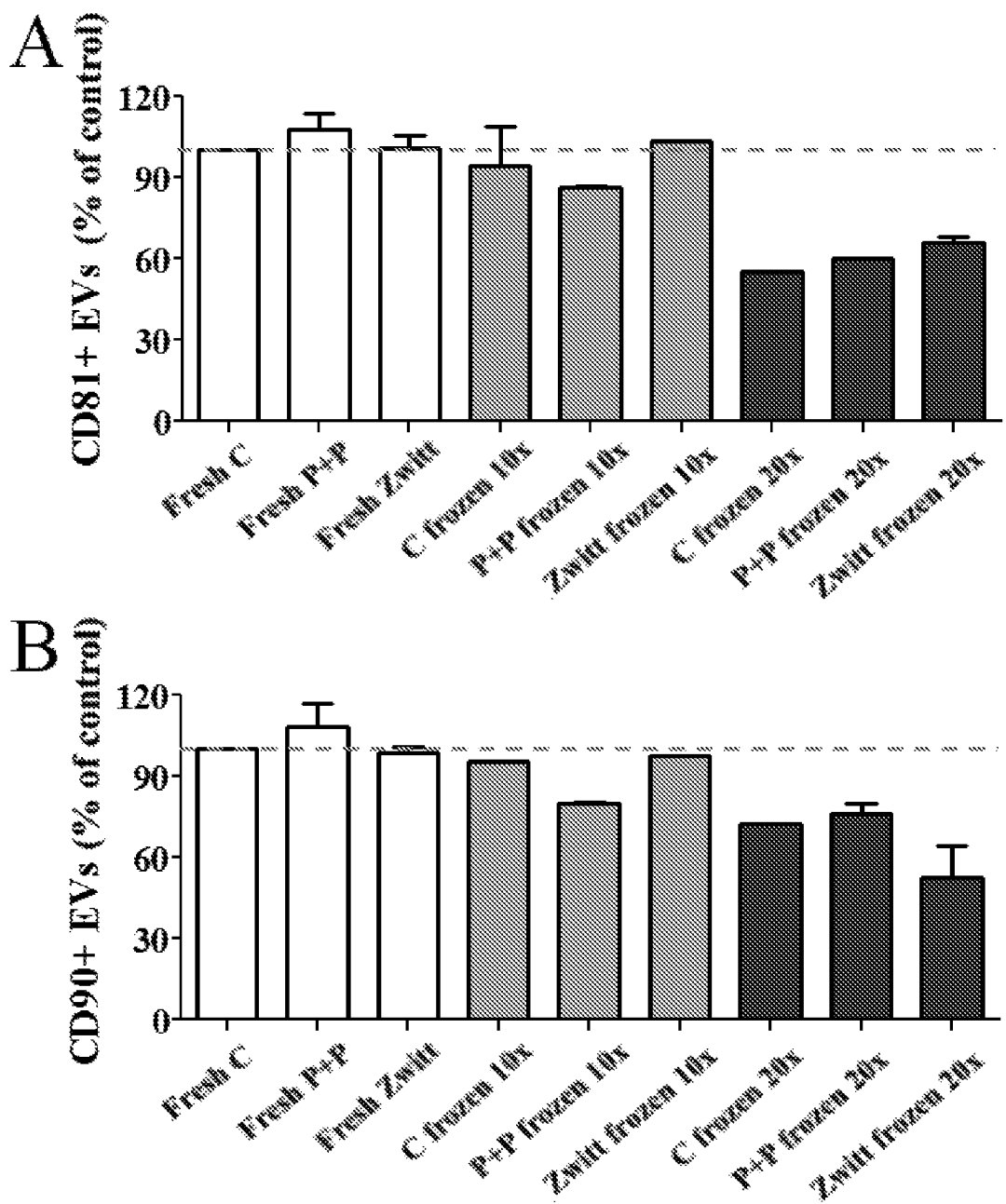
Fig. 17. Cytometric analysis.

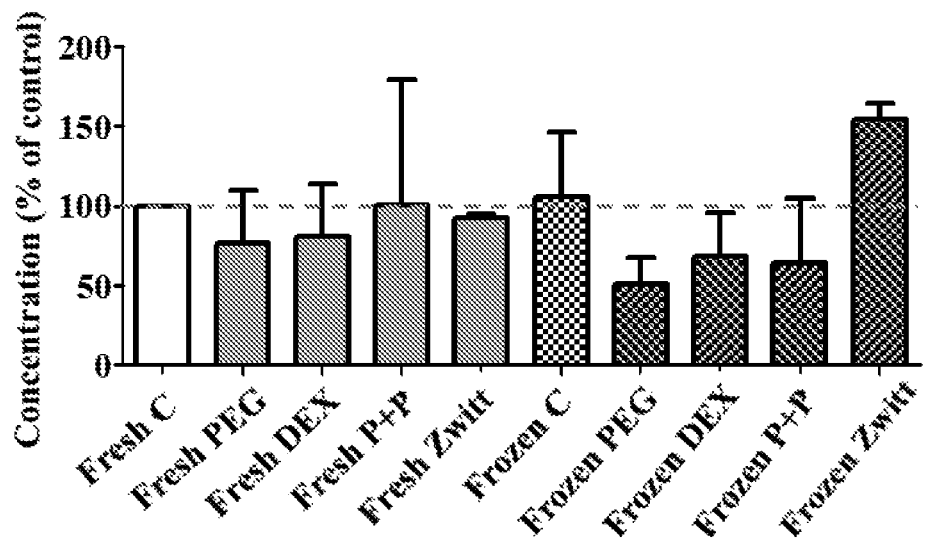
Fig. 18. NTA analysis.
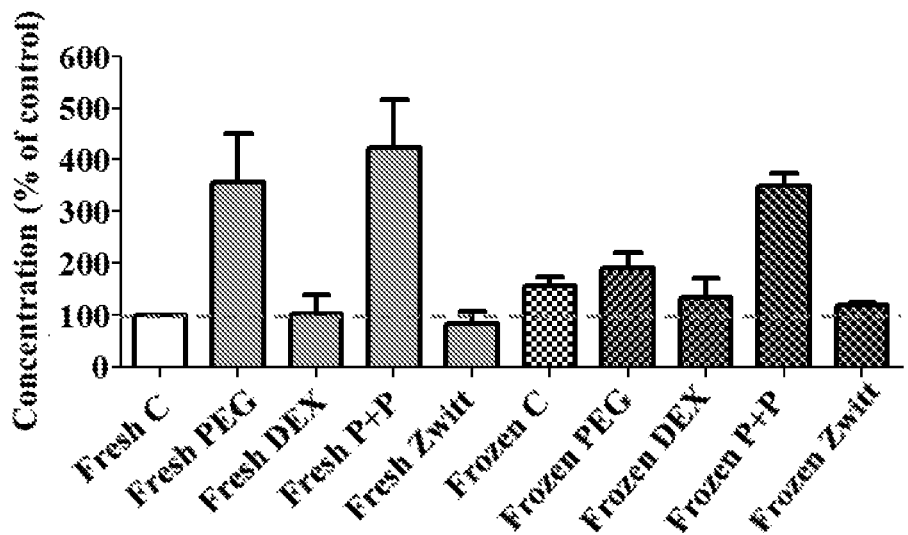
Fig. 19. NTA analysis.
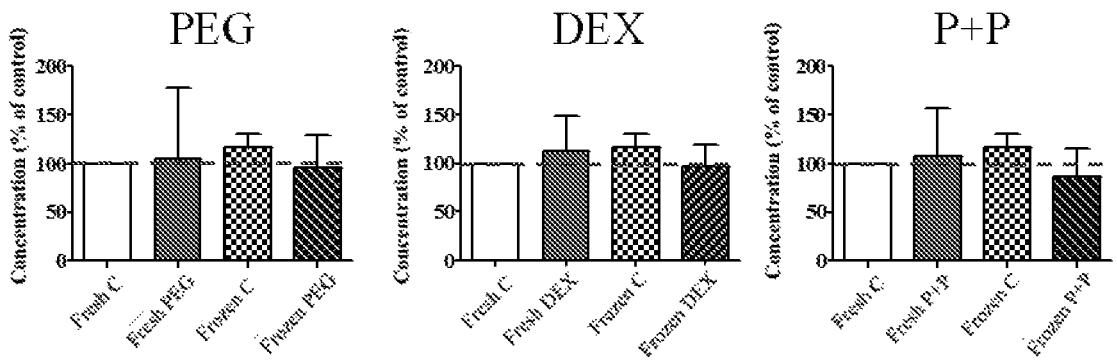
Fig. 20. NTA analysis.

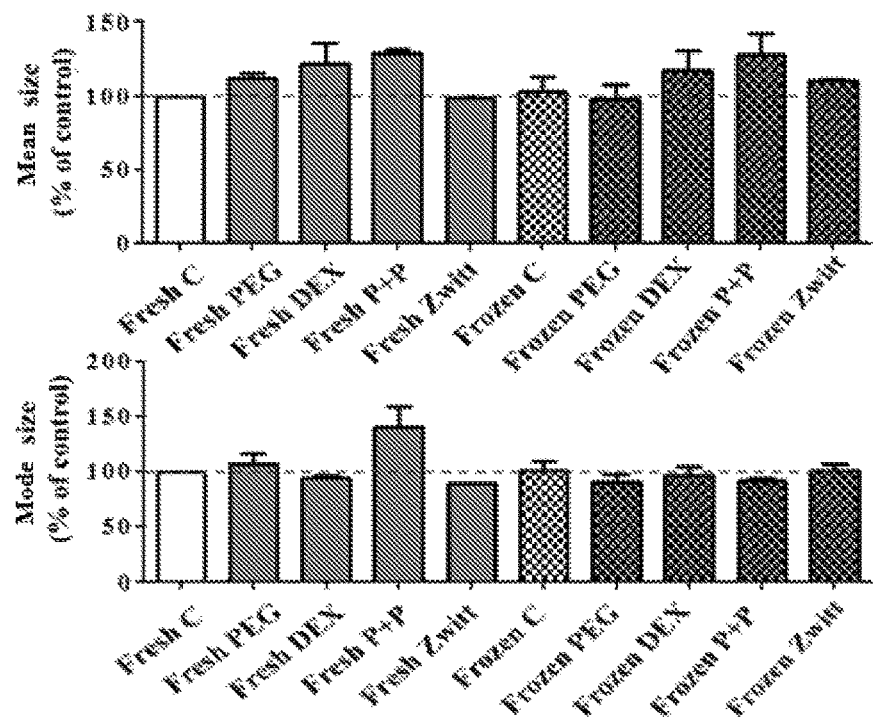
Fig. 21. NTA analysis.
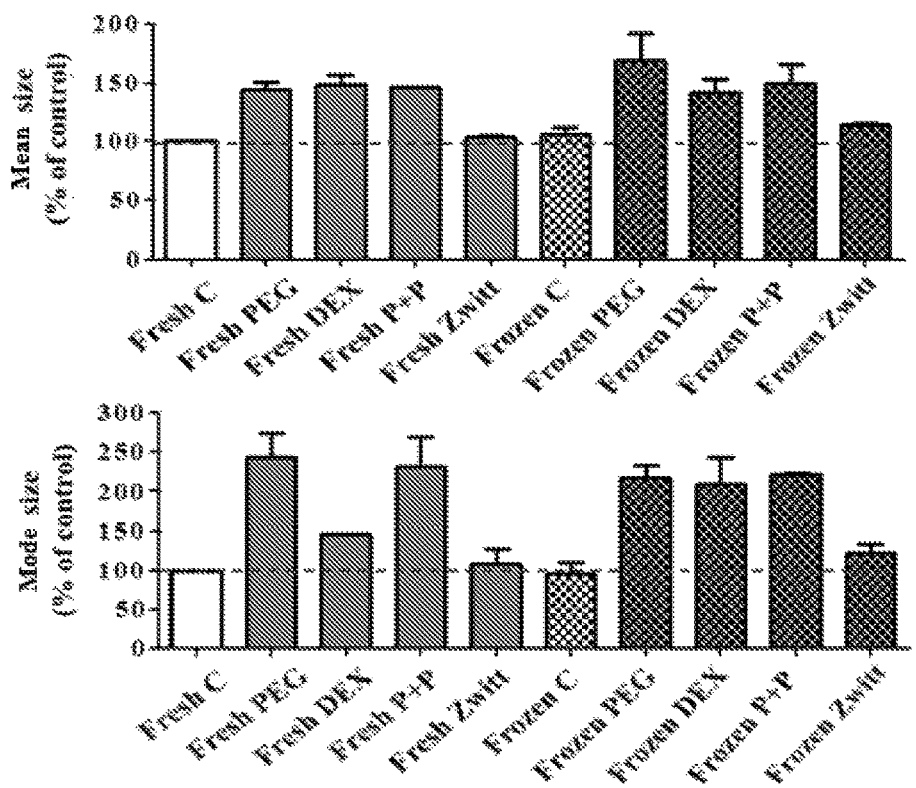
Fig. 22. NTA analysis.

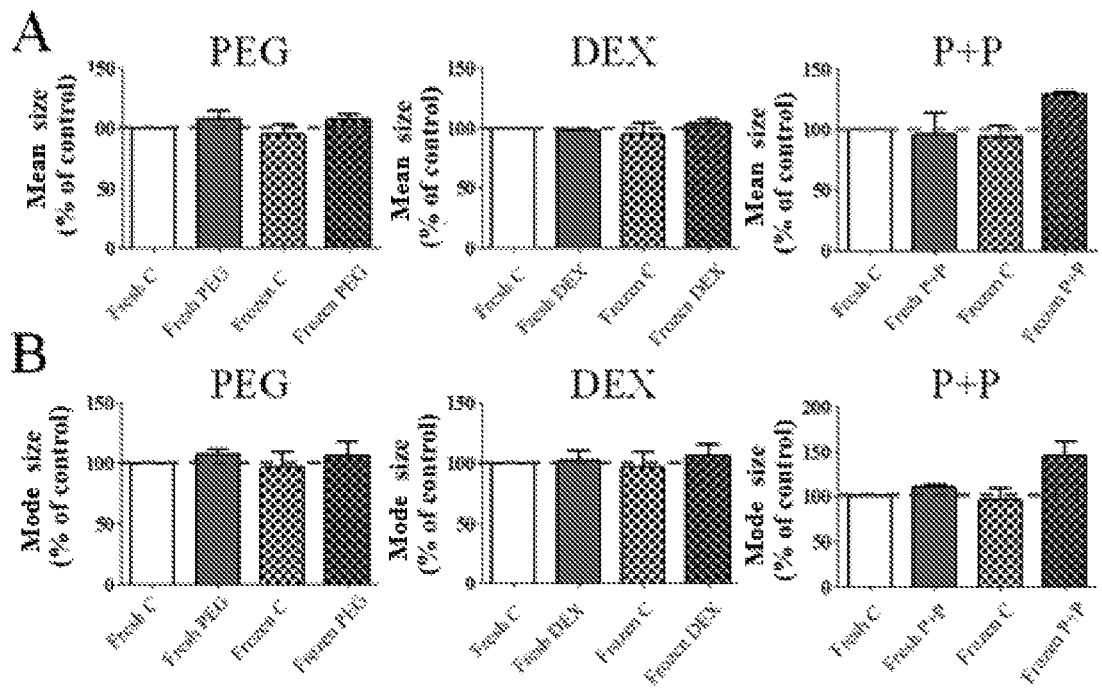
Fig. 23. NTA analysis.
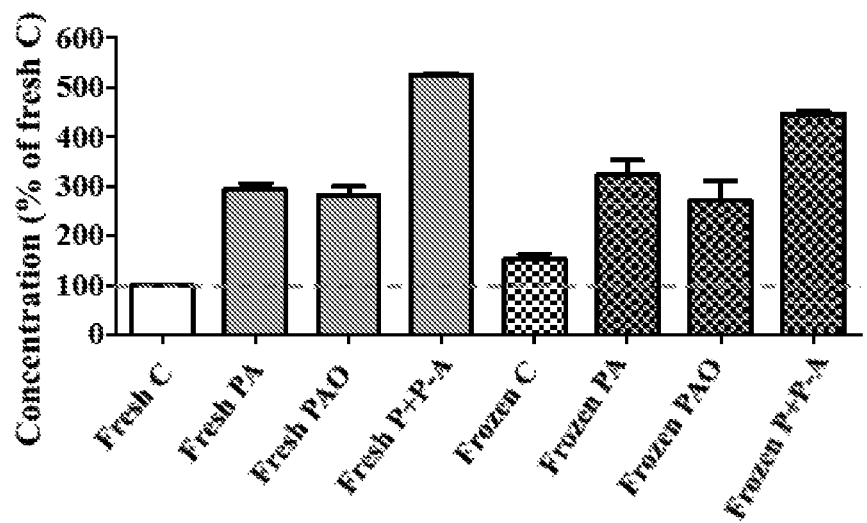
Fig. 24. NTA analysis.

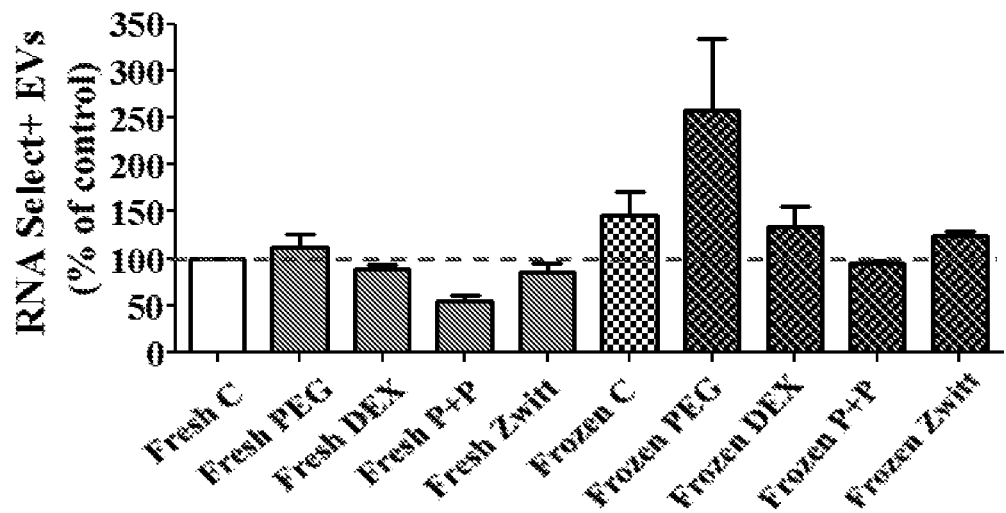
Fig. 27. Cytometric analysis.
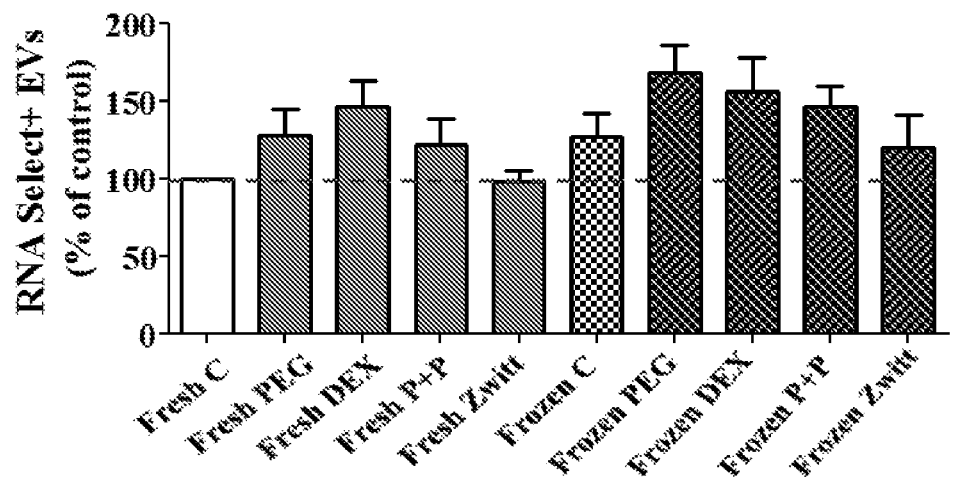
Fig. 28. Cytometric analysis.
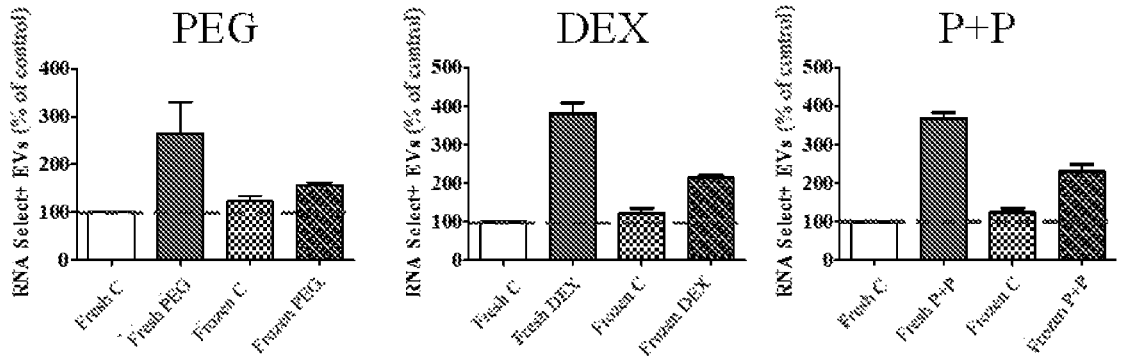
Fig. 29. Cytometric analysis.

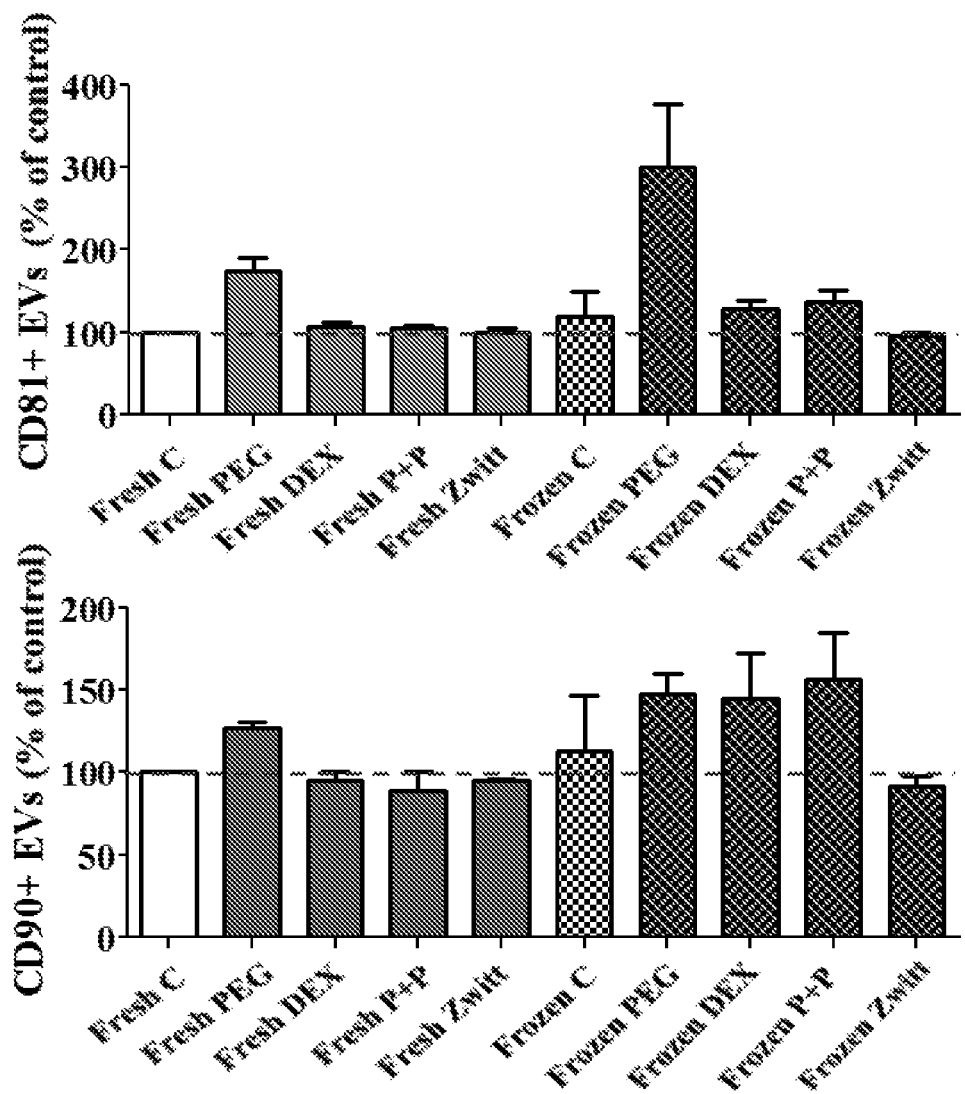
Fig. 30. Cytometric analysis.

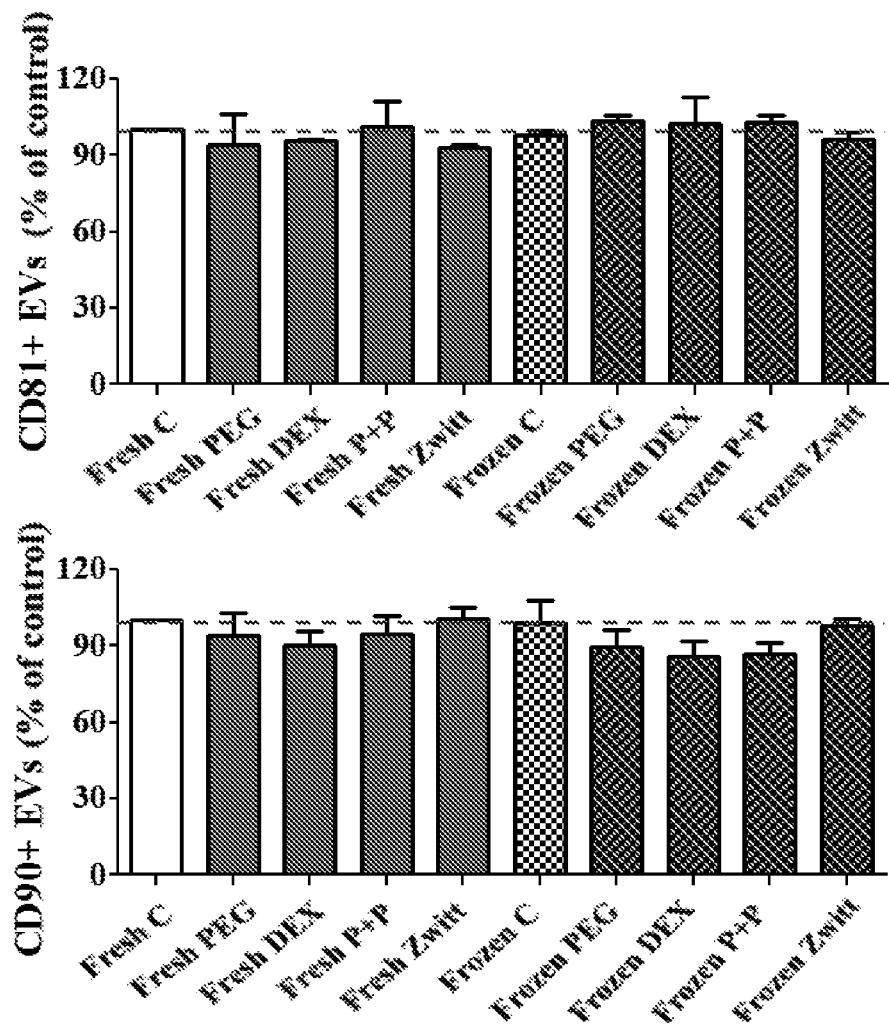
Fig. 31. Cytometric analysis.

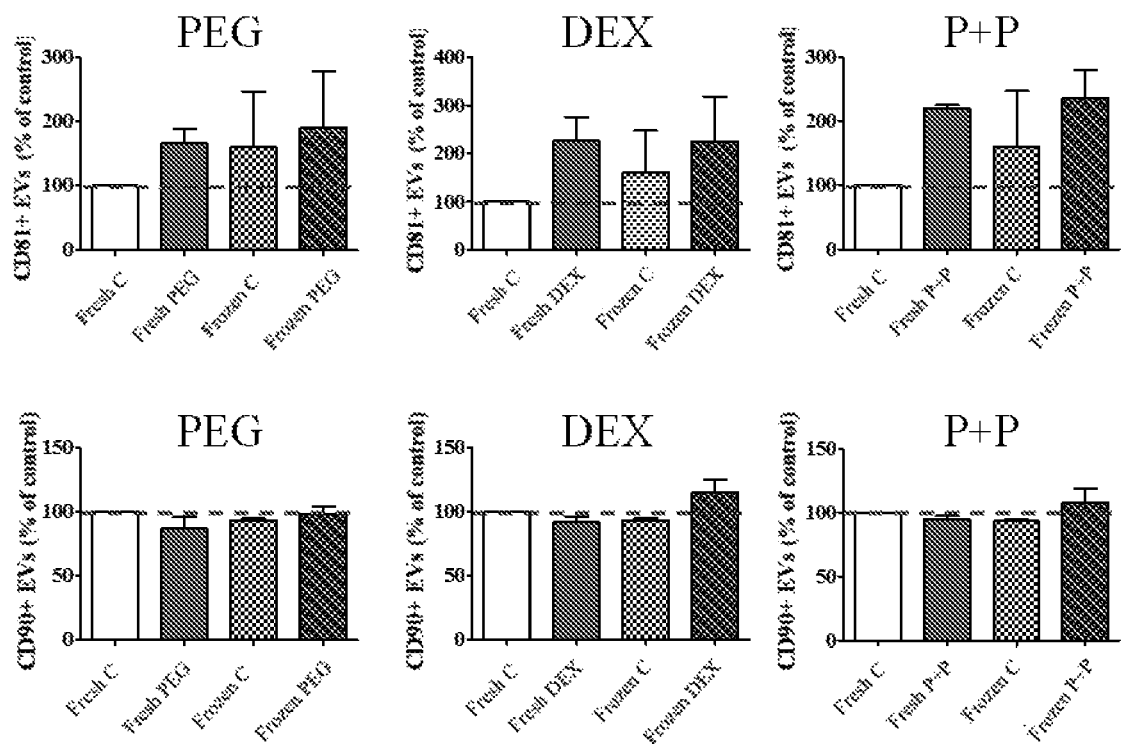
Fig. 32. Cytometric analysis.

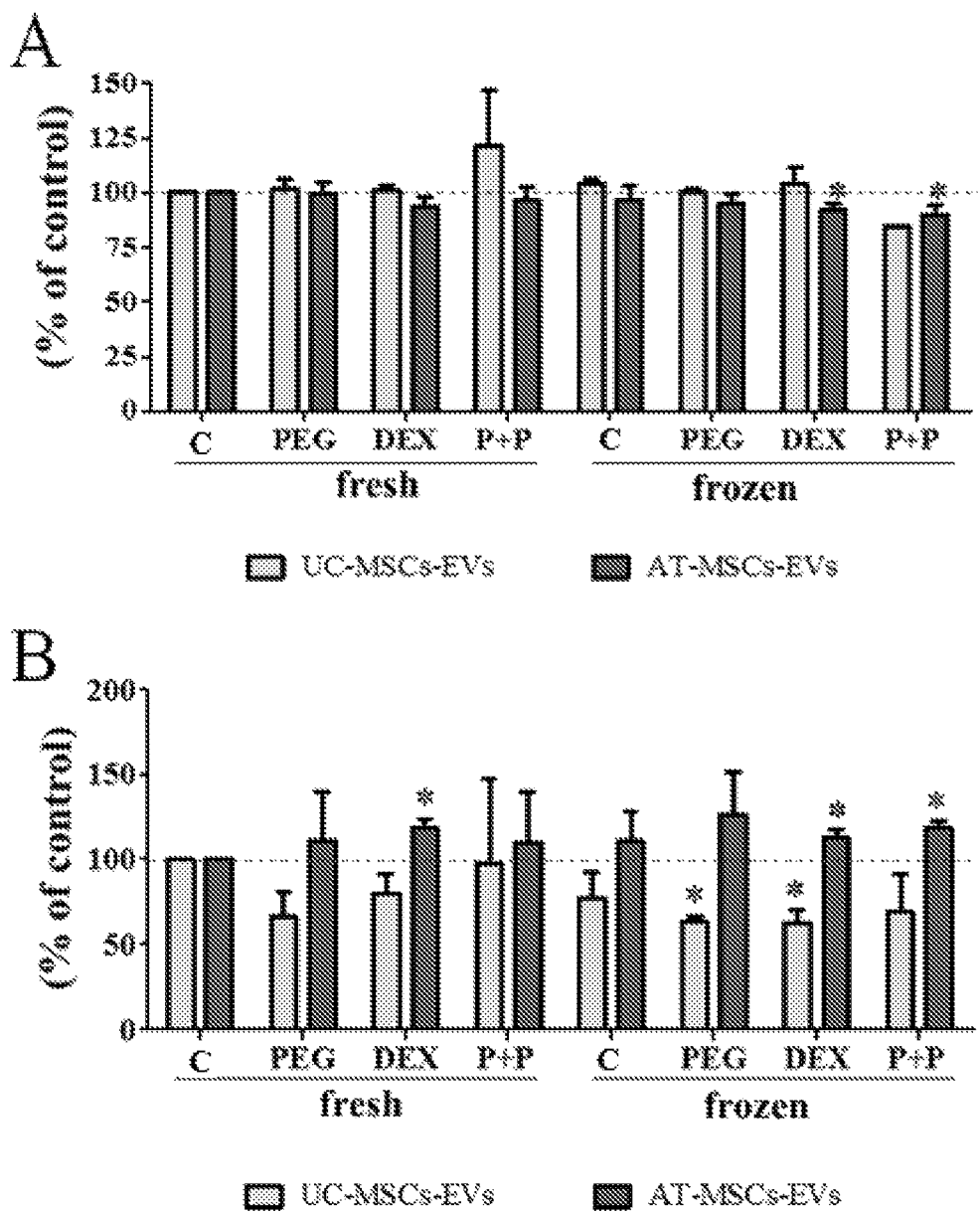
Fig. 33. Measurement of cell proliferation using the Cell Counting Kit 8 A (A) 24 hours; (B) 48 hours after adding EVs.

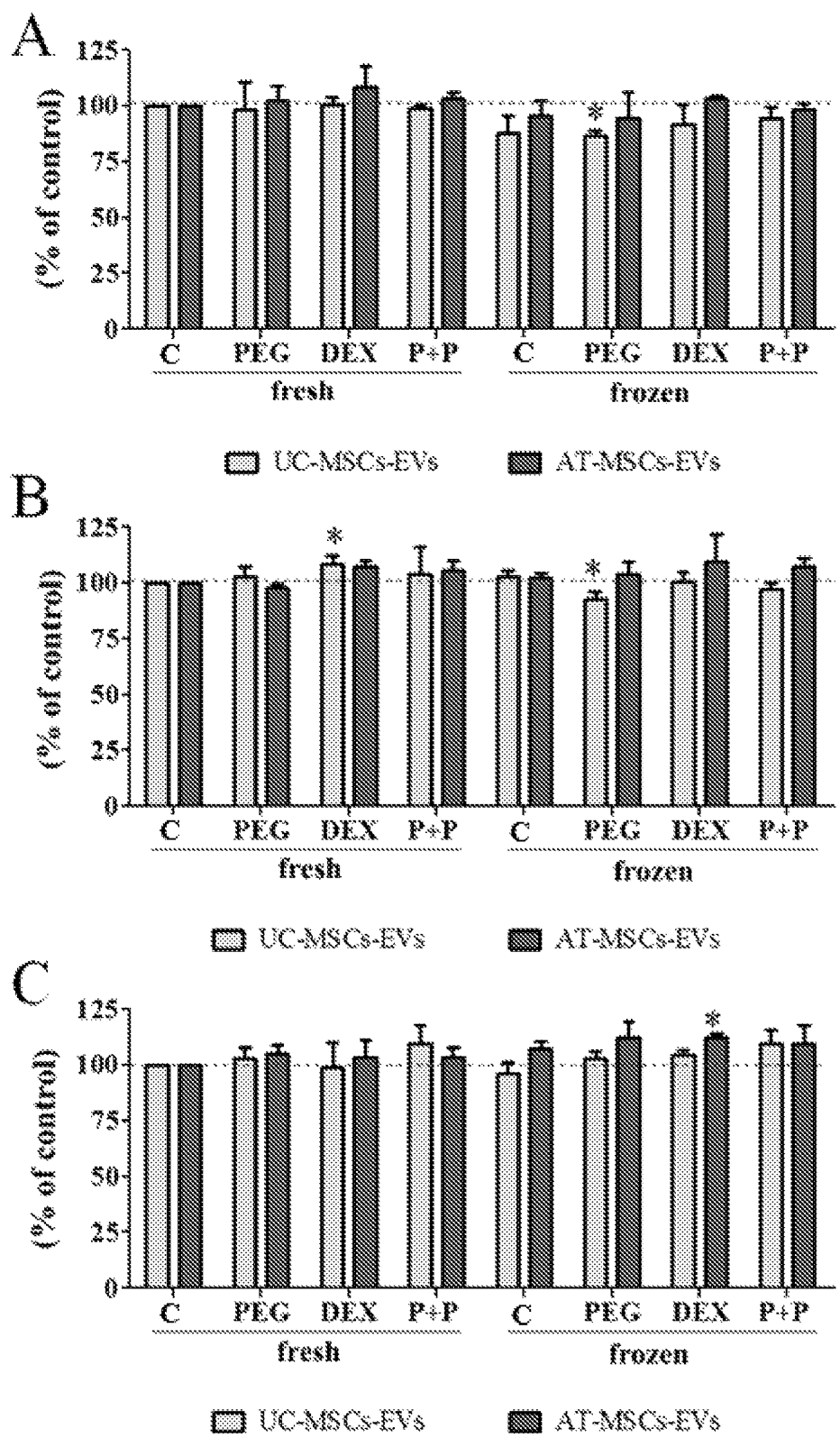
Fig. 34. Measurement of cell viability using Caspase-Glo 3/7 kit (A) 4 hours; (B) 24 hours; (C) 48 hours after adding EVs.

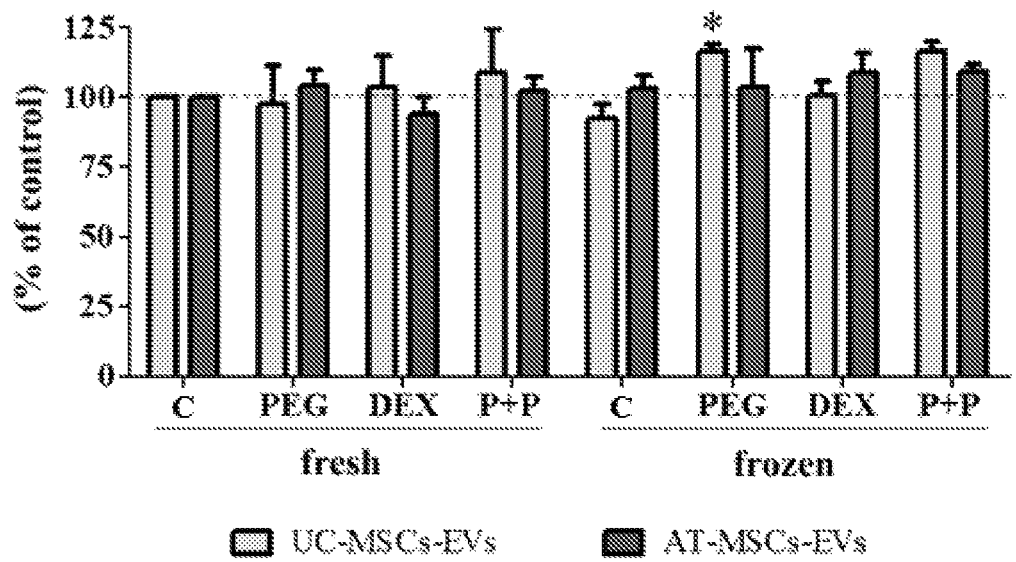
Fig. 35. Measurement of metabolic activity of cells using the ATPLite kit.
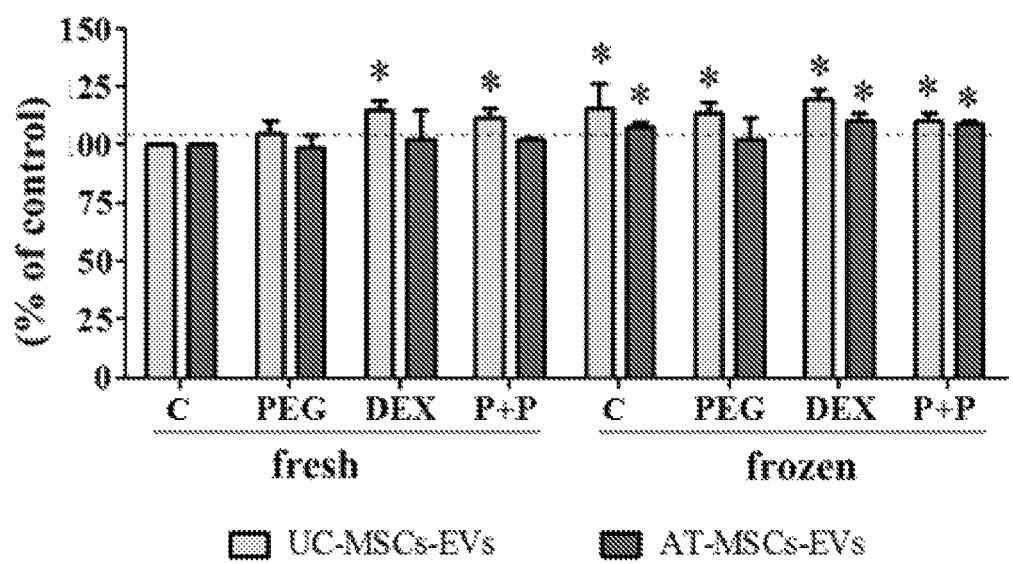
Fig. 36. Cell viability measurement using the Caspase-Glo 3/7 kit 4 hours after the addition of EVs.

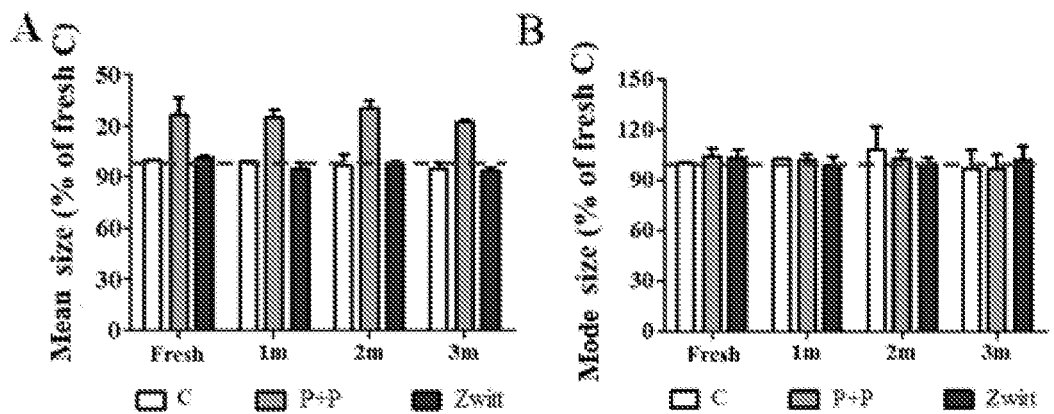
Fig. 37. NTA analysis of the influence of selected polymers on particle size distribution of EVs samples during their long-term storage, for EVs secreted by UC-MSCs cells.
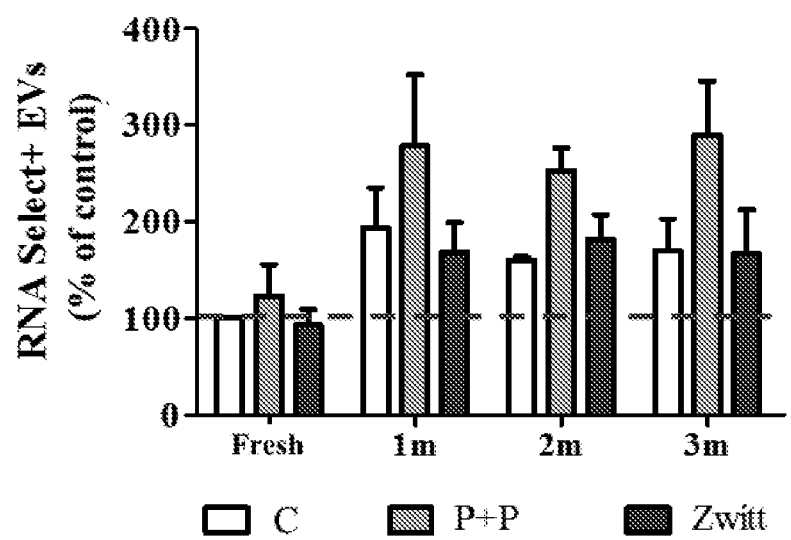
Fig. 38. Cytometric analysis.

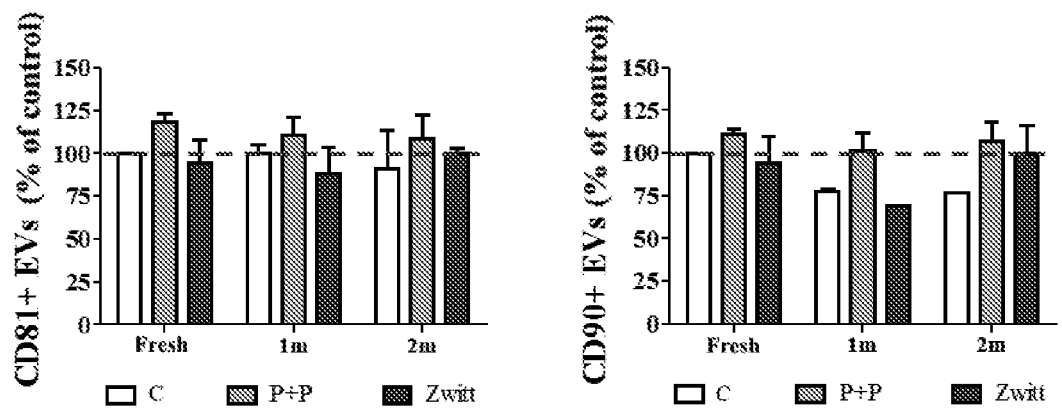
Fig. 39 Cytometric analysis.
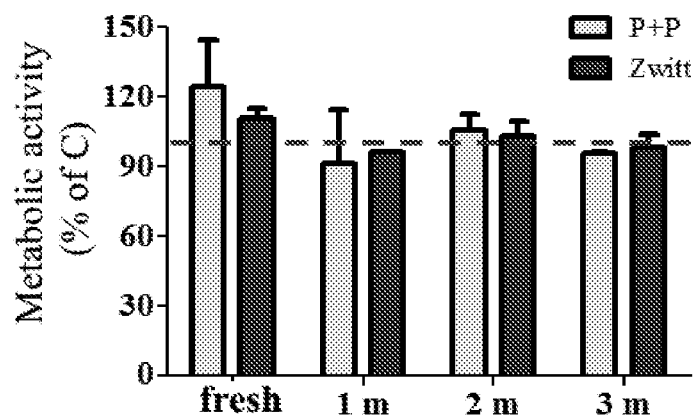
Fig. 40. Analysis of the influence of EVs subjected to long-term cryopreservation with polymers on the metabolic activity of HOB cells *in vitro*.

USE OF POLYELECTROLYTES AS CRYOPROTECTANTS AND A METHOD OF CRYOPRESERVATION WITH THEIR USE

The object of the invention is the use of polyelectrolytes (ionic polymers) as protective substances (cryoprotectants) protecting extracellular vesicles (EVs) secreted by human and animal cells, and a method of cryopreserving said vesicles with the use of polyelectrolytes.

Extracellular vesicles (EVs) are a heterogeneous mixture of vesicular structures containing bioactive substances, surrounded by a lipid bilayer. EVs, as vesicles secreted from the cell surface, are surrounded by a biological membrane with a composition analogous to the composition of the cell membrane of cells secreting them. Importantly, the general composition and surface charge as well as the structure of biological membranes are the same for various types of animal cells, including human ones, being based on a lipid bilayer consisting mainly of phospholipids and proteins with a balanced composition. Consequently, such similarity also exists between the membranes of the EVs secreted by various types of animal cells, including those of human origin. At the same time, the EVs membrane is the part that comes into direct contact with the cryoprotective agent, thus it determines the mutual interaction between the vesicles and the cryoprotectant. Therefore, the similar structure of EVs membranes from animal cells, including human cells, also determines similar activity of these cryoprotectants to vesicles of various origin, and thus the effectiveness of the cryopreservation process.

Due to their size, EVs can be classified as apoptotic bodies (>1000 nm), microvesicles (100-1000 nm) or exosomes (30-150 nm). These structures differ not only in size but also in chemical and biological composition. Importantly, an increasing number of literature reports indicate that bioactive factors present in EVs, including lipids, proteins (e.g. transcription factors, enzymes, receptors, signalling and adhesive molecules), as well as nucleic acids (mRNA, miRNA and other small non-coding RNAs), can be transferred by EVs to target cells, inducing functional changes in them. Thus, EVs enable intercellular communication and play an important role in many cellular processes. Of particular interest are EVs produced by stem cells (SCs), including mesenchymal SCs (MSCs) and induced pluripotent SCs (iPS), as they are an important element of paracrine activity and the ability of these cells to regenerate damaged tissues (1). EVs have been shown to have a therapeutic effect by transmitting biological signals to cells at the site of tissue injury. Therefore, it is expected that the use of EVs will soon enable the development of new cell-free therapies that will minimize the problems associated with immunogenicity, low retention, and possible side effects that may accompany whole cell transplantation. It is expected that EVs will be also used as effective drug carriers, biomarkers as well as components of vaccines (2-6).

While the number of registered clinical trials on EVs is still limited, the current results are very encouraging. In order to enable the development of the therapeutic use of EVs, it is necessary to improve the methods of obtaining of clinical quality formulations containing EVs and, taking into account their unique features, to develop standard procedures that enable their structural integrity and biological activity to be maintained during long-term storage required due to practical reasons (7, 8). Commonly used methods for obtaining EVs are ultracentrifugation, including gradient ultracentrifugation, ultrafiltration and precipitation with polyethylene glycol (PEG). EV storage methods include freeze-drying, spray drying and the most promising method—cryopreservation—which is widely used in the storage of biological specimen. Depending on the needs, the formulations are frozen at temperatures ranging from −1° C. to −20° C. and stored at temperatures ranging from −196° C. to −4° C.

The results of research on cryopreservation of EVs indicate that in this process they undergo unfavourable structural changes, including aggregation and degradation, which reduces their biological activity (9-12).

The main reason for this are the destructive effects of water freezing—the formation of ice crystals and changes in osmotic pressure. To reduce these problems, chemical compounds—so-called cryoprotectants—are used, whose role is to reduce the formation of ice crystals and changes in osmotic pressure, which prevents the decomposition and fusion of EVs and stabilizes the proteins present in them. Cryoprotectants capable of penetrating the lipid bilayer of EVs (internal cryoprotectants) and unable to penetrate it (external cryoprotectants) are used. Penetrating cryoprotectants are low-molecular compounds with a molecular weight not exceeding 100 Da. They penetrate inside the EVs, stabilizing the biomolecules present in them. Non-penetrating cryoprotectants are compounds with molecular weights of about 200-600 Da. They stabilize EVs from the outside, preventing hydroosmotic lysis, increasing the viscosity of the aqueous environment, slowing down the process of ice crystal nucleation and controlling the kinetics of their formation. It has been shown that the best effects are achieved by using both types of cryoprotectants simultaneously and that some of them act both inside and outside of EVs. These include low molecular weight compounds such as glucose, lactose, sucrose, glycerin, cyclodextrin derivatives, propylene glycol and trehalose (13). They interact with the polar groups of phospholipids, disrupt the hydration shell around EVs created with the participation of hydrogen bonds and replace it with an amorphous, glassy protective layer, preventing fusion of EVs and destabilization of proteins. Trehalose has a particularly interesting effect, stabilizing the colloidal suspension of EVs and limiting the formation of ice crystals inside the EVs. Dimethyl sulfoxide (DMSO) is also used, which modifies both the surroundings of EVs and their interiors. However, in vitro studies have shown that DMSO is toxic to cell cultures, therefore, it requires rapid washing from the suspension of EVs immediately after their thawing (14). However, such a procedure for removing DMSO from EVs samples requires their re-ultracentrifugation, which not only significantly extends the time and cost of material preparation, but also may result in destabilization of the content of bioformulations. Additionally, there is a risk that the addition of this factor may generate measurement artefacts, thus affecting the correct interpretation of biological analyses. Some research experiment have been also carried out using other polymers such as PEG, polyvinyl alcohol (PVA), poly(vinylpyrrolidone) (PVP), and gelatin.

However, so far no such polyelectrolytes have been developed, the use of which as cryoprotectants of EVs secreted by human and animal cells would ensure adequate stabilizing effect, structural integrity of EVs and would guarantee the maintenance of the biological activity of EVs and their therapeutic abilities. The main problem was also the selection of cryopreservation conditions, the selection of the cryoprotectant itself and its concentration to ensure the maximum protection of EVs during their freezing and thawing while maintaining their biological properties.

Therefore, the aim of the invention was to develop the use of selected polyelectrolytes as cryoprotectants, which would be effective and biocompatible, and would ensure the possibility of storing EVs samples under defined, reproducible conditions, ensuring structural stabilization and maintaining the biological activity of EVs secreted by human and animal cells.

The object of the invention is therefore the use of polyelectrolytes as cryoprotectants of extracellular vesicles.

Preferably, the extracellular vesicles are secreted by human and/or animal cells.

Further preferably, the polyelectrolyte is one obtained by the modification of a polymer of natural origin and/or a synthetic polyelectrolyte, including a homopolymer, a block copolymer, and/or a graft copolymer.

Further preferably, the polyelectrolyte of natural origin is dextran modified by substitution of the hydroxyl groups with glycidyltrimethylammonium chloride. Preferably, the homopolymer is a synthetic polyelectrolyte and is selected from the group consisting of cationic, anionic and zwitterionic polyelectrolytes.

Preferably, the cationic homopolymer is selected from the group comprising polymers represented by the general formula:

PMAPTACy, where y is a degree of polymerization ranging from 15 to 150.

Preferably, the anionic homopolymer is selected from the group comprising polymers represented by the general formula:

PAMPSx where x is a degree of polymerization ranging from 15 to 150.

Preferably, the zwitterionic homopolymer is selected from the group comprising polymers represented by the general formula PMPCz where z is a degree of polymerization ranging from 10 to 35.

Preferably, the block copolymer is selected from the group comprising the copolymers represented by the general formulas:

PEGx-b-PMAPTACy where x and y are degrees of polymerization ranging from 10 to 45 and from 5 to 102, respectively; and "b" denotes "block"

and/or

PAMPSm-b-PAaUn where m and n are degrees of polymerization ranging from 50 to 100 and from 3 to 50, respectively.

Further preferably, the graft copolymer is selected from PVA-graft-PAPTAC and/or PVA-graft-PAPTAC-Oct.

The invention also includes a method of cryopreservation of extracellular vesicles secreted by human and animal cells, involving the following steps:
a) isolation of extracellular vesicles
b) coating with a layer of polyelectrolytes
c) optionally, coating with a second layer of polyelectrolytes
d) controlled freezing of the vesicles coated in step b) and/or c)

The cryopreservation method is preferably characterized in that in the step b) of coating, the polyelectrolyte is a modified polymer of natural origin and/or a synthetic polyelectrolyte including a cationic homopolymer and/or zwitterionic homopolymer and/or a block copolymer and/or a graft polymer; moreover, preferably optionally in step c) of coating, polyelectrolyte is a synthetic polyelectrolyte selected from the group comprising polymers represented by the general formula: PAMPSx where x is a degreee of polymerization ranging from 15 to 150.

DESCRIPTION OF THE FIGURES

The invention is also shown in Figures, where:

FIG. 13 shows an NTA analysis of the influence of selected polymers on particle concentration in EV samples subjected to multiple freeze-thaw cycles, using the EVs secreted by UC-MSCs cells. The data on the graph (mean±SD; N=2) are presented as % of control (Fresh C sample—uncoated EVs, no freezing). Gray dotted line indicates the level of the control (100%). The names of individual samples refer to the description in Table 7.

FIG. 14 shows an NTA analysis of the influence of selected polymers on the particle size distribution of EVs samples subjected to multiple freeze-thaw cycles using the EVs secreted by UC-MSCs cells. The data on the graph (mean±SD; N=2) are presented as % of control (Fresh C sample—uncoated EVs, no freezing). Gray dotted line indicates the level of the control (100%). The results for two statistical parameters are presented, including the mean size (A) and the size mode (the value with the highest probability of occurrence; B). The names of individual samples refer to the description in Table 7.

FIG. 17 shows a cytometric analysis of the influence of selected polymers on the phenotype of particles in cryopreserved EVs samples subjected to multiple freeze-thaw cycles, using EVs secreted by UC-MSCs cells. Samples were subjected to immunofluorescence staining with antibodies directed against selected surface antigens typical of EVs (CD81; A) and mesenchymal cells (CD90; B). Cumulative results of the analysis of the percentage of antigen positive particles in each type of sample are given. The data on the graphs (mean±SD; N=2) are presented as % of control (Fresh C sample—uncoated EVs, no freezing). Gray dotted line indicates the level of the control (100%). The names of individual samples refer to the description in Table 7.

FIG. 18 shows an NTA analysis of the influence of selected polymers on the particle concentration in the samples of EVs secreted by human cells, exemplified by EVs secreted by UC-MSCs cells. The data on the graph (mean±SD; N=2) are presented as % of control (Fresh C sample—uncoated EVs, no freezing). Gray dotted line indicates the level of the control (100%). The names of individual samples refer to the description in Table 9.

FIG. 19 shows the NTA analysis of the influence of selected polymers on the particle concentration in the samples of EVs secreted by human cells, exemplified by EVs secreted by human iPS cells (hiPS). The data on the graph (mean±SD; N=2) are presented as % of control (Fresh C sample—uncoated EVs, no freezing). Gray dotted line indicates the level of the control (100%). The names of individual samples refer to the description in Table 9.

FIG. 20 shows an NTA analysis of the influence of selected polymers on the concentration of particles in the samples of EVs secreted by animal cells, using rat bone marrow MSCs (rBM-MSCs) as an example. The data on the graph (mean±SD; N=2) are presented as % of control (Fresh C sample—uncoated EVs, no freezing). Gray dotted line indicates the level of the control (100%). The names of individual samples refer to the description in Table 9.

FIG. 21 shows an NTA analysis of the influence of selected polymers on particle size distribution in the samples of EVs secreted by human cells, using UC-MSCs as an example. The data on the graphs (mean±SD; N=2) are presented as % of control (Fresh C sample—uncoated EVs, no freezing). Gray dotted line indicates the level of the control (100%). The results for two statistical parameters are presented, including the mean size (A) and the size mode (the value with the highest probability of occurrence; B). The names of individual samples refer to the description in Table 9.

FIG. 22 shows an NTA analysis of the influence of selected polymers on particle size distribution in the samples of EVs secreted by human cells, using hiPS cells as an example. The data on the graphs (mean±SD; N=2) are presented as % of control (Fresh C sample—uncoated EVs, no freezing). Gray dotted line indicates the level of the control (100%). The results for two statistical parameters are presented, including the mean size (A) and the size mode (the value with the highest probability of occurrence; B). The names of individual samples refer to the description in Table 9.

FIG. 23 shows an NTA analysis of the influence of selected polymers on particle size distribution in the samples of EVs secreted by animal cells, using rBM-MSCs as an example. The data on the graphs (mean±SD; N=2) are presented as % of control (Fresh C sample—uncoated EVs, no freezing). Gray dotted line indicates the level of the control (100%). The results for two statistical parameters are presented, including the mean size (A) and the size mode (the values with the highest probability of occurrence; B). The names of individual samples refer to the description in Table 9.

FIG. 24 shows the NTA analysis of the influence of selected polymers on the particle concentration in the samples of EVs secreted by human cells exemplified by EVs secreted by hiPS cells. The data on the graph (mean±SD) are presented as % of control (Fresh C sample—uncoated EVs, no freezing). Gray dotted line indicates the level of the control (100%). The names of individual samples refer to the description in Table 9.

FIG. 27 shows a cytometric analysis of the influence of selected polymers on particle integrity in cryopreserved samples of EVs secreted by human cells, exemplified by EVs secreted by UC-MSCs cells. The samples were subjected to immunofluorescence staining with RNA SELECT dye as an indicator of EVs integrity. Cumulative results of the analysis of the percentage of RNA SELECT-positive particles in each type of sample are given. The data on the graph (mean±SD; N=2) are presented as % of control (Fresh C sample—uncoated EVs, no freezing). Gray dotted line indicates the level of the control (100%). The names of individual samples refer to the description in Table 9.

FIG. 28 shows a cytometric analysis of the influence of selected polymers on particle integrity in cryopreserved samples of EVs secreted by human cells, exemplified by EVs secreted by hiPS cells. The samples were subjected to immunofluorescence staining with RNA SELECT dye as an indicator of EVs integrity. Cumulative results of the analysis of the percentage of RNA SELECT-positive particles in each type of sample are given. The data on the graph (mean±SD; N=2) are presented as % of control (Fresh C sample—uncoated EVs, no freezing). Gray dotted line indicates the level of the control (100%). The names of individual samples refer to the description in Table 9.

FIG. 29 shows a cytometric analysis of the influence of selected polymers on particle integrity in cryopreserved samples of EVs secreted by animal cells, exemplified by EVs secreted by rBM-MSCs cells. The samples were subjected to immunofluorescence staining with RNA SELECT dye as an indicator of EVs integrity. Cumulative results of the analysis of the percentage of RNA SELECT-positive particles in each type of sample are given. The data on the graph (mean±SD; N=2) are presented as % of control (Fresh C sample—uncoated EVs, no freezing). Gray dotted line indicates the level of the control (100%). The names of individual samples refer to the description in Table 9.

FIG. 30 shows a cytometric analysis of the influence of selected polymers on the phenotype of particles in cryopreserved samples of EVs secreted by human cells, exemplified by EVs secreted by UC-MSCs cells. The samples were subjected to immunofluorescence staining with antibodies directed against selected surface antigens typical of EVs (CD81) and mesenchymal cells (CD90). Cumulative results of the analysis of the percentage of antigen-positive particles in each type of sample are given. The data on the graphs (mean±SD; N=2) are presented as % of control (Fresh C sample—uncoated EVs, no freezing). Gray dotted line indicates the level of the control (100%). The names of individual samples refer to the description in Table 9.

FIG. 31 shows a cytometric analysis of the influence of selected polymers on the phenotype of particles in cryopreserved samples of EVs secreted by human cells, exemplified by EVs secreted by hiPS cells. The samples were subjected to immunofluorescence staining with antibodies directed against selected surface antigens typical of EVs (CD81) and mesenchymal cells (CD90). Cumulative results of the analysis of the percentage of antigen-positive particles in each type of sample. The data on the graphs (mean±SD; N=2) are presented as % of control (Fresh C sample—uncoated EVs, no freezing). Gray dotted line indicates the level of the control (100%). The names of individual samples refer to the description in Table 9.

FIG. 32 shows a cytometric analysis of the influence of selected polymers on the phenotype of particles in cryopreserved samples of EVs secreted from animal cells, exemplified by EVs secreted by rBM-MSCs cells. The samples were subjected to immunofluorescence staining with antibodies directed against selected surface antigens typical for EVs (CD81) and mesenchymal cells (CD90). Cumulative results of the analysis of the percentage of antigen positive particles in each type of sample are given. The data on the graphs (mean±SD; N=2) are presented as % of control (Fresh C sample—uncoated EVs, no freezing). Gray dotted line indicates the level of the control (100%). The names of individual samples refer to the description in Table 9.

FIG. 33 shows an analysis of the influence of EVs cryopreserved with polymers on the proliferation of HOB cells in vitro. EVs isolated from UC-MSCs and adipose tissue-derived MSCs (AT-MSCs) were coated with selected polymers immediately after their isolation from conditioned medium (samples marked as fresh) and frozen at −80° C. (samples marked as frozen). Fresh uncoated EVs (fresh C) served as a control. EVs were then added to the HOB cell culture at a dose of $1\times10^9$ EVs per 2000 cells. After 24 (A) and 48 (B) hours following the addition of EVs, cell proliferation was measured using the CELL COUNTING KIT 8. Data on the graph (mean±SD; N=3) are shown as % of control. Gray dotted line indicates the level of the control (100%) *P<0.05 versus fresh C.

FIG. 34 shows an analysis of the influence of EVs cryopreserved with polymers on the viability of HOB cells in vitro. EVs isolated from UC-MSCs and AT-MSCs cells were coated with selected polymers immediately after their isolation from conditioned medium (samples marked as fresh) and frozen at −80° C. (samples marked as frozen). Fresh uncoated EVs (fresh C) served as a control. The EVs were then added to the HOB cell culture at a dose of $1\times10^9$ EVs per 2000 cells. 4 (A), 24 (B) and 48 hours (C) following the addition of Evs. Cell viability measurement was performed using the CASPASE-GLO 3/7 kit. The data in the graphs (mean±SD; N=3) are shown as % of control. Gray dotted line indicates the level of the control (100%). *P<0.05 versus fresh C.

FIG. 35 shows an analysis of the influence of EVs cryopreserved with polymers on the metabolic activity of HOB cells in vitro. EVs isolated from UC-MSCs and AT-MSCs cells were coated with selected polymers immediately after their isolation from conditioned medium (samples marked as fresh) and frozen at 80° C. (samples marked as frozen). Fresh uncoated EVs (fresh C) served as a control. The EVs were then added to the HOB cell culture at a dose of $1\times10^9$ EVs per 2000 cells. 4 hours after the addition of EVs, the metabolic activity of the cells was measured using the ATPLITE kit, based on the concentration of ATP produced by them. The data in the graphs (mean±SD; N=3) are shown as % of control. Gray dotted line indicates the level of the control (100%). *P<0.05 versus fresh C.

FIG. 36 shows an analysis of the influence of cryopreservation using polymers on the cytoprotective activity of EVs in vitro. EVs isolated from UC-MSCs and AT-MSCs cells were coated with selected polymers immediately after their isolation from conditioned medium (samples marked as fresh) and frozen at −80° C. (samples marked as frozen). Fresh uncoated EVs (fresh C) served as a control. The EVs were then added to the HOB cell culture at a dose of $1\times10^9$ EVs per 2000 cells. 4 hours before the addition of EVs, cells were treated with staurosporine as an inducer of apoptosis. 4 hours after the addition of EVs, cell viability was measured using the CASPASE-GLO 3/7 kit. The data on the graph (mean±SD; N=3) are shown as % of control. Gray dotted line indicates the level of the control (100%). *P<0.05 versus fresh K.

FIG. 37 shows an NTA analysis of the influence of selected polymers on the particle size distribution of EV samples during their long-term storage, using the EVs secreted by UC-MSCs cells as an example. The analysis was carried out on EVs immediately after their isolation (fresh) and at monthly intervals during their freezing. The data on the graphs (mean±SD; N=2) are presented as % of control (Fresh C sample—uncoated EVs, no freezing). Gray dotted line indicates the level of the control (100%). The results for two statistical parameters are presented, including the mean size (A) and the size mode (the value with the highest probability of occurrence; B). The names of the individual samples refer to the description in Table 10.

FIG. 38 shows a cytometric analysis of the influence of selected polymers on the particle integrity of EVs samples during long-term storage, using the EVs secreted by UC-MSCs cells as an example. The samples were subjected to immunofluorescence staining with RNA SELECT dye as an indicator of EVs integrity. Cumulative results of the analysis of the percentage of RNA SELECT-positive particles in each type of sample are given. The data in the graphs (mean±SD; N=2) are presented as % of control (Fresh C sample—uncoated EVs, no freezing). Gray dotted line indicates the level of the control (100%). The names of individual samples refer to the description in Table 10.

FIG. 39 shows a cytometric analysis of the influence of selected polymers on the phenotype of particles in EVs samples during their long-term storage, using the EVs secreted by UC-MSCs cells as an example. The samples were subjected to immunofluorescence staining with antibodies directed against selected surface antigens typical for EVs (CD81) and mesenchymal cells (CD90). Cumulative results of the analysis of the percentage of antigen positive particles in each type of sample are given. The data on the graphs (mean±SD; N=2) are presented as % of control (Fresh C sample—uncoated EVs, no freezing). Gray dotted line indicates the level of the control (100%). The names of individual samples refer to the description in Table 10.

FIG. 40 shows an analysis of the influence of EVs subjected to long-term cryopreservation with polymers on the metabolic activity of HOB cells in vitro. EVs from UC-MSCs cells were coated with selected polymers immediately after their isolation (samples marked as fresh) and subjected to long-term freezing at −80° C. Subsequently, both the non-frozen (fresh) samples and the monthly intervals during freezing EVs were added to the culture of HOB cells at a dose of $1 \times 10^9$ EVs per 2000. cells. 4 hours after the addition of EVs, the metabolic activity of the cells was measured from the concentration of ATP produced by them using the ATPLITE kit. The data in the graphs (mean±SD; N=2) are presented as % of control (Fresh C sample—uncoated EVs, no freezing). Gray dotted line indicates the level of the control (100%). The names of individual samples refer to the description in Table 10.

EMBODIMENTS

Figure 1:
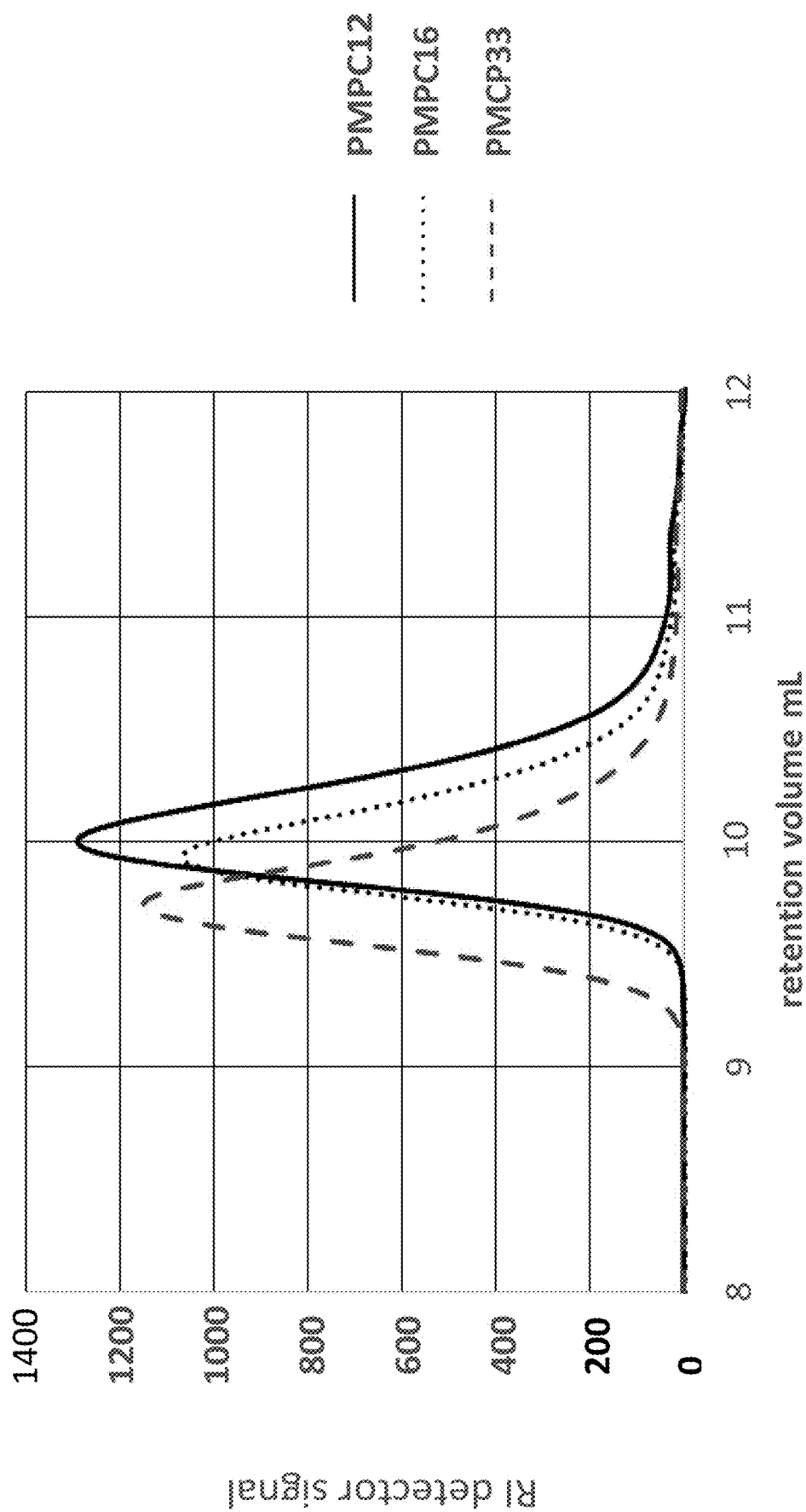
FIG. 1 shows the GPC chromatograms of the tested PMPCz polymers obtained by RAFT controlled polymerization.

In order to obtain polymers for use in cryopreservation, a number of experiments aimed at controlled synthesis and characterization of polymers were performed, and compounds with optimal cryoprotective properties towards EVs samples were selected. The analysis of the obtained data clearly indicates that the variants of polymers were obtained capable of protecting the integrity of EVs during their storage, while maintaining their biological functions. The results showing the effectiveness of the tested polymers as EVs cryoprotectants are presented below.

The subject of the invention is illustrated in more detail in the non-limiting embodiments.

Example 1

Synthesis of Cationically Modified Dextran.

The cationic dextran derivative with an average molecular weight of 40 kDa was modified by substituting the hydroxyl groups with glycidyltrimethylammonium chloride (GTMAC) according to the procedure shown below. Thus, 2 g of dextran was dissolved in 100 mL of distilled water and 10 mmol of NaOH was added. The solution was heated to 60° C. while mixing with a magnetic stirrer. Then, 12 mL of GTMAC was added and heated with stirring for 4 h. The reaction mixture was cooled and transferred to a dialysis tube with MWCO of 14 kDa. Dialysis was carried out against water. The purified polymer, denoted DEX, with a substitution degree (DS) of 22.4% was isolated by freeze-drying.

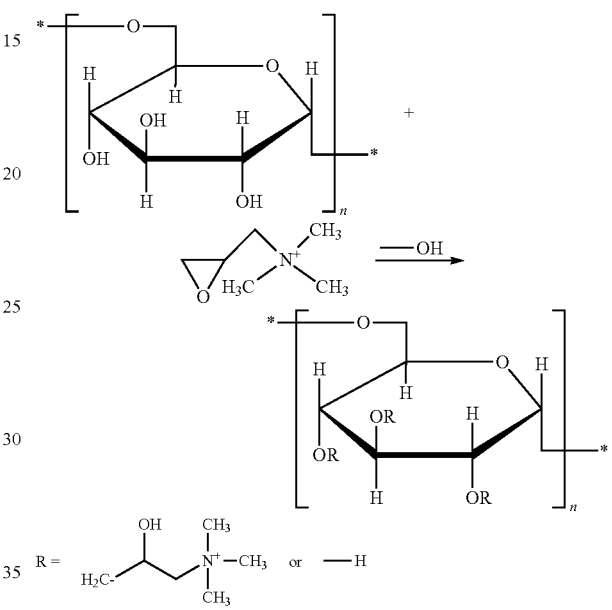

Example 2

Synthesis of anionic homopolymers—polyAMPS (PAMPSx) in the process of controlled radical polymerization by reversible addition-fragmentation chain transfer polymerization (RAFT).

A series of PAMPSx homopolymers (where x–the degree of polymerization) was obtained by the RAFT method and then characterized.

an Exemplary Description of the PAMPS142 Homopolymer Synthesis

AMPS (2-acrylamido-2-methyl-1-propanesulfonic acid) (5.00 g, 24.1 mmol) was neutralized with 6M NaOH (5.8 mL) to a pH of 6.03. V-501 (18.0 mg, 0.0643 mmol) and CPD (4-cyano-4-(phenylcarbonothioylthio)pentanoic acid) (44.9 mg, 0.161 mmol) were dissolved in a mixture of 2 mL of MeOH and 16 mL of water, and then added to the aqueous AMPS solution. The solution was degassed by purging argon for 30 min. Polymerization was carried out at 70° C. for 15 h. The conversion of AMPS as determined by $^1$H NMR was 96.0%. The reaction mixture was dialyzed against pure water for one day. PAMPS142 was isolated by freeze-drying (4.88 g, 96.7%). The number average molecular weight ($M_n$(NMR)), the degree of polymerization (DP) determined by $^1$H NMR and the dispersion index (Mw/Mn) determined by gel permeation chromatography (GPC) were $2.97 \times 10^4$, 142 and 1.24, respectively. The remaining PAMPSx homopolymers were prepared in an analogous manner.

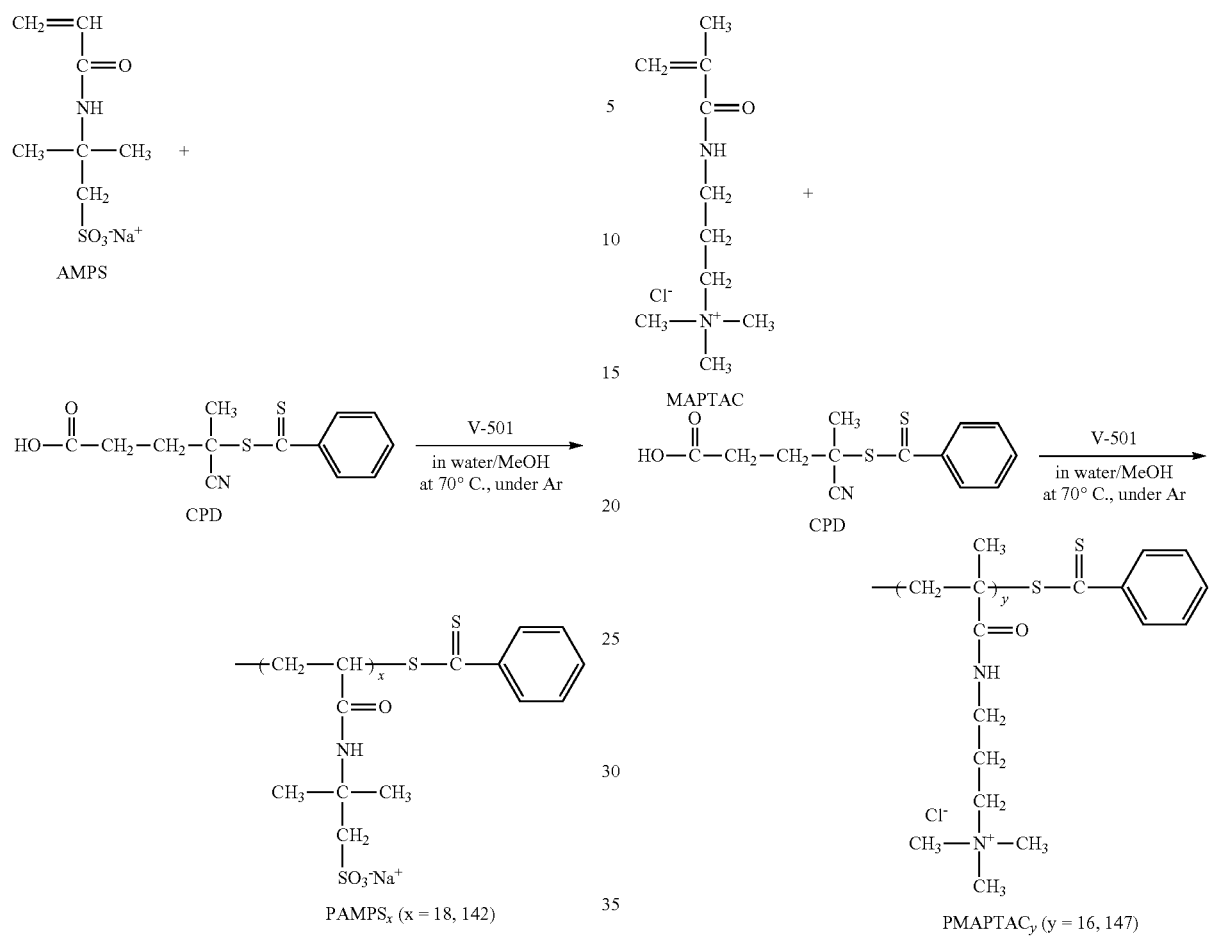

PAMPS$_x$ (x = 18, 142)

PMAPTAC$_y$ (y = 16, 147)

For further studies on stabilization of EVs, the PAMPS18 homopolymer was selected with the number average molecular weight determined on the basis of the $^1$H NMR spectrum equal to 4010 Da and the dispersion index $M_w/M_n$=1.21).

Example 3

Synthesis of Cationic Homopolymers—polyMAPTAC (PMAPTAC) in the Process of Controlled Radical Polymerization by Reversible Addition-Fragmentation Chain Transfer Polymerization (RAFT).

A series of PMAPTACy homopolymers (where y–degree of polymerization) were obtained by the RAFT method, and then characterized.

An Exemplary Description of the Synthesis of the PMAPTAC147 Homopolymer.

MAPTAC (5.00 g, 22.7 mmol), V-501 (21.2 mg, 0.0757 mmol), and CPD (42.3 mg, 0.151 mmol) were dissolved in a mixture of MeOH (2.3 mL) and water (20.5 mL). The solution was degassed by purging argon for 30 min. Polymerization was carried out at 70° C. for 18 h. The degree of MAPTAC conversion estimated from $^1$H NMR was 90.9%. The reaction mixture was dialyzed against pure water for one day. PMAPTAC147 was isolated by freeze-drying (4.54 g, 90.9%). $M_n$ (NMR) and DP, estimated from $^1$H NMR, and the dispersion coefficient ($M_w/M_n$), estimated by GPC were 3.26×10$^4$, 147 and 1.14, respectively. The remaining PMAPTACy polymers were prepared in an analogous manner.

The PMAPTAC16 homopolymer was selected for further studies on EVs stabilization.

Example 4

Synthesis and Characterization of polyMPC Zwitterionic Homopolymer (PMPCz)

The RAFT method was used to obtain a series of poly (2-(methacryloyloxy)ethylphosphorylcholine) homopolymers (PMPCz, where z is the degree of polymerization, DP) differing in molecular weight, which were then characterized. The polymers were prepared using a literature procedure (15). 4-cyano-4-(phenylcarbonothioylthio)pentanoic acid (CPD) was used as chain transfer agent (CTA). The molecular weight of the polymer was controlled by the synthesis time as proposed in the literature (16).

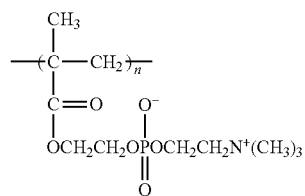

An Exemplary Description of the Synthesis 1.5 g of (methacryloyloxy)ethylphosphorylcholine (MPC) monomer was dissolved in 5 mL of distilled water, and then this solution was passed through a column filled with neutral alumina to remove the polymerization inhibitor. The column was rinsed with enough water to bring the volume of the monomer-containing solution to 10 mL. The solution was then degassed by purging argon for 30 min. After this time, an initiator (4,4'-azobis(4-cyanopentanoic acid), V-501) was added and the solution was degassed again for 30 min. 30 mg of CPD dissolved in 1 mL of ethanol was added to the thus prepared solution. The resulting solution was stirred and heated to a temperature of 70° C. This temperature was maintained for a strictly defined time according to the table below. After this time, the reaction mixture was cooled to room temperature and transferred to a cellulose dialysis tube (MWCO of 3 kDa). The solution was dialyzed against water for 4 days by changing the water every 12 h. The polymer was then isolated from the resulting solution free from unreacted monomer and initiator using lyophilization. A series of 3 polymers denoted as PMPCz was obtained. All polymers were well soluble in water (solubility of the order of 10 g/l).

Elemental Analysis

The elemental composition of PMPCz polymers was determined on the basis of the results of elemental analysis (Table 1).

TABLE 1

Elemental composition of the obtained PMPCz polymers

| Polymer name | Elemental composition [%] | | | | Ratio |
|---|---|---|---|---|---|
| | N | C | H | S | N/C |
| PMPC12 | 4.23 | 41.46 | 7.78 | 0.132 | 0.1019 |
| PMPC16 | 4.21 | 40.65 | 8.37 | traces | 0.1037 |
| PMPC33 | 4.43 | 42.19 | 8.01 | 0 | 0.1051 |
| MPC (monomer) | 4.65 | 44.47 | 7.63 | 0 | 0.1049 |

The results of elemental analysis confirmed that the extension of the synthesis time resulted in the formation of polymers with higher molecular weights (the content of sulfur coming from CPD decreases with increasing chain length). The N/C value also increases, approaching the value characteristic of the monomer for the polymer with the highest molecular weight.

These results correlate with the molecular weight studies carried out using gel permeation chromatography (GPC) (FIG. 1) performed with the following analysis parameters: POLYSEP-GFC-P-linear 3007.8 mm column, eluent 0.1 M NaCl and 0.02% $NaN_3$, mobile phase flow rate: 0.5 mL/min, polymer concentration 5 g/L, sample volume 100 µL.

On the basis of the obtained chromatograms, the molecular weight and the degree of polymerization of the obtained polymers were determined (Table 2).

TABLE 2

Structural parameters of PMPCz polymers

| Polymer | Molecular weight [kDa] | DS |
|---|---|---|
| PMPC12 | 3.94 | 12.4 |
| PMPC16 | 4.90 | 15.6 |
| PMPC33 | 9.91 | 32.6 |

Example 5

Synthesis of a Fluorescently Labeled PMPC33 Copolymer by Attaching a Poly(Fluorescein o-Acrylate) Block 250 mg of PMPC33 was dissolved in 5 mL of distilled water. The solution was then degassed by purging argon for 30 min. After this time, 15 mg of V-501 initiator was added and the solution was degassed again for 30 min. 40 mg of fluorescein o-acrylate and 0.5 mL of ethanol were added to the solution prepared in this way. The mixture was stirred and heated to 70° C. This temperature was maintained for 1 h. At this time, the reaction mixture was cooled to room temperature, filtered to remove undissolved monomer, and transferred to a cellulose dialysis tube with MWCO of 3 kDa. The solution was dialyzed against water for 4 days changing water every 12 h. The polymer was isolated by lyophilization from the resulting solution free from unreacted monomer and initiator.

Figure 2:
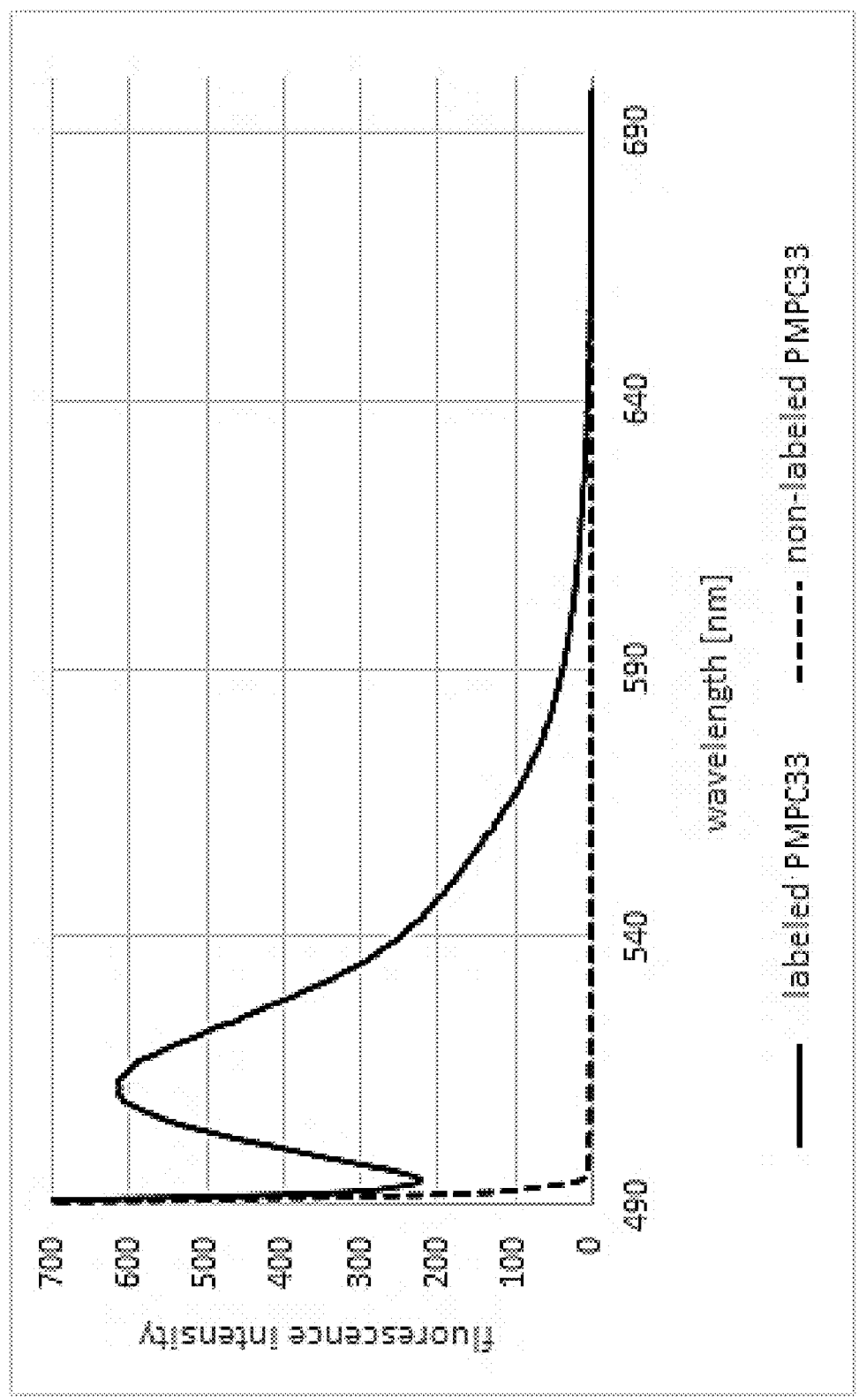
FIG. 2 shows the fluorescence spectrum of 0.1 g/L aqueous solution of starting fluorescently labeled PMPC33 polymer. The excitation wavelength was 485 nm.

To confirm the effectiveness of the fluorescence labeling of PMPC33 with fluorescein, the emission spectra of the labeled and unlabeled polymer were recorded (FIG. 2). This spectrum shows a band with a maximum at wavelength of 510 nm, which corresponds to fluorescein, which confirms successful labeling.

Figure 3:
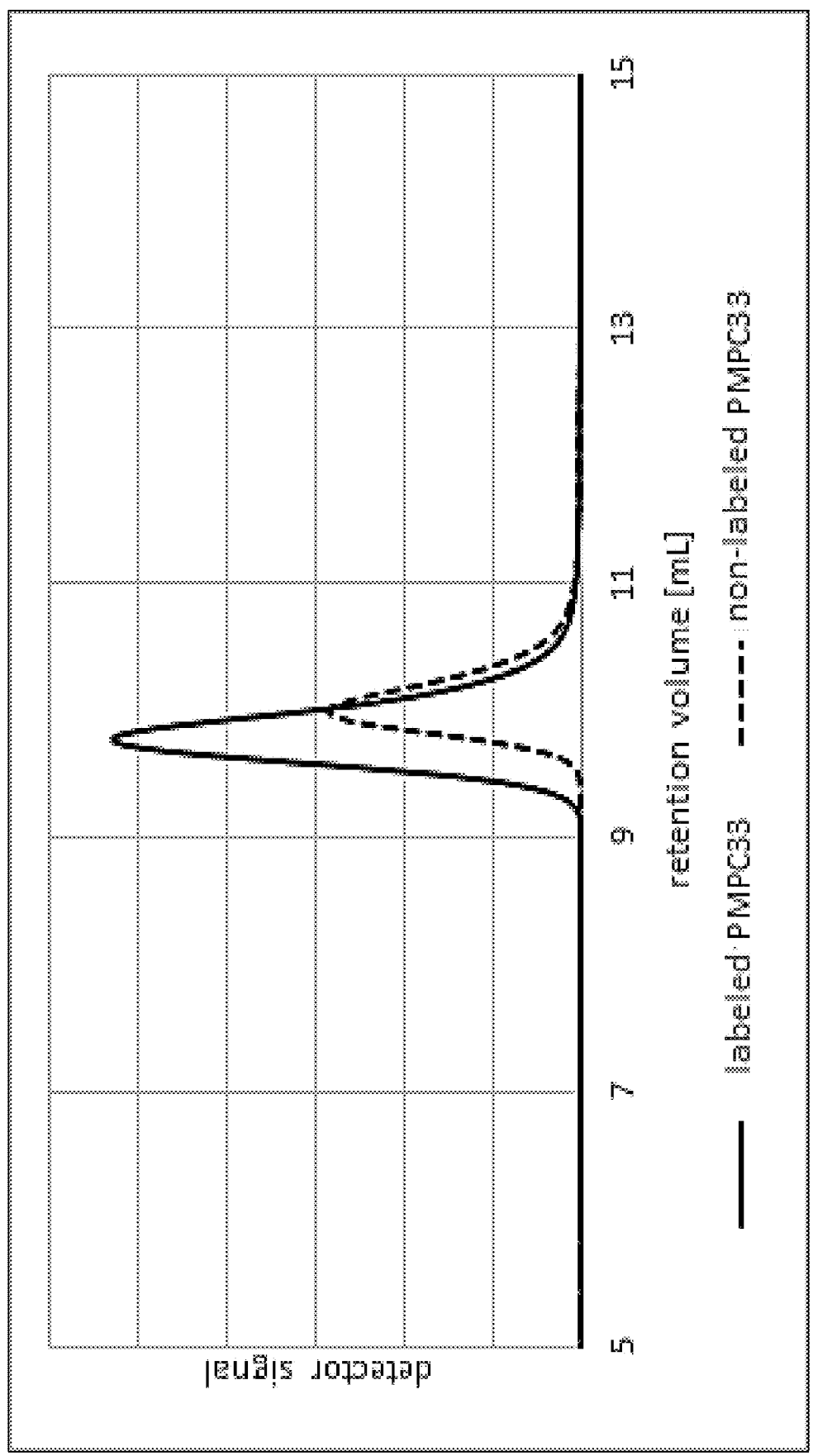
FIG. 3 shows a GPC chromatogram of the PMPC33 polymer before and after fluorescent labeling.

In addition, GPC chromatographic analysis of the fluorescently labeled polymer was performed. FIG. 3 shows that the signal from the fluorescein-labeled compound is clearly shifted from the unlabeled polymer signal towards shorter retention times, which confirms effective fluorescent labeling of PMPC33 with fluorescein chromophores and excludes the simultaneous formation of a fluorescein o-acrylate homopolymer.

Example 6

Synthesis of PEGn-b-PMAPTACm Block Copolymers

For the purposes of the present research, a series of PEGm-b-PMAPTACn block polyelectrolytes (where m and n are the degrees of polymerization of the respective blocks) containing a neutral block of poly(ethylene glycol) (PEG) and a cationic block of poly((3-(methacryloylamino)propyl) trimethylammonium chloride) (PMAPTAC) was synthesized and characterized (GPC, NMR, FTIR, elemental analysis). The polymers were synthesized by a Reversible Addition-Fragmentation Chain Transfer Polymerization (RAFT) process.

Exemplary Description of PEG46-b-PMAPTAC52 Copolymer Synthesis.

The chain transfer agent (CTA), which was CPD, was prepared according to the procedure described in the literature (17). PEG46-CTA macromonomer, i.e. poly(ethylene glycol) (PEG) with a degree of polymerization equal to 46, terminated with a chain transfer agent (CTA), was prepared according to the procedure described in the publication 18. MAPTAC (5.00 g, 22.7 mmol), initiator (4,4'-azobis (4-cyanopentanoic acid) (V-501), 52.8 mg, 0.188 mmol) and PEG46-CTA (0.887 g, 0.378 mmol) were dissolved in water (37.2 mL). The solution was deoxygenated by purging argon for 1 hour. Polymerization was carried out at 70° C. for 20 h. The reaction mixture was dialyzed against pure water for two days. The obtained polymer (PEG46-b-PMAPTAC52) was isolated by freeze-drying. 5.03 g of product was obtained (85.4% yield). The structure of the polymer obtained is shown below.

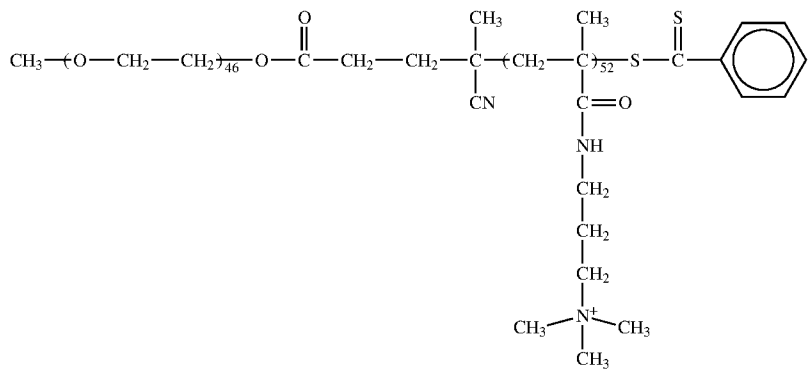

Figure 4:
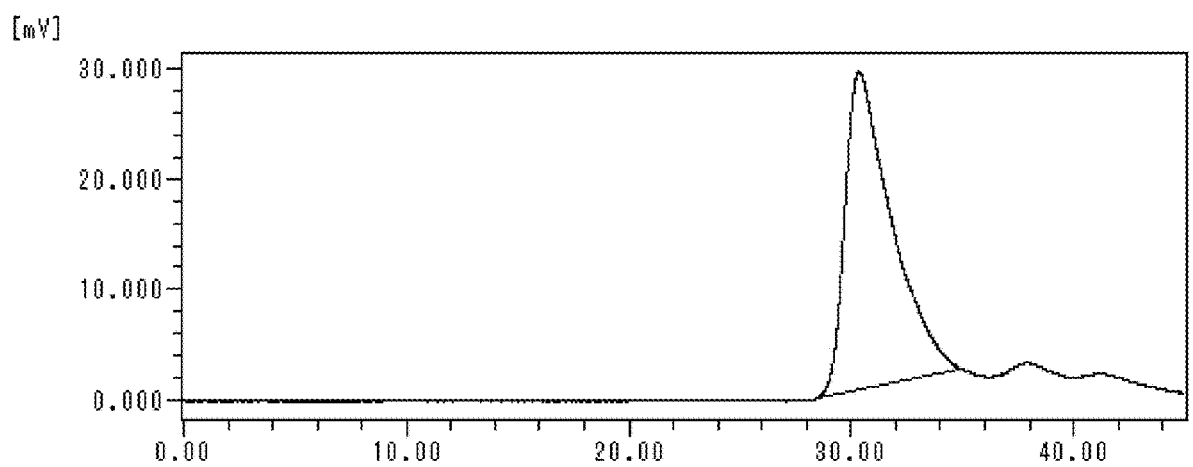
FIG. 4 shows a GPC chromatogram of the PEG46-b-PMAPTAC52 polymer.
Figure 5:
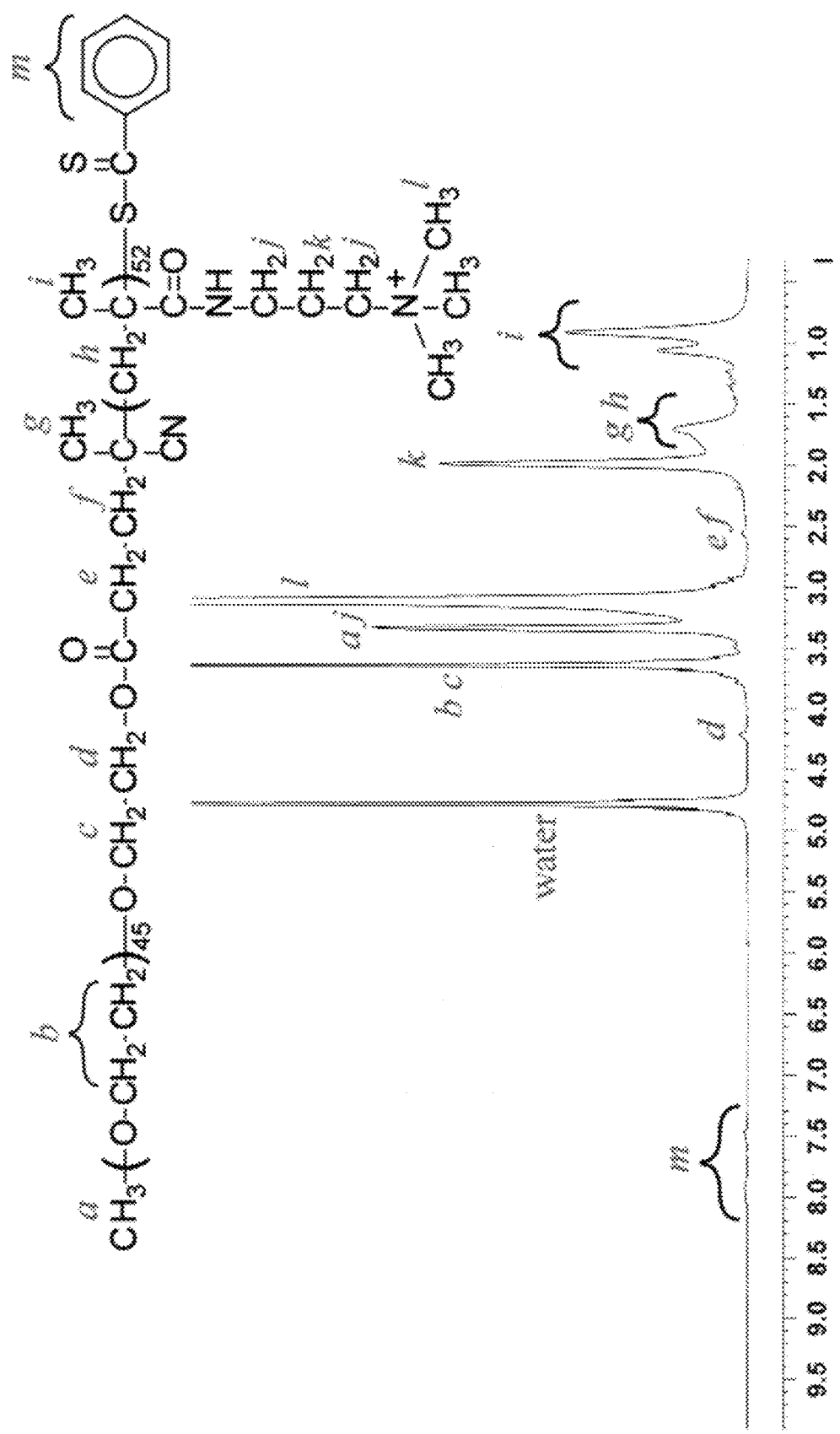
FIG. 5 shows the $^1$H-NMR spectrum of PEG46-b-PMAPTAC52 in $D_2O$.

The polymer has been characterized using spectroscopic and chromatographic methods. The GPC chromatogram of the obtained polymer (FIG. 4) was measured at 40° C. using an aqueous 0.3 M $Na_2SO_4$ solution containing 0.5 M acetic acid as eluent. The number average molecular weight of the polymer, $M_n$, determined on its basis, was 13.8 kDa. The polymer was characterized by a low dispersion index $M_w/M_n=1.16$. The number average degree of polymerization (DP) of the PMAPTAC block, determined by $^1$H-NMR measurements, was 52. The $^1$H-NMR spectrum of the polymer in $D_2O$ is shown in FIG. 5.

The characteristics of all obtained PEGm-b-PMAPTACn copolymers are presented in Table 3.

TABLE 3

Characteristics of the PEGm-b-PMAPTACn polymers.

| Polymer | $M_n$ | The number of cationic groups (degree of polymerization of PMAPTAC block, n) |
|---|---|---|
| PEG45-b-PMAPTAC5 | 3375.5 | 5 |
| PEG45-b-PMAPTAC9 | 4257.5 | 9 |
| PEG10-b-PMAPTAC5 | 1835.5 | 5 |
| PEG10-b-PMAPTAC19 | 4922.5 | 19 |
| PEG45-b-PMAPTAC22 | 7124 | 22 |
| PEG45-b-PMAPTAC40 | 11093 | 40 |
| PEG45-b-PMAPTAC51 | 13518.5 | 51 |
| PEG46-b-PMAPTAC52 | 13783 | 52 |
| PEG45-b-PMAPTAC58 | 15062 | 58 |
| PEG47-b-PMAPTAC74 | 18678 | 74 |
| PEG45-b-PMAPTAC87 | 21456.5 | 87 |
| PEG45-b-PMAPTAC102 | 24764 | 102 |
| PMAPTAC44 | 9702 | 44 |

Example 7

Synthesis of PAMPSm-b-PAaUn Block Copolymers.
Synthesis of Sodium 11-(Acrylamido)Undecanoate (AaU) Monomer.

Acryloyl chloride (56.7 g, 0.625 mol) was added over 30 minutes to 1.5 L of a solution of 11-aminoundecanoic acid (40.3 g, 0.20 mol) in 0.6 M NaOH in water placed in an ice bath. The resulting solution was stirred for 3 h at room temperature. After the reaction had taken place, the pH of the solution was adjusted to 3 with 6 M hydrochloric acid. The precipitate was filtered off and washed twice with water. The product (11-(acrylamido)undecanoic acid) was purified by three recrystallizations from a mixture of acetone and n-hexane (1/3 v/v) and dried at 50° C. in vacuo. Yield: 15.4 g (60.7 mmol, 30.4%).

Figure 6:
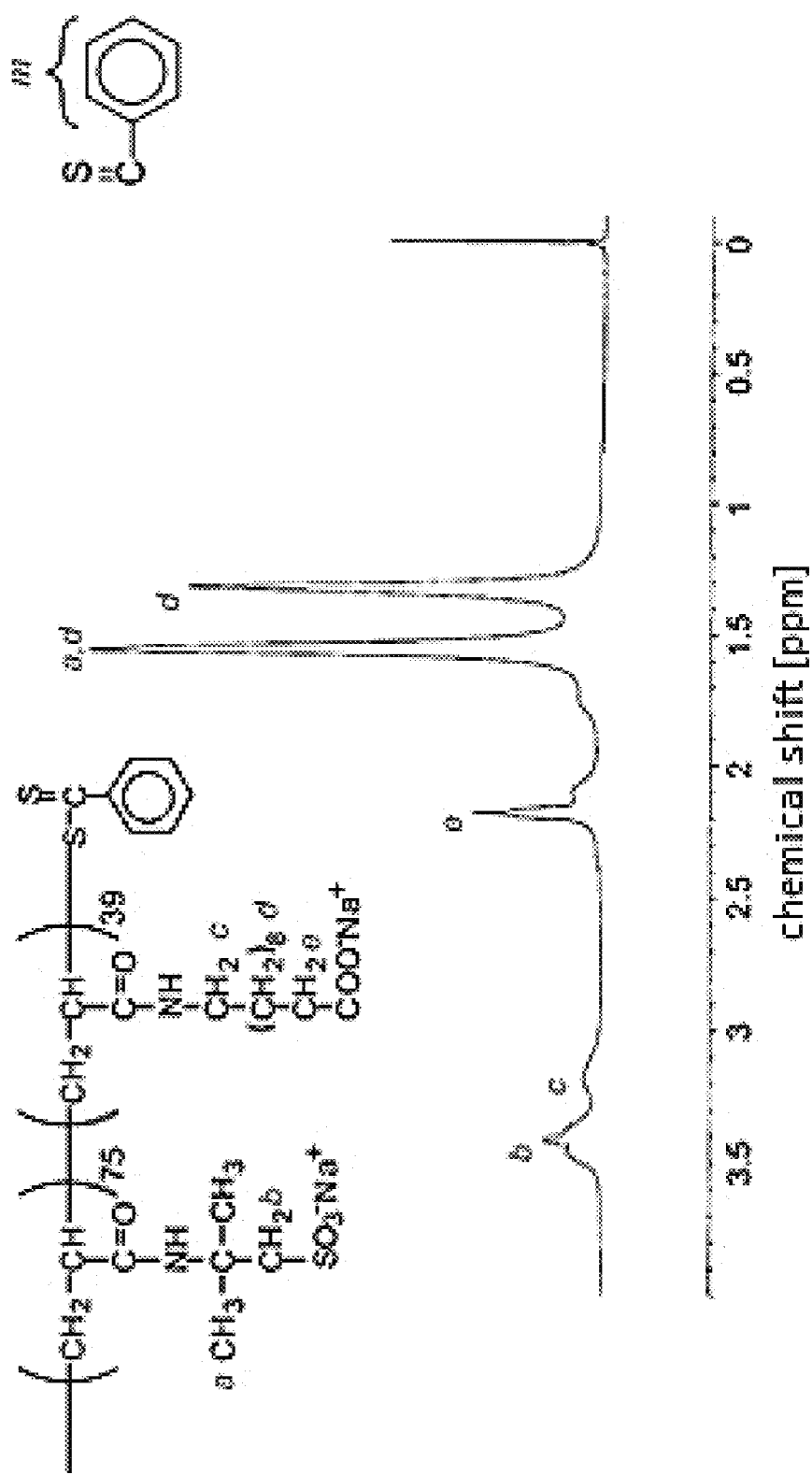
FIG. 6 shows the spectrum of PAMPS75-b-PAaU39 with a concentration of Cp=10 g/L in $D_2O$, pH 10.

11-(Acrylamido)undecanoic acid was then neutralized with an equivalent amount of NaOH (2.43 g, 60.8 mmol) in methanol to give the salt precipitated with diethyl ether. The sample was dried at 50° C. under vacuum. 16.1 g (95.7%) of sodium 11-(acrylamido)undecanoate (AaU) were obtained.
Synthesis of the PAMPS-CTA Macromonomer AMPS (25.0 g, 121 mmol) was neutralized with a solution of NaOH (4.81 g, 121 mmol) in 60 mL of water. CPD (232 mg, 0.829 mmol) and V-501 (46.4 mg, 0.166 mmol) were added to the resulting solution. The mixture was deoxygenated by purging argon for 30 min. The polymerization was carried out at 70° C. for 4 h. The obtained polymer was purified by dialysis against pure water for 1 week and isolated by freeze-drying. Yield: 23.2 g, 83.8%.
Synthesis of PAMPS75-b-PAaU39 Block Copolymer PAMPS-CTA macromonomer (2.43 g, 0.14 mmol), sodium 11-(acrylamido)undecanoate (AaU, 2.06 g, 7.43 mmol), V-501 (4.63 mg, 0.0165 mmol)) were dissolved in 13.5 mL of water. The solution was deoxygenated by purging argon for 30 min. The polymerization was carried out at 70° C. for 4 h. The obtained block copolymer was purified by dialysis against a NaOH solution at pH 8 for 1 week, which was changed twice daily. The product was isolated by freeze-drying. Yield: 3.52 g, 89.4%. The degree of polymerization of the PAMPS block ($DP_{PAMPS}=75$), the number average molecular weight ($M_n=7.63\times10^4$) and the dispersion coefficient $$\left(\frac{M_w}{M_n}=1.23\right)$$

were determined by gel permeation chromatography (GPC) using the mixture of water and acetonitrile 80/20 v/v containing 0.1 M $NaNO_3$ as a mobile phase. The degree of polymerization of the PAaU block ($DP_{PAaU}=39$) was determined from the $^1$H NMR spectrum (FIG. 6).

The structure of the resulting PAMPS75-b-PAaU39 block copolymer is shown below.

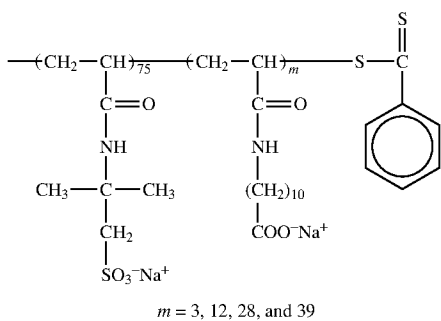

$m = 3, 12, 28,$ and $39$

The characteristics of the obtained PAMPSm-b-PAaUn copolymers are presented in Table 4.

TABLE 4

Characteristics of PAMPSm-b-PAaUn copolymers.

| Polymer | $M_n \times 10^{-4}$ | $M_w \times 10^{-4}$ | $\frac{M_w}{M_n}$ | $DP_{PAMPS}$ | $DP_{PAaU}$ |
|---|---|---|---|---|---|
| PAMPS75-b-PAaU3 | 1.98 | 2.70 | 1.37 | 75 | 3 |
| PAMPS75-b-PAaU12 | 3.20 | 4.53 | 1.42 | 75 | 12 |
| PAMPS75-b-PAaU28 | 5.05 | 6.72 | 1.33 | 75 | 28 |
| PAMPS75-b-PAaU39 | 7.63 | 9.36 | 1.23 | 75 | 39 |

Example 8

Synthesis of poly(vinyl alcohol)-graft-[poly((3-acrylamidopropyl)trimethylammonium chloride)](PVA-graft-PAPTAC) Polymer Poly(vinyl alcohol) (PVA, 25 kDa, degree of hydrolysis 88%, 1.5 g) was dissolved in 75 mL of dimethylformamide (DMF) at 120° C. under reflux with vigorous mixing using a magnetic stirrer. The temperature was then lowered to 70° C. and argon was purged through the mixture. After 0.5 h of gas purging, a solution of benzoyl peroxide (BPO) in DMF (1.7 g BPO in 9 mL of deoxygenated DMF) was added. After 5 min, 20 mL of (3-acrylamidopropyl)trimethylammonium chloride (APTAC, 75% solution in water) was added gradually. The reaction was continued for 3 h with argon flowing continuously through the system. After this time, the mixture was cooled to room temperature and dialyzed (MWCO of 3.5 kDa) first against DMF, then against DMF/water mixtures with decreasing amount of DMF, and finally against pure water. The purification was completed after several days when the conductivity of the water outside the dialysis tube dropped to 10-15 µS. The mixture was concentrated with an evaporator, centrifuged (10600 g, 10 min) and freeze-dried. The dry substance, which was a mixture of the desired product and the non-PVA-attached PAPTAC homopolymer, was washed twice with methanol and centrifuged (10600 g, 5 min). The product precipitate was dried in vacuo.

Scheme of PVA-Graft-PAPTAC Synthesis.

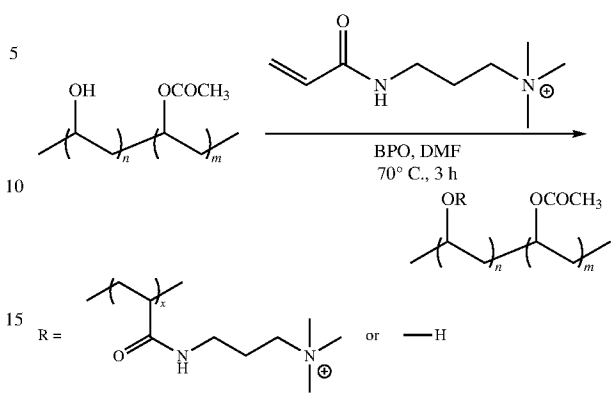

The obtained product was subjected to physicochemical tests. The results of the elemental analysis are shown in Table 5.

TABLE 5

Results of the elemental analysis of the synthesis product.

| Elemental composition [%] | | | |
|---|---|---|---|
| N | C | H | N/C ratio |
| 2.32 | 52.16 | 8.943 | 0.0445 |

Figure 7:
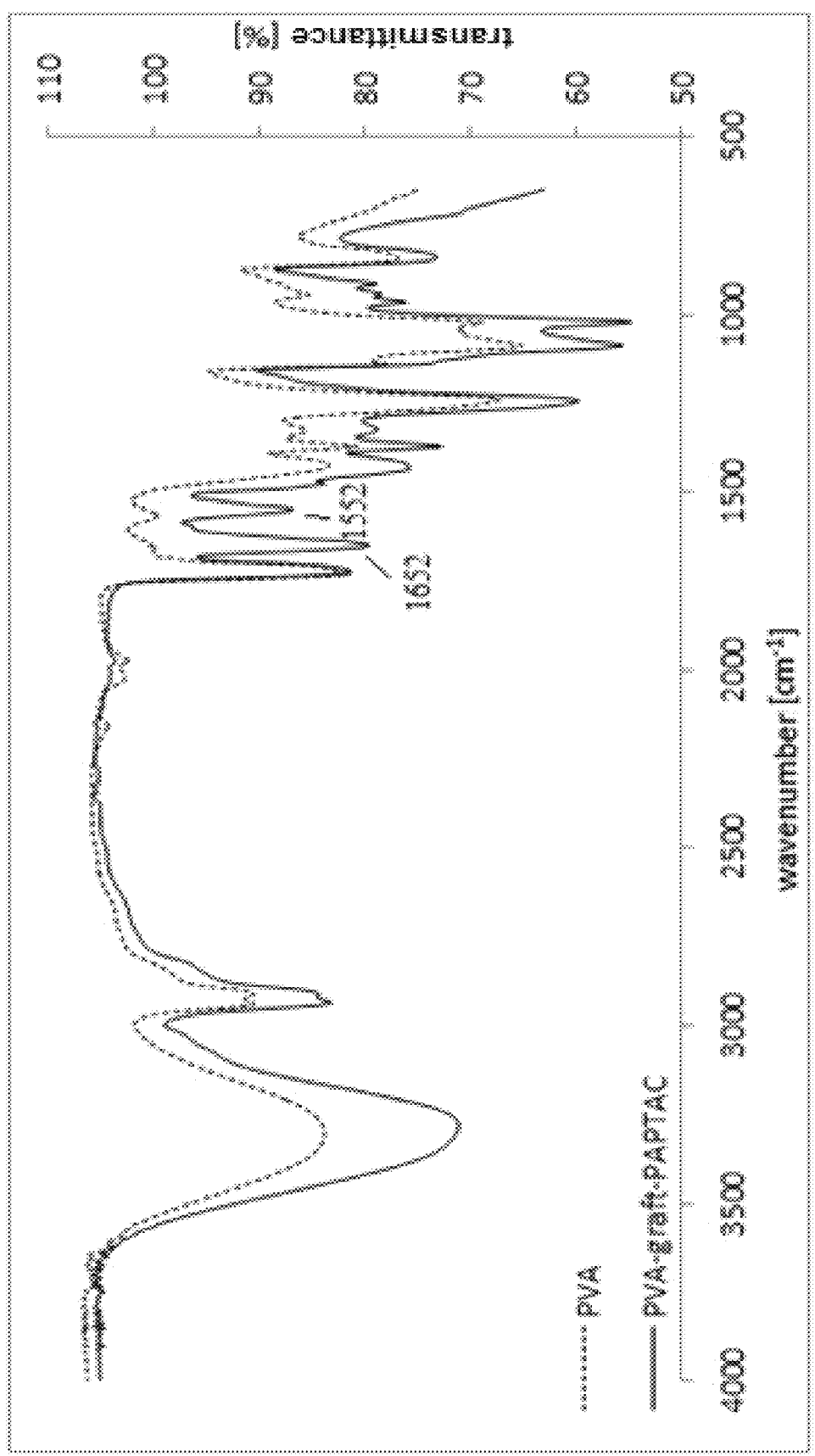
FIG. 7 shows the FTIR spectrum of PVA and PVA-graft-PAPTAC.

On the basis of the N/C ratio, the average number of APTAC groups attached to PVA per 100 mers of vinyl alcohol was calculated, amounting to approximately 5. The modification of PVA was confirmed by measuring FT-IR spectra of the obtained product. The presence of the band at 1652 cm$^{-1}$ originating from the C=O stretching vibrations of the amide group and the band at 1552 cm$^{-1}$ originating from the N—H bending vibrations confirms the reaction (FIG. 7).

Figure 8:
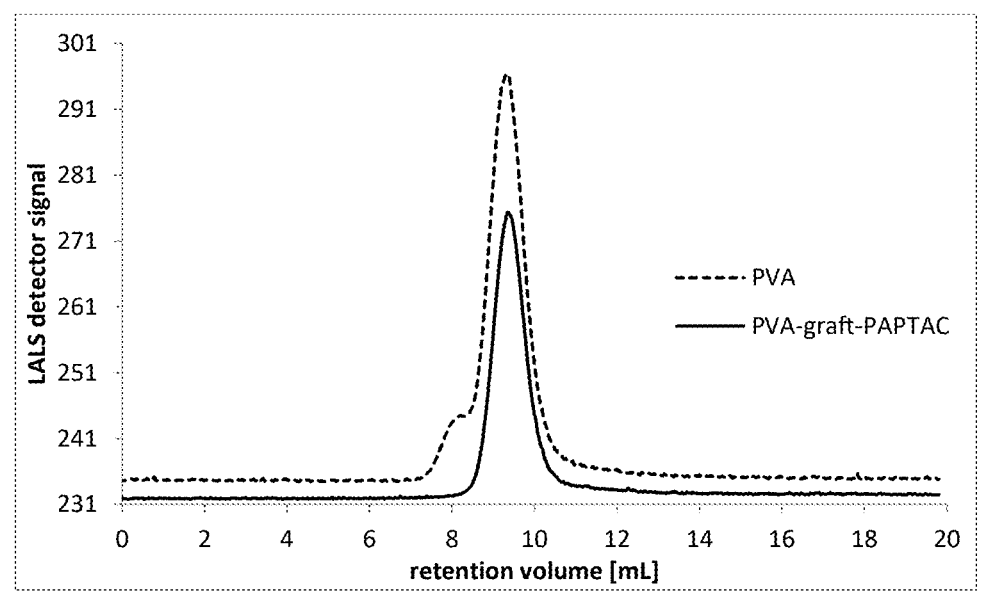
FIG. 8 shows a GPC chromatogram of PVA and the product (PVA-graft-PAPTAC). Analysis parameters: POLY-SEP-GFC-P-linear 300×7.8 mm column, eluent: 0.1 M NaCl and 0.02% NaN3, mobile phase flow rate: 0.5 mL/min, polymer concentration: 5 mg/mL, sample volume: 100 µL.

Comparing the GPC chromatograms of PVA and PVA-graft-PAPTAC, it was confirmed that one well-defined product was obtained and that no degradation of PVA occurred during the reaction (FIG. 8).

Example 9

Synthesis of poly(vinyl alcohol)-graft-[poly((3-acrylamidopropyl)trimethylammonium chloride](PVA-graft-PAPTAC) polymer substituted with hydrophobic octyl groups (PVA-graft-PAPTAC-Oct)

Procedure for the Synthesis of PVA-graft-PAPTAC-Oct 0.27 g of the previously prepared PVA-graft-PAPTAC was dissolved in 40 mL of dry dimethylformamide (DMF). The process was carried out at a temperature of 90° C. under a reflux condenser, mixing the system using a magnetic stirrer and purging nitrogen through the mixture. After dissolving the substrate, the mixture was cooled to room temperature. 43.34 mg of sodium hydride was added with continued stirring. After 10 min, 0.310 mL of 1-bromooctane was added. The reaction was complete after 14.5 h. The mixture was dialyzed (MWCO of 3.5 kDa) first against DMF, then against a DMF/H$_2$O mixture with increasing water content and finally dialyzed against pure water. Dialysis was completed when the conductivity of the water outside the dialysis tube had dropped to 2.5 µS. The mixture was centrifuged four times (10 min, 10600 g). The supernatant was lyophilized. The obtained dry product was washed 3× with diethyl ether and then the solvent was removed in vacuo.

The course of the reaction is shown schematically below:

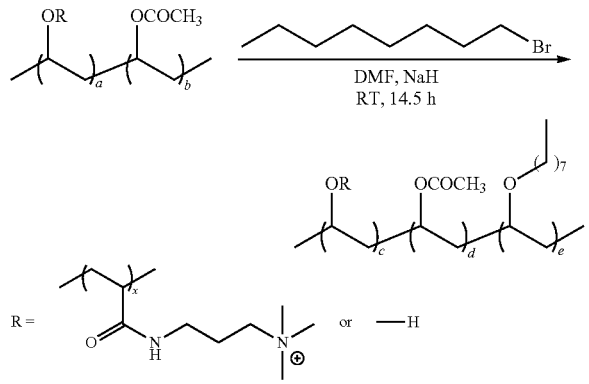

The obtained product was subjected to physico chemical tests. The results of the elemental analysis are presented in Table 6.

TABLE 6

Results of the elemental analysis of PVA-graft-PAPTAC-Oct.

| Elemental composition [%] | | | |
|---|---|---|---|
| N | C | H | N/C ratio |
| 2.36 | 52.66 | 9.225 | 0.0448 |

Based on the N/C ratio, the mean degree of substitution of PVA-graft-PAPTAC with ionic groups was estimated. It is about 6% (i.e. 6 PAPTAC groups per 100 mers of vinyl alcohol (VA).

Figure 9:
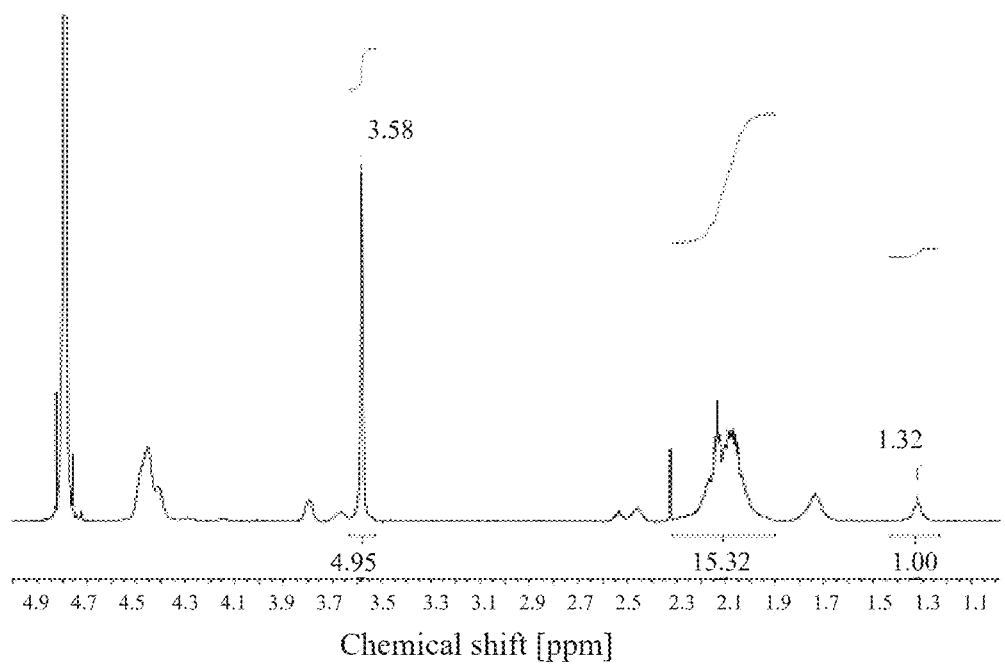
FIG. 9 shows the $^1$H-NMR spectrum of PVA-graft-PAPTAC-Oct in $D_2O$.

The presence of octyl groups in the PVA-graft-PAPTAC-Oct structure was confirmed by recording the $^1$H-NMR spectrum for this polymer in $D_2O$ (FIG. 9). The signal present at 1.32 ppm originates from the protons of the terminal $CH_3$ group of the attached hydrophobic chain. Based on the integration of appropriate signals, the degree of substitution with hydrophobic groups was estimated to be approximately 4.3%.

Example 10

In Vitro Cytotoxicity Analysis of Polymers.

In order to investigate the cytotoxicity of the polymers (used for EVs cryopreservation) on eukaryotic cells in vitro, proliferation, cytotoxicity and apoptosis assays were performed on polymer-treated human osteoblasts (HOBs). A commercial APOTOX-GLO TRIPLEX ASSAY kit (PROMEGA) and the following polymers: DEX, PEG, PEG-PAMPS were used to perform the analysis. The addition of polymers at a dose corresponding to 1×, 10× and 100× the dose of the EVs formulation was tested. The analysis of the influence of polymers on cells was performed 24 hours after their addition into the culture medium.

Figure 10:
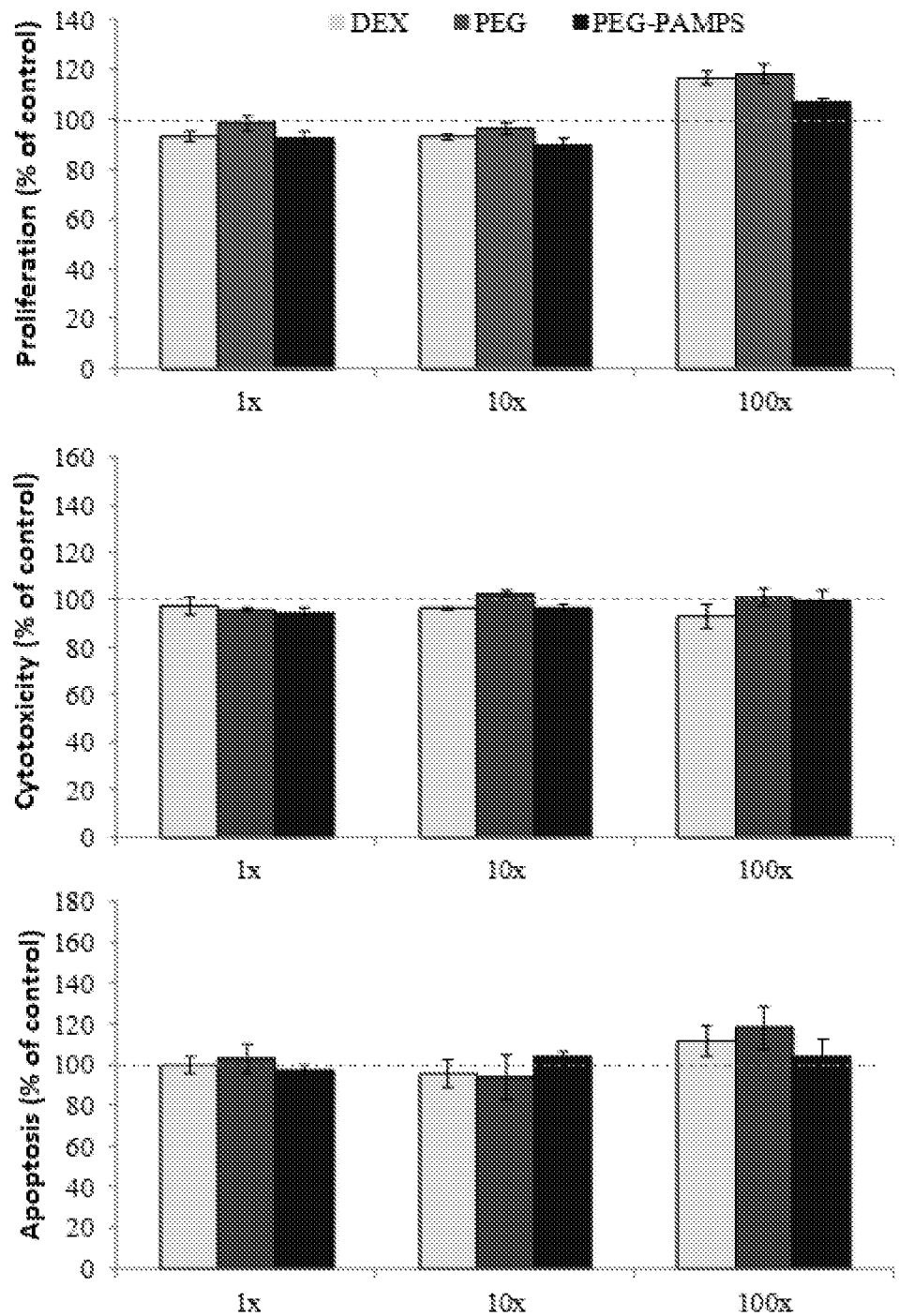
FIG. 10 shows exemplary in vitro analysis of the influence of selected polymers on proliferation, cytotoxicity and apoptosis of human osteoblasts (HOB). Measurements were taken 24 hours after adding polymers to the culture medium, at a dose corresponding to 1×, 10× and 100× the dose of the EVs formulation. Cumulative analysis results are presented as mean±SD for two independent experimental repetitions (N=2). Data are expressed as % of control (cells untreated by polymers).

The analysis showed no cytotoxic and pro-apoptotic influence of the polymers on the tested cells (FIG. 10), which proves the safety of using these polymers for cryopreservation of EV formulations, that can be subsequently used in further functional studies in vitro.

Example 11

EVs Isolation

Figure 11:
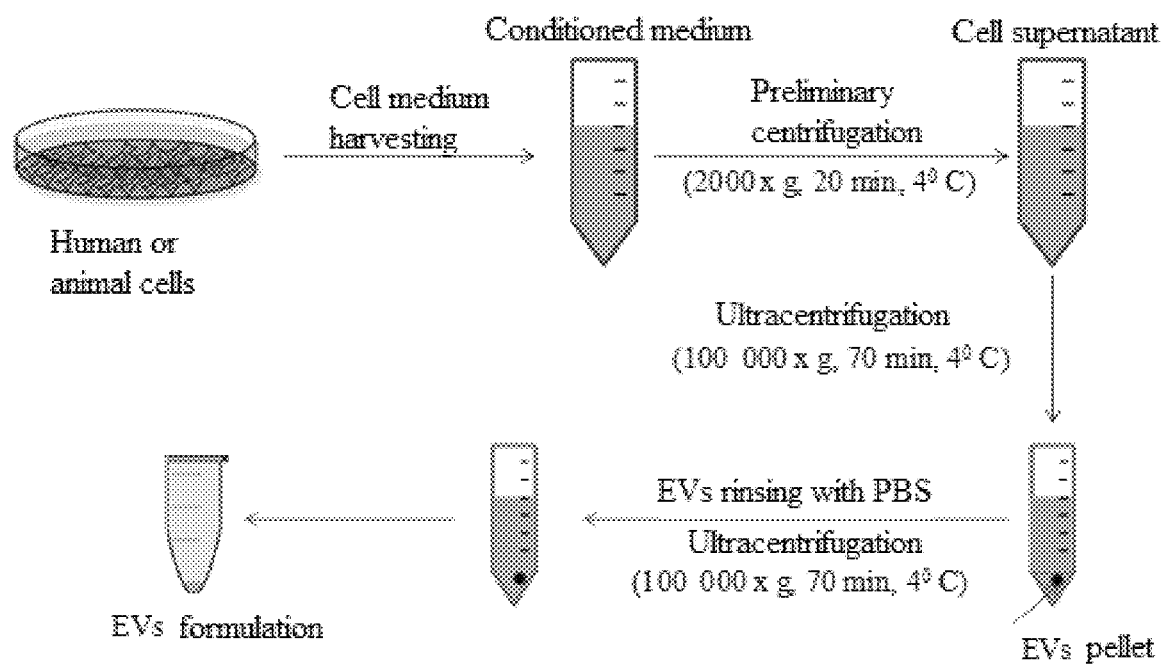
FIG. 11 shows a schematic representation of the procedure for EVs isolation from conditioned media (i.e. from human or animal cell culture) by sequential centrifugation with an ultracentrifugation step.

First, EVs were isolated from the conditioned medium, i.e. harvested from the culture of appropriate human or animal cells, using the sequential centrifugation method, according to the scheme shown in FIG. 11. The method involved several steps, including firstly the preliminary centrifugation of the culture medium (2000 g, 20 min, 4° C.) to remove cellular elements and larger cell debris. Thereafter, the supernatants were ultracentrifuged at 100000 g for 70 min at 4° C. to pellet the EVs fraction. The obtained EV pellets were rinsed with phosphate buffered saline (PBS) free of calcium and magnesium ions and additionally filtered through pores with a diameter of 0.22 m, and then again ultracentrifuged with the same parameters (100000 g for 70 min at 4° C.).

Importantly, in order to remove EVs from the components of the medium (including serum and platelet lysate), which could adversely affect the quality of the obtained results at later stages of the research, the culture media were also subjected to the ultracentrifugation procedure (100000 g, 18 hours, 4° C.) before use. Thus, it was possible to isolate and then analyze only EVs secreted by cells. In addition, the conditioned medium was subjected to preparation immediately after harvesting it from cell culture, without freezing step, which eliminated the possible impact of the additional low-temperature storage step on the subsequent results. EV samples were mixed with polymer solutions immediately after the isolation step and then further analyzed.

Example 12

Coating of Isolated EVs a. Coating with One Layer of a Cryoprotectant

The isolated EVs were suspended in 200 µl of PBS solution. The suspension was then divided into two parts of equal volumes. A solution of $PEG_{46}$-b-$PMAPTAC_{52}$ in PBS was prepared at a concentration of 1 mg/ml. At room temperature, one part of the EVs suspension was mixed with the $PEG_{46}$-b-$PMAPTAC_{52}$ solution in PBS solution by adding the EVs suspension (100 µl) to 5.3 µl of the $PEG_{46}$-b-$PMAPTAC_{52}$ solution and repeatedly pipetting. In the resulting mixture, the concentration of $PEG_{46}$-b-$PMAPTAC_{52}$ was 50 µg/ml and the concentration of EVs was $10^{11}$/ml. An equal volume of PBS solution was added to the second part of the EVs suspension (control).

Then, the samples obtained in this way were divided into two parts, one of which was directly tested and the other was frozen in liquid nitrogen or at −80° C. After an appropriate storage period of the samples (days/months) under deep freeze conditions, they were thawed by heating in a 37° C. water bath until ice crystals disappeared and subjected to the tests described in the following examples.

The same procedure was also applied to the coating of EVs using the following polymers:
$PMPC_{16}$
PVA-graft-PAPTAC
PVA-graft-PAPTAC-Oct
dextran-GTMAC B. Coating with Two Layers of Cryoprotectants A 1 mg/ml solution of $PEG_{46}$-b-$PMAPTAC_{52}$ polymer in PBS was prepared as in procedure A, and 5.3 µl of this solution was mixed at room temperature with the EVs suspension (100 µl) in PBS solution. The concentration of $PEG_{46}$-b-$PMAPTAC_{52}$ in the resulting mixture was 50 µg/ml and the concentration of EVs was $10^{11}$/ml. An equal volume of the PBS solution was added to the second part of the EVs suspension (100 µl of control suspension).

A few minutes after the addition of $PEG_{46}$-b-PMAPTAC$_{52}$, the PAMPS$_{18}$ solution in PBS at a concentration of 1 mg/ml was mixed with the $PEG_{46}$-b-PMAPTAC$_{52}$-coated EVs solution and thoroughly mixed in the same way as in procedure A, i.e. by adding a suspension of EVs coated with $PEG_{46}$-b-PMAPTAC$_{52}$ into PAMPS$_{18}$ solution and repeated pipetting. The concentration of EVs in the obtained mixture was $10^{11}$/ml and the concentration of both polymers was 50 µg/ml (thus the weight ratio of the polymers was 1:1).

Then, the samples obtained in this way were divided into two parts, one of which was directly tested and the other was frozen in liquid nitrogen or at −80° C. After an appropriate storage period (days/months) under deep freeze conditions, the samples were thawed by heating in a 37° C. water bath until ice crystals disappeared and subjected to the tests described in the following embodiments.

The same procedure was also applied to the coating of EVs using a combination of polymers selected from the polymers shown below for layers I and II:

| 1st layer polymers: | 2nd layer polymers: |
| --- | --- |
| PMPC$_{16}$ | PAMPS$_{18}$ |
| PVA-graf-PAPTAC | poli(AMPS/AmU) |
| PVA-graf-PAPTAC-Oct | |
| dextran- GTMAC | |

Example 13

Visualization of EVs Coating with Polymer by Scanning Confocal Microscopy—the Use of a Cationic Polymer Containing a Molecular Fluorescent Marker PEG45-PMAPTAC51-1.79 mol % ALEXA FLUOR 488

Figure 12:
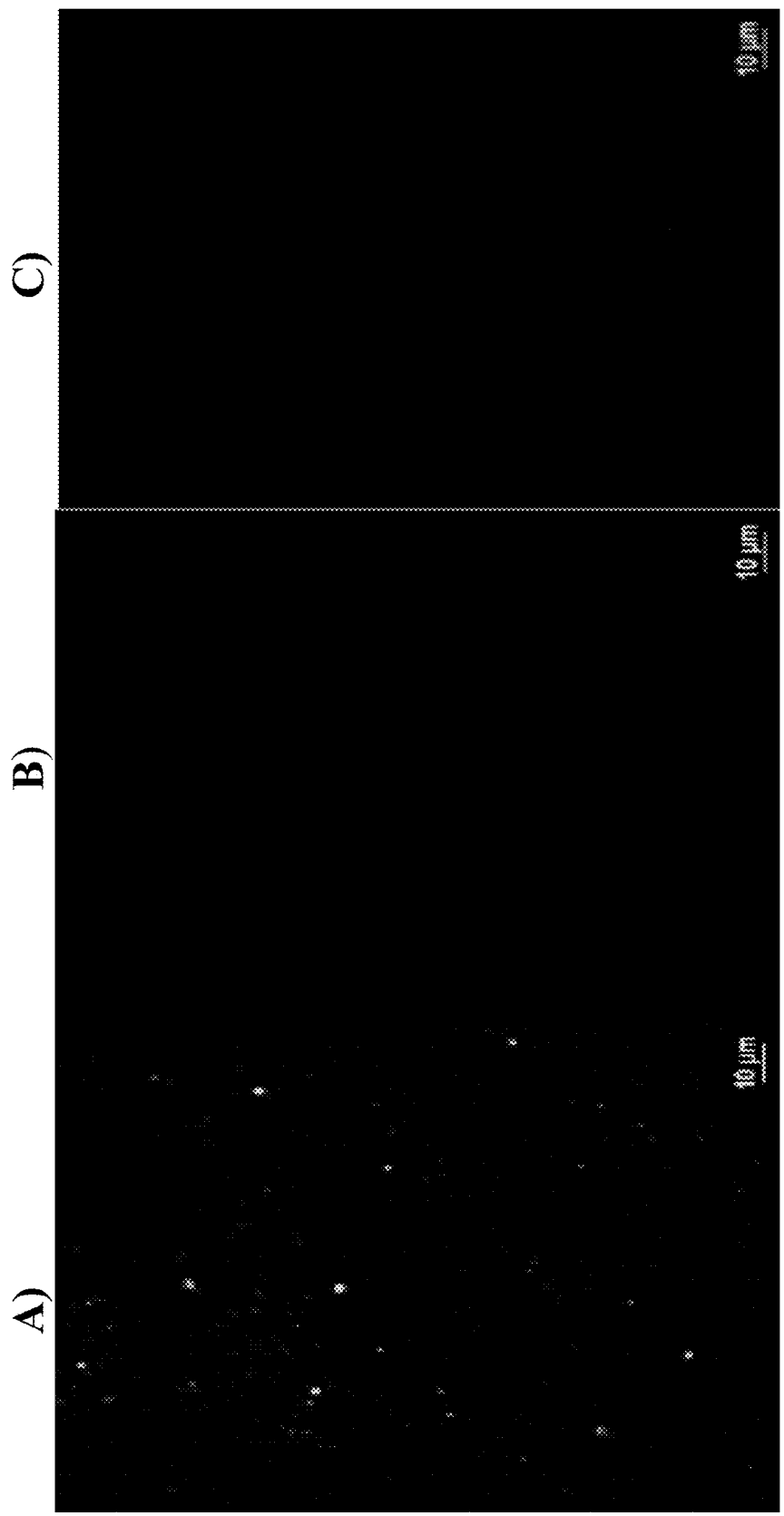
FIG. 12 shows confocal microscopic images of A) EVs freshly isolated from umbilical cord mesenchymal stem cells (UC-MSCs) coated with PEG45-b-PMAPTAC51—1.79 mol % ALEXA FLUOR 488, B) EVs freshly isolated from UC-MSCs cells without added polymer (control), C) PEG45-b-PMAPTAC51-1.79 mol % ALEXA FLUOR 488 polymer solution at the same concentration as used in a mixture with EVs (control). 488 nm laser, FITC channel.
Figure 15A:
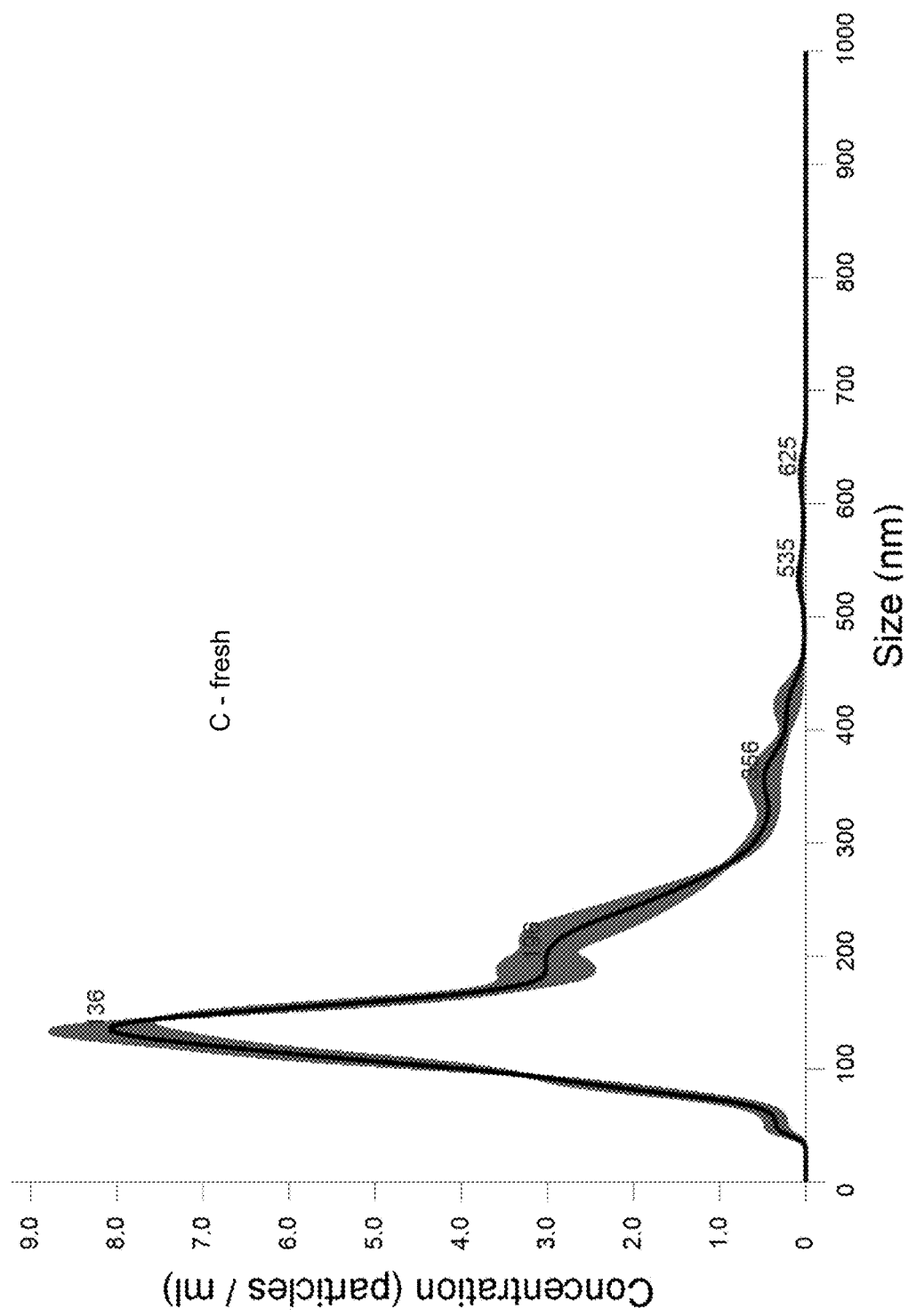
FIG. 15A-I shows the size distributions of EVs control samples (C), coated with a polymer pair, i.e. PEG46-b-PMAPTAC52, followed by PAMPS18 (P+P), and PMPC16 polymer (Zwitt), Fresh and frozen 10 and 20 times. The names of individual samples refer to the description in Table 7.
Figure 15B:
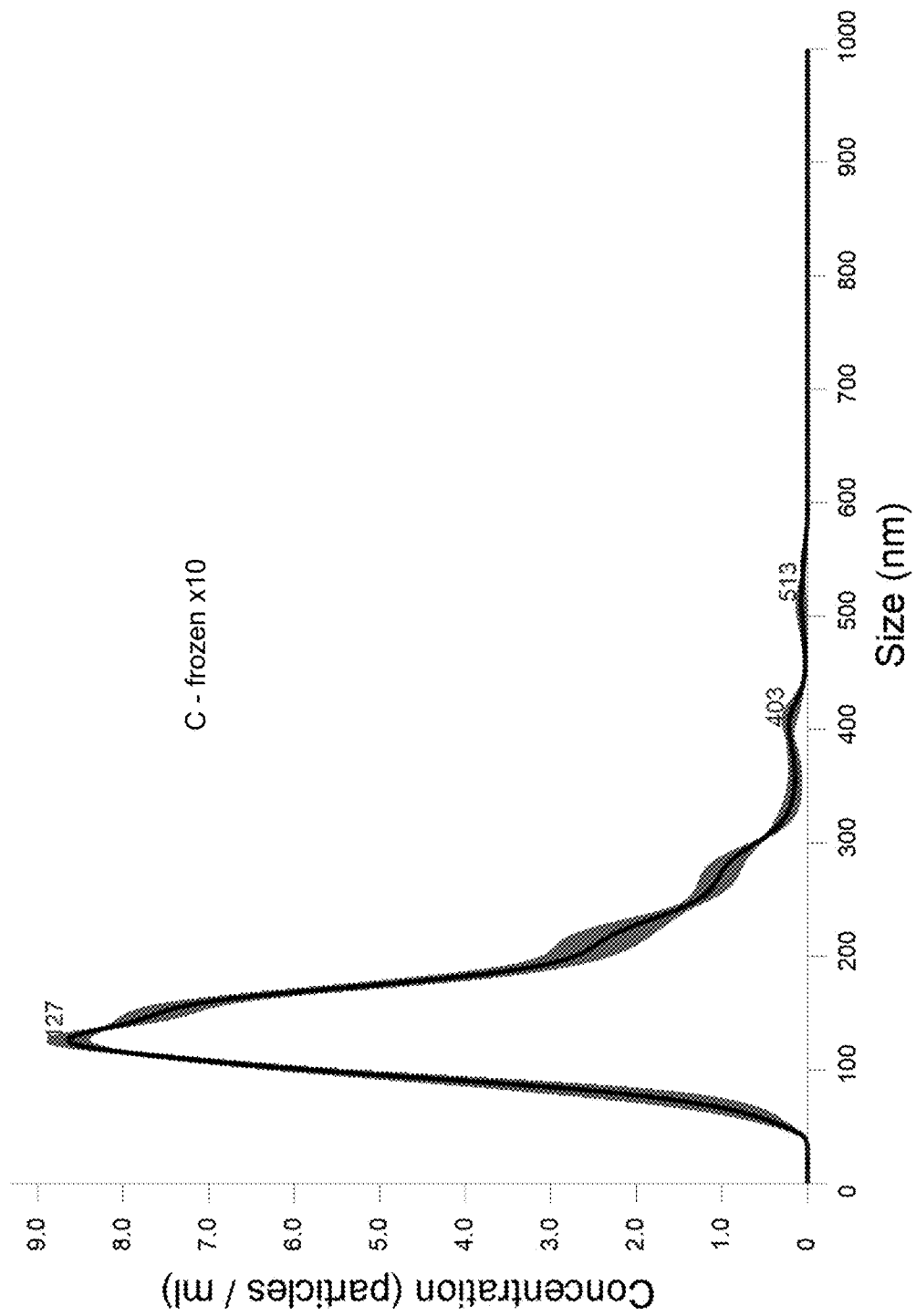
Figure 15C:
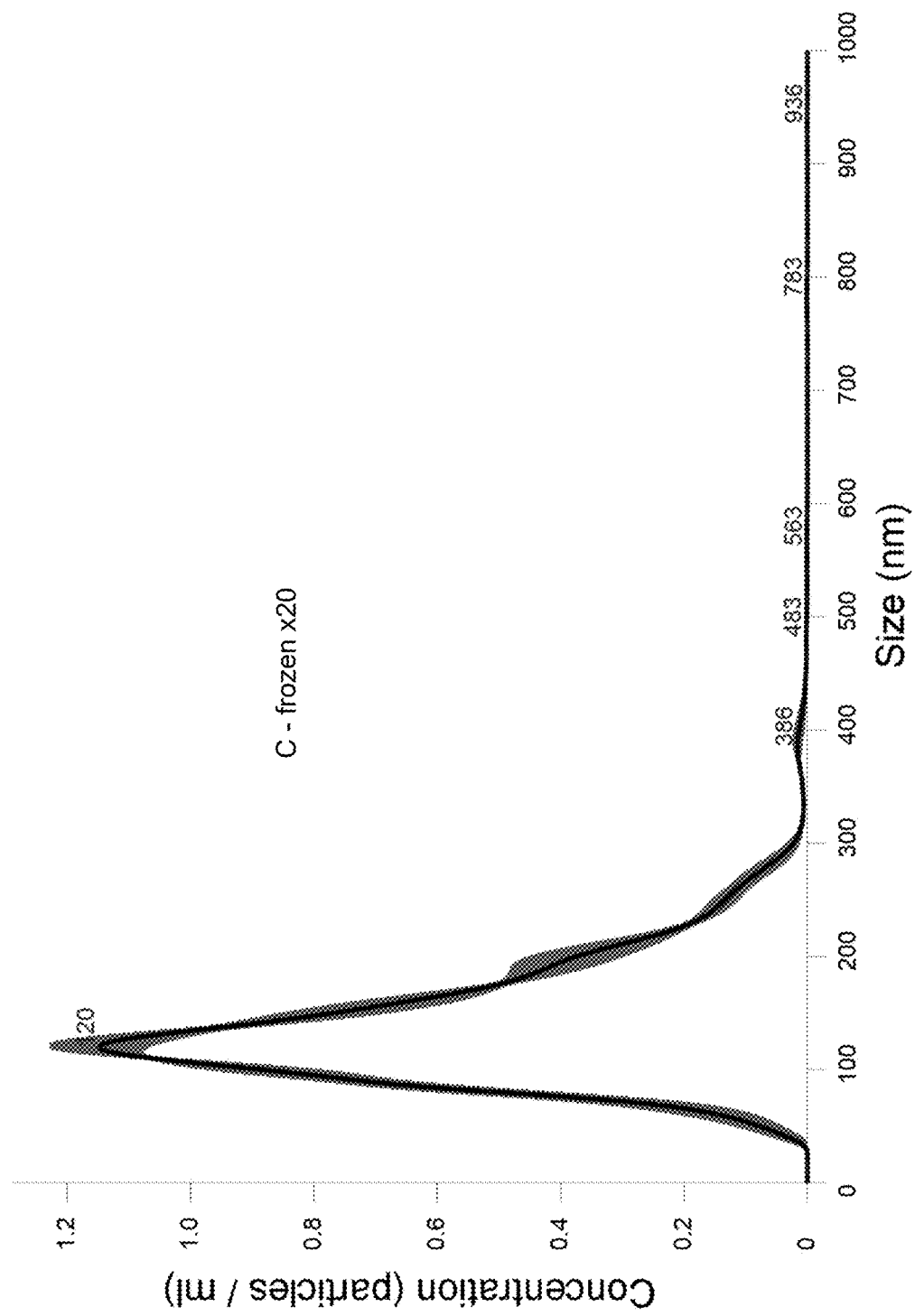
Figure 15D:
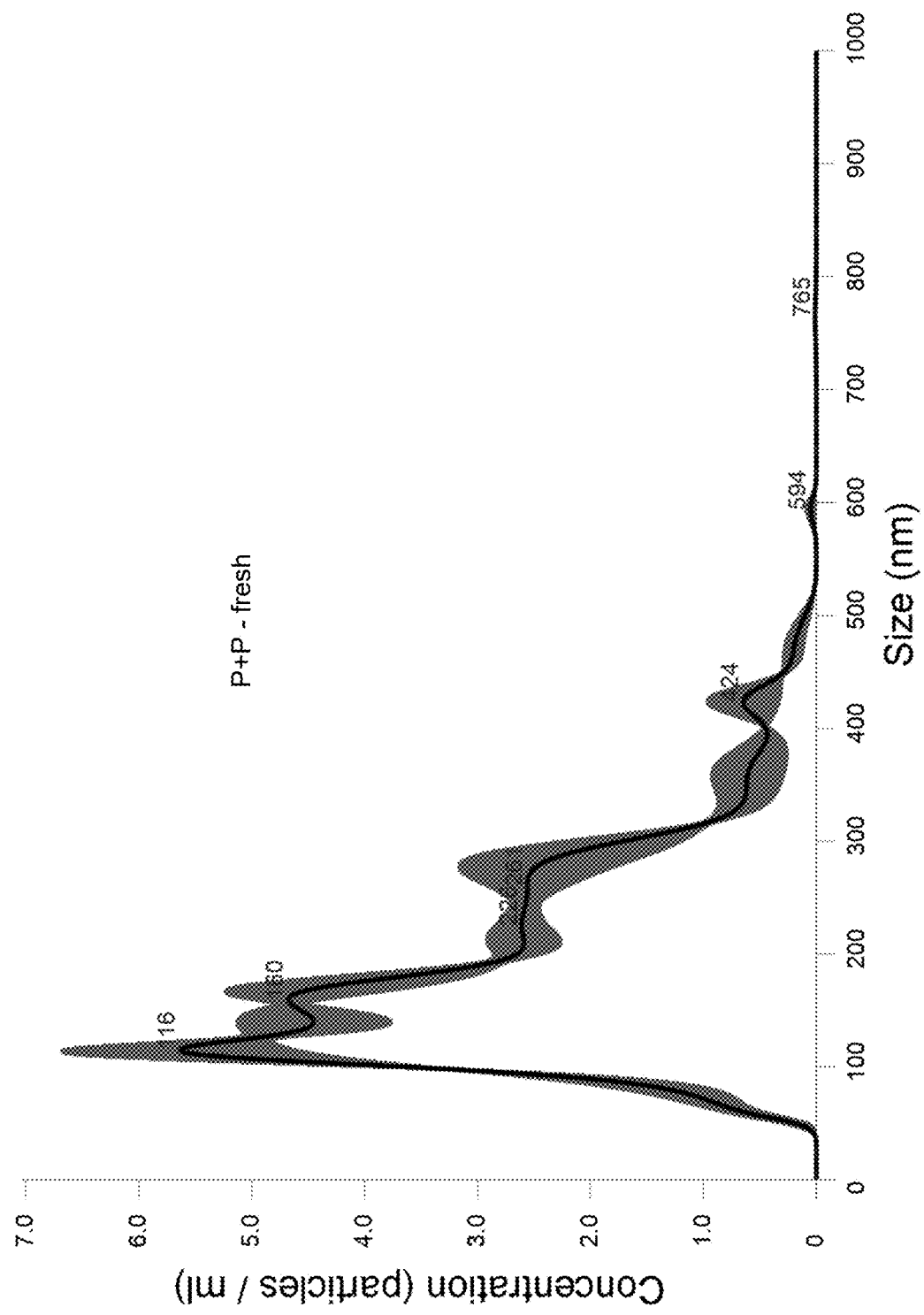
Figure 15E:
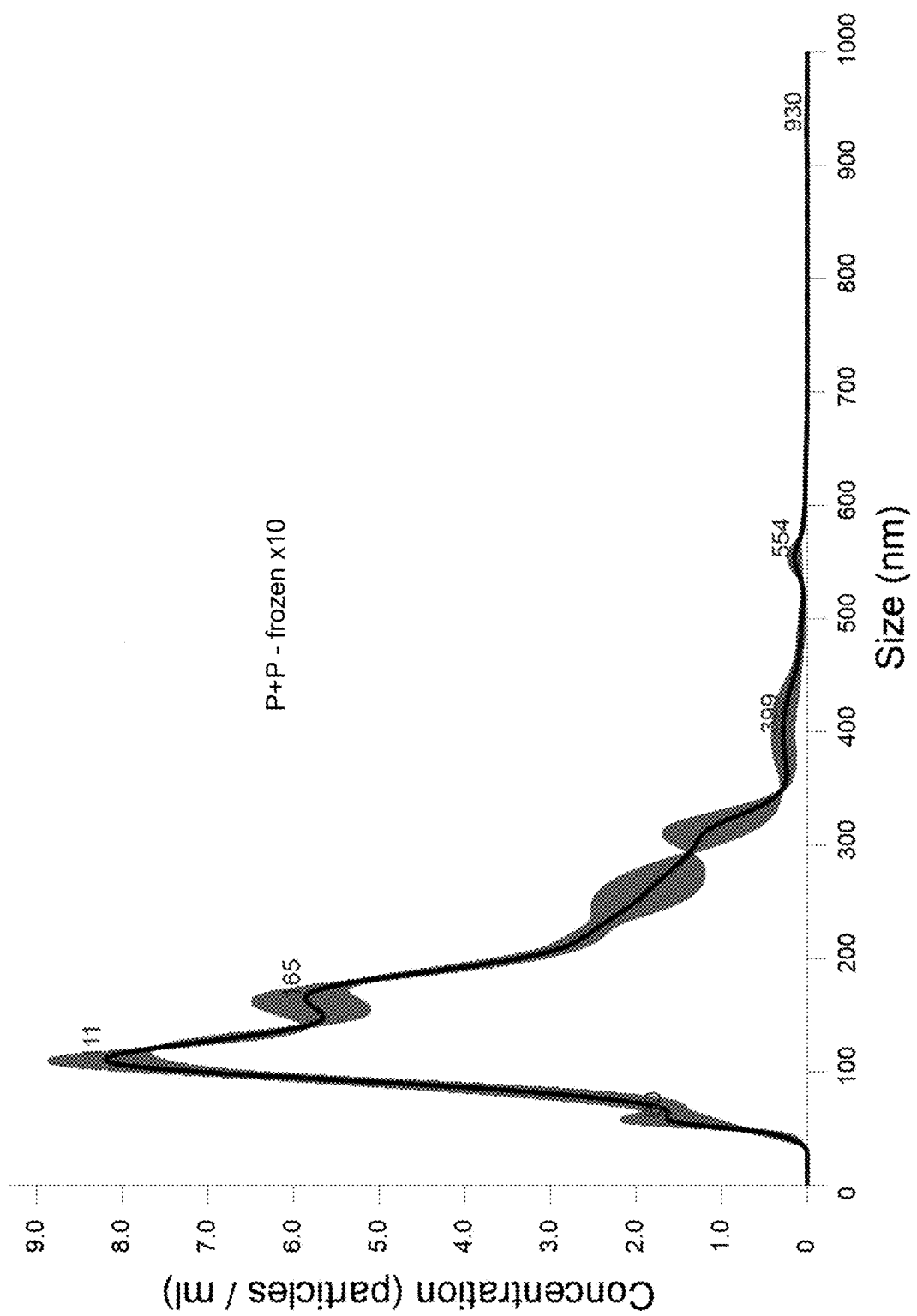
Figure 15F:
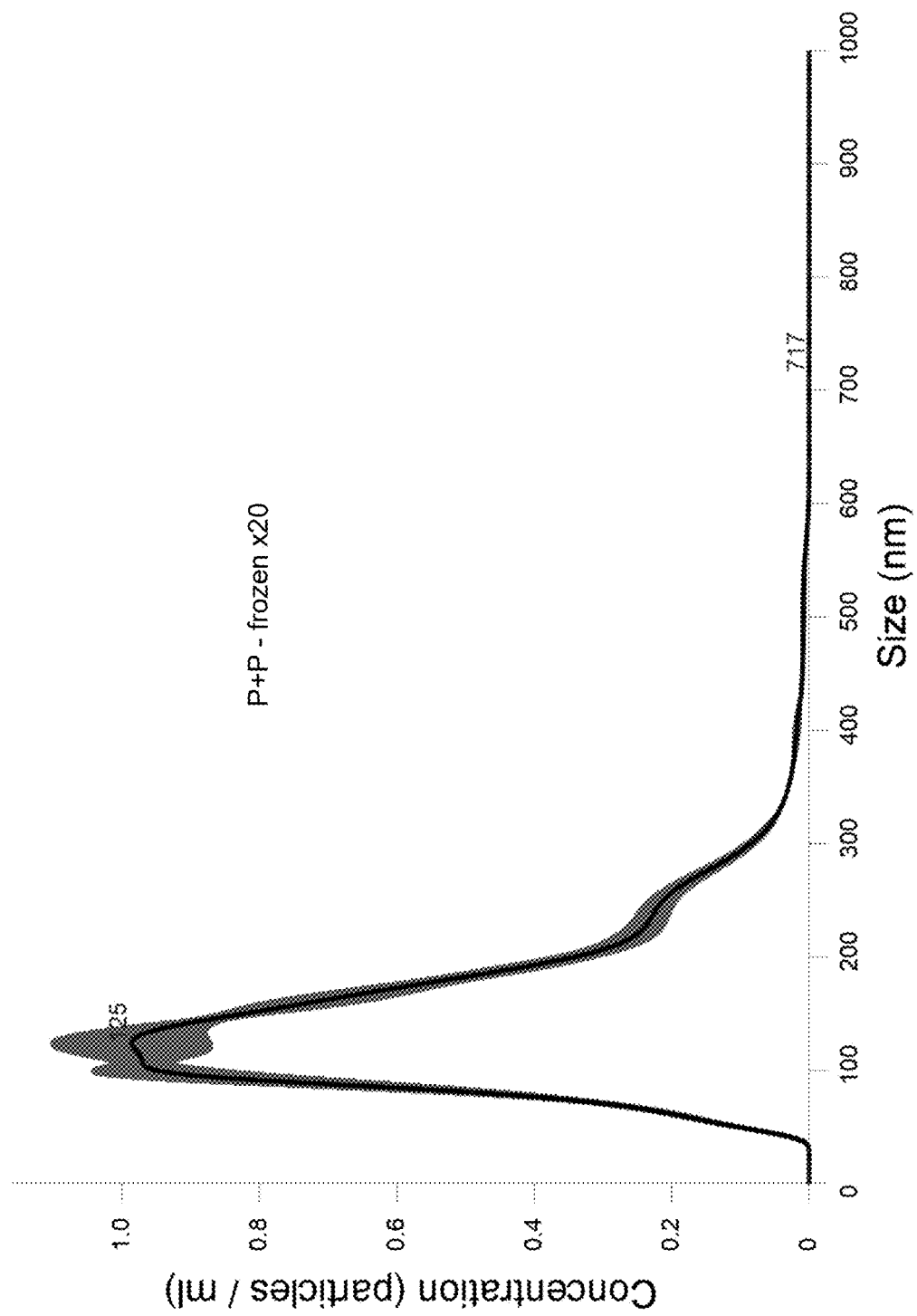
Figure 15G:
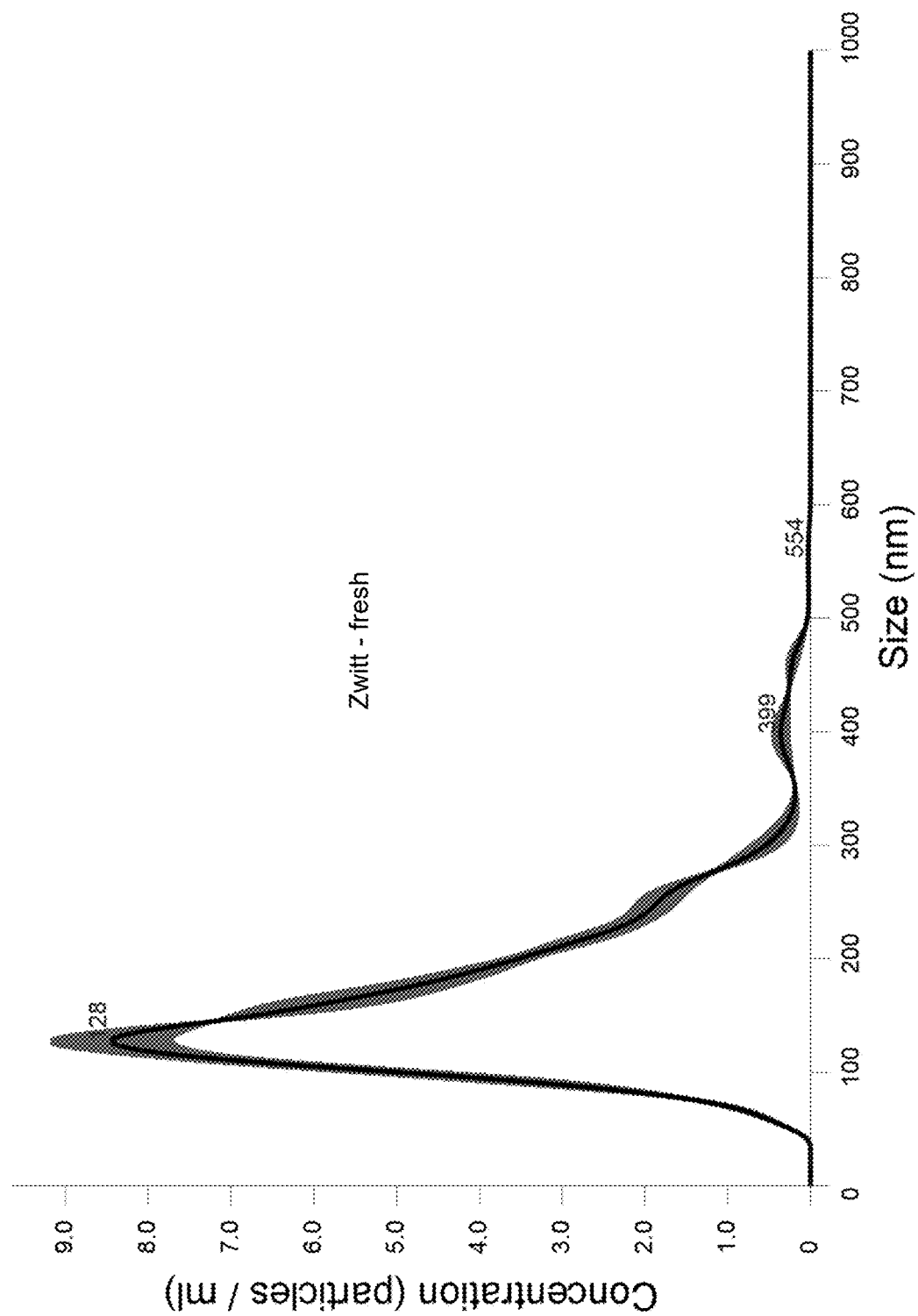
Figure 15H:
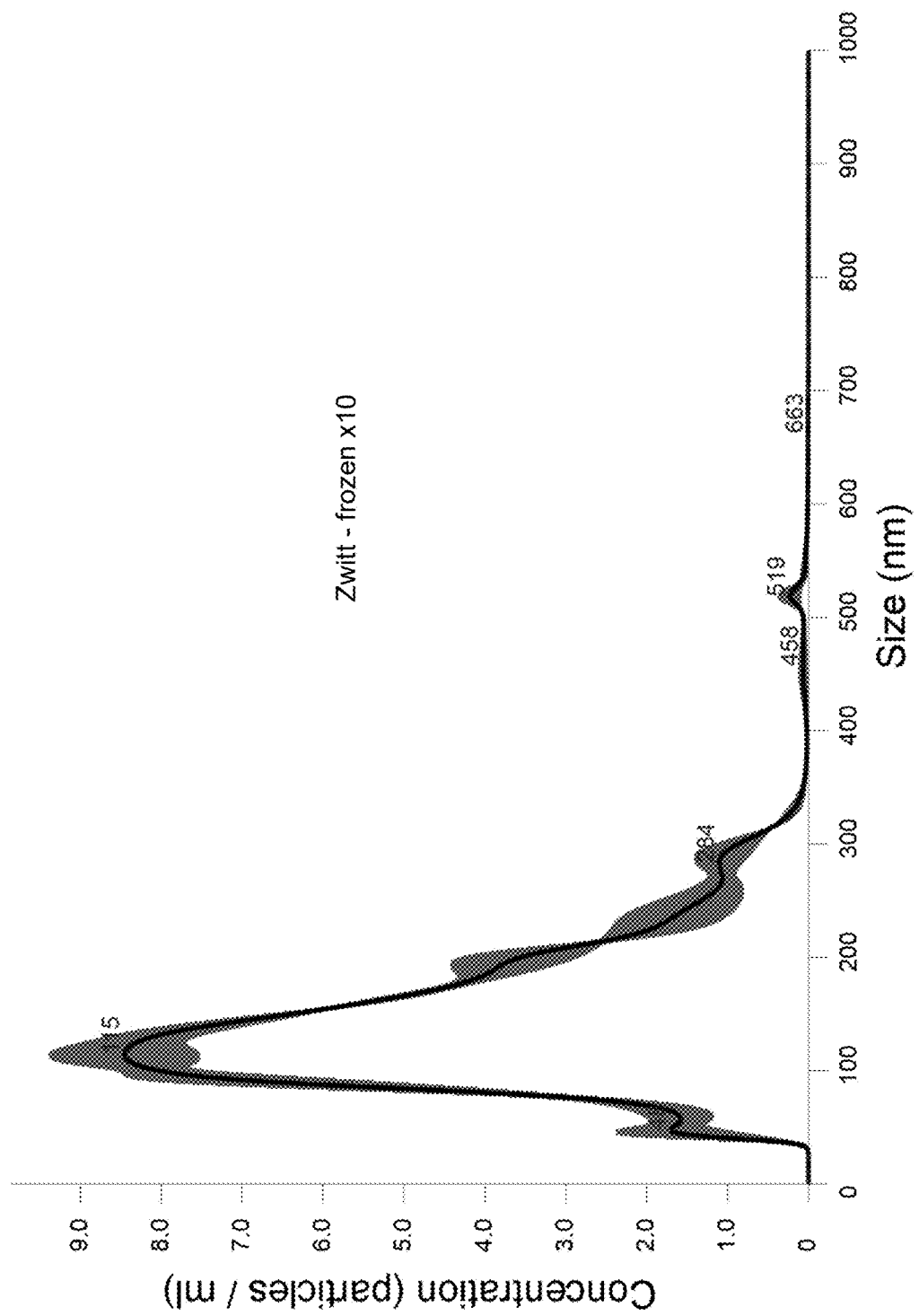
Figure 15I:
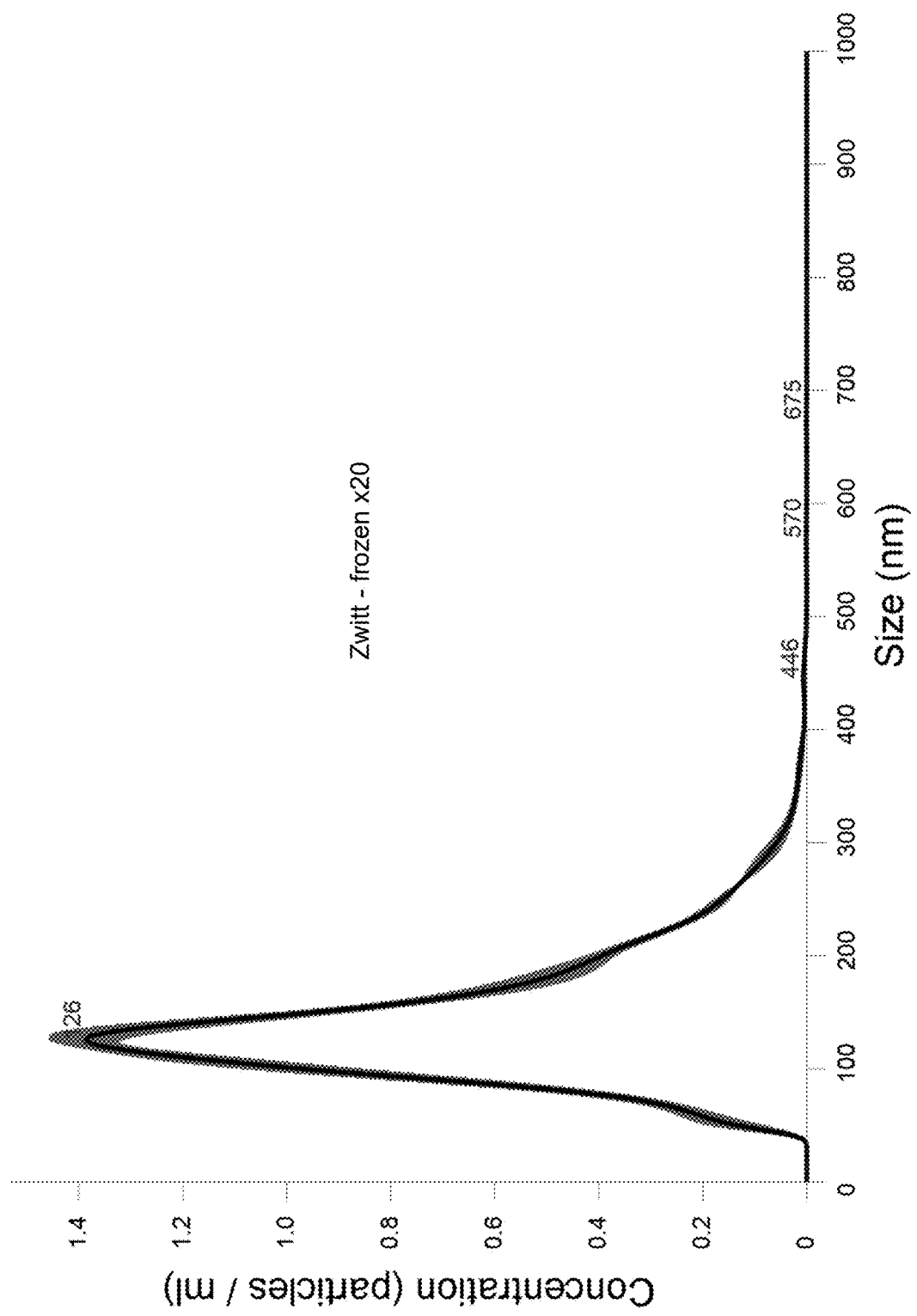

The coating of EVs by PEG46-b-PMAPTAC52 was confirmed by confocal microscopy (laser excitation at 488 nm, FITC channel) using a fluorescently labeled polymer PEG45-PMAPTAC51-1.79 mol % ALEXA FLUOR 488. The corresponding images are shown in FIGS. 12A-12C. The presence of fluorescent dots in FIG. 12A confirms the effective coating of EVs with the polymer PEG45-b-PMAPTAC51-1.79 mol % ALEXA FLUOR 488—no signal for EVs in the absence of polymer and no signal for polymer solution.

Example 14

Analysis of the Cryoprotective Effect of Polymers on the Stability of EV Samples Subjected to Multiple Cycles of Freezing and Thawing The influence of polymers on the integrity and phenotype of vesicle samples subjected to multiple freezing and thawing was tested. This is of particular importance in view of the necessity of frequent thawing of the same EV samples in laboratory practice. EV samples, after their isolation by ultracentrifugation, were mixed with polymers, and then frozen and thawed in 10-fold or 20-fold cycles. Measurement of the concentration and particle size distribution was performed with the NANOSIGHT NS300 system (MALVERN), using the nanoparticle tracking analysis (NTA) method. EVs samples coated with selected polymers were diluted appropriately with PBS in order to obtain a concentration range corresponding to the detection optimum of the NANOSIGHT system, and then measured.

Table 7 presents the names of the samples used in the further part of the study together with their description.

| Sample name | Sample description |
| --- | --- |
| Fresh C | EVs immediately after isolation, unfrozen |
| C frozen 10× | EVs frozen and thawed 10 times |
| C frozen 20× | EVs frozen and thawed 20 times |
| Fresh P + P | EVs with the addition of PEG46-b-PMAPTAC52 + PAMPS18, unfrozen |
| Fresh Zwitt | EVs with the addition of PMPC16, unfrozen |
| P + P frozen 10× | EVs with the addition of PEG46-b-PMAPTAC52 + PAMPS18, frozen and thawed 10 times |
| Zwitt frozen 10× | EVs with the addition of PMPC16, frozen and thawed 10 times |
| P + P frozen 20× | EVs with the addition of PEG46-b-PMAPTAC52 + PAMPS18, frozen and thawed 20 times |
| Zwitt frozen 20× | EVs with the addition of PMPC16, frozen and thawed 20 times |

The obtained results indicate that multiple freezing and thawing of the samples affects both the concentration of particles (FIG. 13) and causes a slight decrease in their size (FIG. 14, FIG. 15).

TABLE 8

Mode and median EVs diameters determined by the NTA method during the multiple freeze-thaw test. The table shows the values for each repetition of the experiment (numbers 1 or 2 next to the sample name).

| Sample name | Size mode (nm) | Median (nm) |
| --- | --- | --- |
| Fresh C 1 | 137.7 ± 4.9 | 151.6 ± 0.1 |
| Fresh C 2 | 138.0 ± 10.0 | 156.2 ± 2.3 |
| C 1 frozen 10× | 126.6 ± 0.5 | 146.0 ± 2.0 |
| C 2 frozen 10× | 106.1 ± 3.5 | 137.9 ± 3.7 |
| C 1 frozen 20× | 117.7 ± 1.9 | 133.7 ± 1.9 |
| C 2 frozen 20× | 109.8 ± 4.4 | 136.7 ± 1.2 |
| Fresh P + P 1 | 132.7 ± 10.5 | 176.6 ± 2.9 |
| Fresh P + P 2 | 142.0 ± 9.9 | 172.6 ± 4.2 |
| P + P 1 frozen 10× | 114.0 ± 4.9 | 153.2 ± 1.4 |
| P + P 2 frozen 10× | 114.0 ± 3.4 | 154.1 ± 4.7 |
| P + P 1 frozen 20× | 106.6 ± 7.5 | 140.8 ± 2.3 |
| P + P 2 frozen 20× | 125.9 ± 9.9 | 148.3 ± 1.1 |
| Fresh Zwitt 1 | 128.1 ± 0.6 | 151.8 ± 3.6 |
| Fresh Zwitt 2 | 124.4 ± 8.4 | 149.4 ± 0.8 |
| Zwitt 1 frozen 10× | 109.9 ± 9.1 | 137.3 ± 0.4 |
| Zwitt 2 frozen 10× | 117.0 ± 2.8 | 135.0 ± 1.7 |
| Zwitt 1 frozen 20× | 124.3 ± 3.3 | 135.4 ± 0.8 |
| Zwitt 2 frozen 20× | 132.0 ± 9.6 | 141.4 ± 1.5 |

Example 15

Analysis of an Effect of Polymers on the Integrity and Phenotype of EVs Subjected to Multiple Freeze-Thaw Cycles.

The influence of selected polymers on the integrity and phenotypic characteristics of particles in cryopreserved EVs preparations was investigated using an APOGEE A-50 MICRO FLOW cytometer (APOGEE FLOW SYSTEMS). The analysis was carried out on identical samples as in the case of measurements by the NTA analysis method (Table 7).

Individual samples were prepared according to an optimized protocol, by subjecting them to immunofluorescence staining with antibodies directed against the selected surface antigens. For this purpose, CD81 tetraspanin was chosen, which is a marker for EVs, as well as an antigen highly expressed on cells from which EVs were obtained (variable depending on the cell type, e.g. CD90 in the case of mesenchymal cells). Additionally, in order to investigate the influence of polymers on the integrity of EVs structure, samples were stained with RNA SELECT dye (THERMO FISHER SCIENTIFIC), which after penetration into undamaged EVs binds to RNA molecules, exhibiting green fluorescence. In order to correctly analyze and verify the specificity of the obtained results, a number of controls, including unstained and isotopically labeled controls were used in the cytometric analysis.

Figure 16:
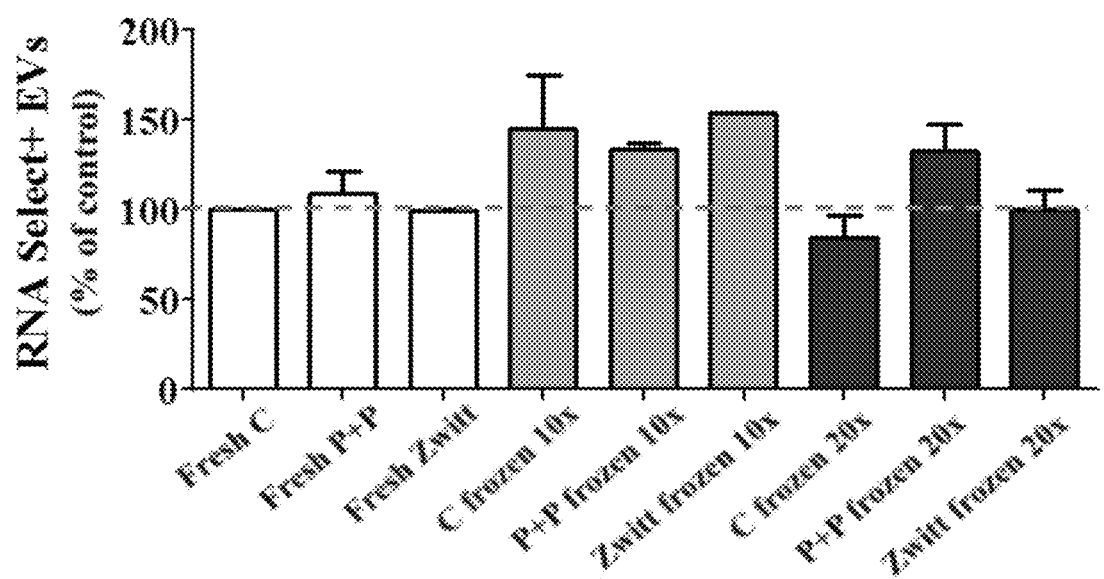
FIG. 16 shows a cytometric analysis of the influence of selected polymers on particle integrity in cryopreserved EV samples after multiple freeze-thaw cycles, using the EVs secreted by UC-MSCs cells as an example. The samples were subjected to immunofluorescence staining with RNA SELECT dye as an indicator of EVs integrity. Cumulative results of the analysis of the percentage of RNA SELECT-positive particles in each type of sample are given. The data on the graph (mean±SD; N=2) are presented as % of control (Fresh C sample—uncoated EVs, no freezing). Gray dotted line indicates the level of the control (100%). The names of individual samples refer to the description in Table 7.
Figure 25:
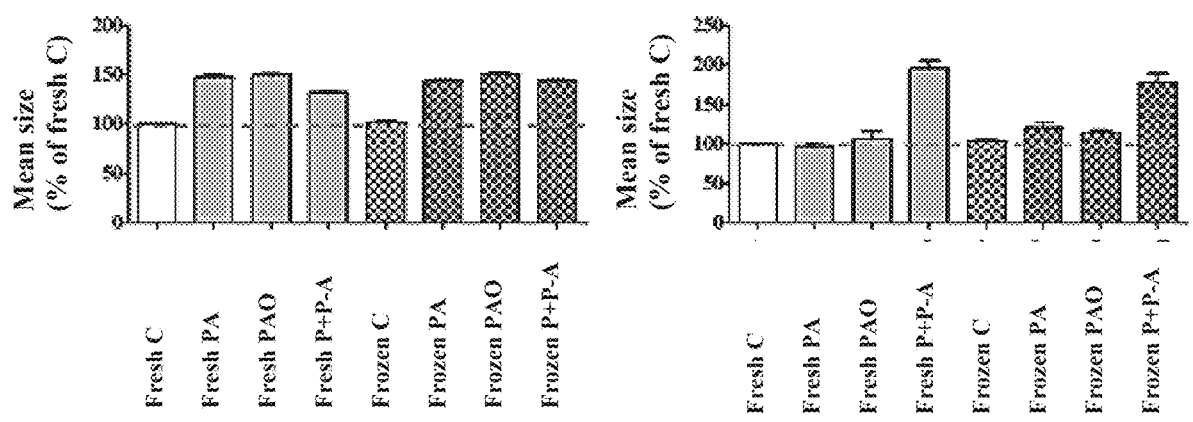
FIG. 25 shows an NTA analysis of the influence of selected polymers on particle size distribution in the samples of EVs secreted by human cells, on the example of hiPS cells. The data on the graphs (mean±SD) are presented as % of control (Fresh C sample—uncoated EVs, no freezing). Gray dotted line indicates the level of the control (100%). The results for two statistical parameters are presented, including the mean size (A) and the size mode (the value with the highest probability of occurrence; B). The names of individual samples refer to the description in Table 9.

As with the results of the NTA analysis, changes in the signal level from RNA SELECT-were observed (FIG. 16). At the same time, the protective effect of the tested polymers against EVs formulations was observed.

A cytometric analysis of the influence of selected polymers on the phenotype of particles was performed on EV samples subjected to multiple freeze-thaw cycles, using the EVs secreted by UC-MSCs cells (FIG. 17). Samples were subjected into immunofluorescence staining with antibodies directed against selected surface antigens typical of EVs (CD81) and mesenchymal cells (CD90). The cumulative results of the analysis of the percentage of antigen-positive particles in individual types of samples indicate that the coating of EVs with ultra-thin polymer layers does not adversely affect the biological properties of the EV surface, in particular does not reduce the level of CD81 and CD90 surface antigens. The tenfold freeze and thaw EVs cycle has no significant effect on CD81 and CD90 levels. Freezing and thawing twenty times leads to a decrease in CD81 and CD90 levels, but this effect is considerably lower for CD90. The effect of the coating with polymers is slight, although generally positive.

Example 16 the Study of the Influence of Polymers on the Size of EVs Subjected to Single Freezing Using the NTA Technique.

The influence of polymers (PEG46-b-PMAPTAC52, DEX, PEG46-b-PMAPTAC52+PAMPS18, PMPC16, PVA-graft-PAPTAC, PVA-graft-PAPTAC-Oct, PEG46-b-PMAPTAC52+poly(AMPS/AmU)) on EVs sizes (description of samples is presented in Table 9) was studied. The obtained results indicate that the freezing process influences the concentration and size distribution of particles in EV samples secreted by human and animal cells (FIGS. 18-25). At the same time, the cryoprotective effect of the polymers used on EVs is observed, and it varies depending on the type of parental cells secreting EVs. Thus, in the context of optimal cryopreservation, the key factor is the selection of the appropriate type of polymer to the type of frozen EVs, that are obtained from conditioned media from the culture of various types of cells or from other physiological fluids.

TABLE 9

Description of EV samples containing polymers, subjected to single freezing, analyzed using the NTA method.

| Sample name | Sample description |
| --- | --- |
| Fresh C | EVs immediately after isolation, unfrozen |
| Fresh PEG | EVs with the addition of PEG46-b-PMAPTAC52, unfrozen |
| Fresh DEX | EVs with the addition of cationic dextran (DEX), unfrozen |
| Fresh P + P | EVs with the addition of PEG46-b-PMAPTAC52 + PAMPS18, unfrozen |

TABLE 9-continued

Description of EV samples containing polymers, subjected to single freezing, analyzed using the NTA method.

| Sample name | Sample description |
| --- | --- |
| Fresh Zwitt | EVs with the addition of PMPC16, unfrozen |
| Frozen K | EVs frozen and thawed once |
| Frozen PEG | EVs with the addition of PEG46-b-PMAPTAC52, frozen and thawed once |
| Frozen DEX | EVs with the addition of cationic dextran(DEX), frozen and thawed once |
| Frozen P + P | EVs with the addition of PEG46-b-PMAPTAC52 + PAMPS18, frozen and thawed once |
| Frozen Zwitt | EVs with the addition of PMPC16, frozen and thawed once |
| Fresh PA | EVs with the addition of PVA-graft-PAPTAC, unfrozen |
| Fresh PAO | EVs with the addition of PVA-graft-PAPTAC-Oct, unfrozen |
| Fresh P + P-A | EVs with the addition of PEG46-b-PMAPTAC52 + poli(AMPS/AmU) |
| Frozen PA | EVs with the addition of PVA-graft-PAPTAC, frozen and thawed once |
| Frozen PAO | EVs with the addition of PVA-graft-PAPTAC-Oct, frozen and thawed once |
| Frozen P + P-A | EVs with the addition of PEG46-PMAPTAC52 + poli(AMPS/AmU), frozen and thawed once |

Example 17

Analysis of the Influence of Polymers on the Integrity and Phenotype of EVs.

The influence of selected polymers on the integrity and phenotypic characteristics of particles in cryopreserved EV preparations was investigated using an APOGEE A-50 MICRO FLOW cytometer (APOGEE FLOW SYSTEMS). The analysis was carried out on the same types of samples as in the case of measurements by the NTA analysis method (Table 9).

Individual samples were prepared according to an optimized protocol, by subjecting them to immunofluorescence staining with antibodies directed against the selected surface antigens. For this purpose, CD81 tetraspanin was chosen, which is a marker for EVs, as well as an antigen highly expressed on cells from which EVs are obtained (variable depending on the cell type, e.g. CD90 in the case of mesenchymal cells). Additionally, in order to investigate the influence of polymers on the integrity of EVs structure, samples were stained with RNA SELECT dye (THERMO FISHER SCIENTIFIC), which after penetration into undamaged EVs binds to RNA molecules, emitting green fluorescence. In order to correctly analyze and verify the specificity of the obtained results, a number of controls were used in the cytometric analysis, including unstained and isotopically-labeled controls, analogically to the previous analyses.

The analysis of the obtained results shows that the cryopreservation of the samples results in a higher percentage of RNA SELECT-positive objects, as compared to the unfrozen samples. This may indicate that the freeze-thaw procedure disintegrates non-vesicular objects (including debris) that are not stained with RNA SELECT. Thus, degradation of these objects increases the percentage of RNA SELECT-positive vesicles in the sample.

Figure 26:
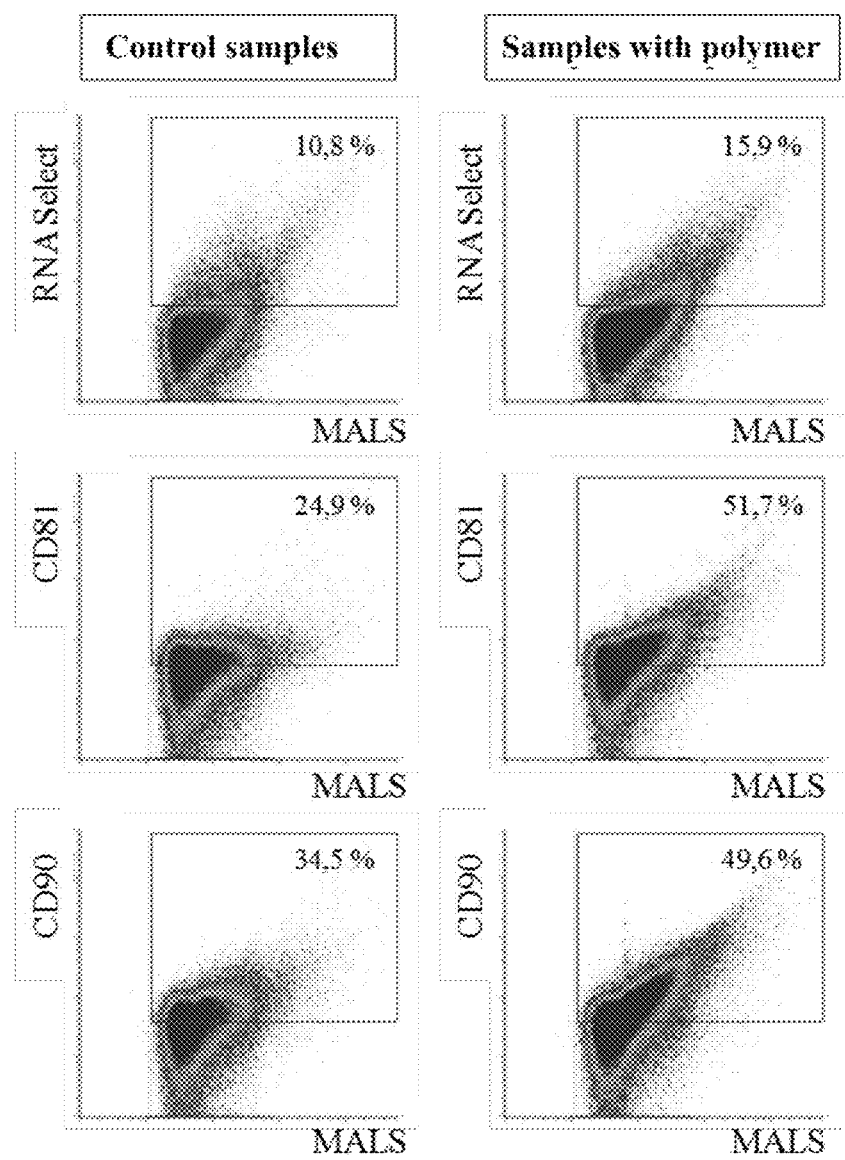
FIG. 26 shows a cytometric analysis of the influence of PEG46-b-PMAPTAC52 on the integrity and phenotype of particles in cryopreserved samples of EVs secreted by UC-MSCs cells. The samples were subjected to immunofluorescence staining with antibodies directed against selected surface antigens typical of EVs (CD81) and mesenchymal cells (CD90), and with RNA SELECT dye as an indicator of EVs integrity. Representative dot plots for control samples and samples containing a polymer after freeze-thaw cycle in fluorescence detection channels versus MALS light scattering parameter, proportional to particle size are shown. The given percentages correspond to the percentage of objects in the areas marked with gray rectangles (gates), in relation to all particles present in the given graph.

Importantly, the addition of polymer to cryopreserved EV samples significantly improves the stability of EVs. This is particularly evidenced by the fact that after sample thawing the percentage of particles positive for the RNA SELECT dye, as an indicator of the structural integrity of EVs, is higher in the samples with the polymer, compared to the control samples (FIG. 26). Similarly, the increase in the percentage of CD81+ and CD90+objects after thawing is also much higher in the polymer samples compared to the control samples (FIG. 26). Thus, the polymer stabilizes EVs while promoting the disintegration of contaminating objects (e.g. protein aggregates).

Similarly, a cryoprotective effect was obtained for a number of tested polymers in the case of freezing both human (FIGS. 27, 28, 30 and 31) and animal (FIGS. 29 and 32) EVs.

Example 18

Analysis of the Influence of Polymers on the Functional Properties of EVs

Cryopreservation is one of the key steps in protecting EV formulations for their subsequent use, both in basic research and in biomedical applications. Many experimental systems have demonstrated the effect of EVs secreted by stem cells on selected in vitro functions of target cells. Therefore, the influence of EV cryopreservation with the use of selected polymers, on the functional effectiveness of these EVs on target cells was investigated, using human osteoblasts (HOB) as exemplary target cells. For this purpose, the polymer coated EVs and the control EVs (without polymers) were added to the HOB cell culture at an optimized dose. Both EVs from umbilical cord mesenchymal cells (UC-MSCs) and those isolated from adipose tissue (AT-MSCs) were tested. Both freshly isolated as well as cryopreserved EVs were tested. The influence of the vesicles on the proliferation, viability and metabolic activity of HOB cells was then analyzed at appropriate time points.

Measurement of proliferation was performed 24 and 48 hours after addition of EVs to the cells, using a commercial CELL COUNTING KIT 8 (SIGMA ALDRICH).

The obtained results show that the addition of polymers does not reduce the functional efficiency of EVs in the context of their influence on the proliferation of target cells (FIG. 33). Additionally, in the case of EVs isolated from AT-MSCs cells, cryopreservation using selected polymers increased the positive effect of these vesicles on the proliferation of HOB cells.

In the next step, the influence of the addition of EVs cryopreserved with polymers on the viability of target cells was also investigated using the example of HOB cells. For this purpose, their viability was measured at selected time points after the addition of EVs to the cells (4, 24, 48 hours), using the CASPASE-GLO 3/7 kit (PROMEGA).

The obtained results indicate that coating of EVs with polymers does not adversely affect the viability of target cells, and may even slightly increase the effectiveness of those EVs (FIG. 34).

Similar results were obtained by measuring the metabolic activity of the target cells, measured using the ATPLITE kit (PERKIN ELMER) 4 hours after the addition of EVs to the medium. Similarly, the presence of the polymers improved the functional effect of EVs on the metabolic activity of HOB cells (FIG. 35).

In the next stage of the research, the influence of EVs cryopreservation with selected polymers on their cytoprotective properties was also analyzed. For this purpose, target cells (HOB) were treated with staurosporine as an apoptosis inducer for 4 hours at a dose of 1 μM. Then, control EVs or those containing the polymers were added to the cells, both immediately after their isolation and after freezing. After another 4 hours of incubation, cell viability was measured using the CASPASE-GLO 3/7 kit. The obtained results indicate that coating of EVs with selected polymers improves the cytoprotective effect of EVs (FIG. 36).

Example 19

Investigation of the Influence of Polymers on the Size Distribution of EVs Subjected to Long-Term Freezing, Using the NTA Technique.

The influence of selected polymers (PEG46-b-PMAP-TAC52+PAMPS18 and PMPC16) on the size distribution of EVs subjected to long-term cryopreservation was investigated. Both unfrozen and frozen samples were analyzed, and then thawed at one-month intervals (the description of the samples is presented in Table 10).

TABLE 10

Description of EV samples subjected to the evaluation of long-term cryopreservation with selected polymers.

| Sample name | Sample description |
| --- | --- |
| Fresh | EVs immediately after isolation (without freezing) |
| 1 m | EVs frozen once and then thawed after 1 month |
| 2 m | EVs frozen once and then thawed after 2 months |
| 3 m | EVs frozen once and then thawed after 3 months |
| C | EVs without added polymer |
| P + P | EVs with the addition of PEG46-b-PMAPTAC52 + PAMPS18 |
| Zwitt | EVs with the addition of PMPC16 |

The obtained results indicate that the long-term freezing process did not cause significant changes in particle size, except for the samples containing PEG46-b-PMAPTAC52+PAMPS18, where the mean particle size was larger than the control at each of the tested time points (FIG. 37).

Example 20

Analysis of the Influence of Polymers on the Integrity and Phenotype of EVs Subjected to Long-Term Freezing.

The influence of selected polymers on the integrity and phenotypic characteristics of particles in long-term cryopreserved EV formulations was investigated using an APOGEE A-50 MICRO FLOW cytometer (APOGEE FLOW SYSTEMS). The analysis was carried out on the same types of samples as in the case of measurements using the NTA analysis method (Table 10).

Samples were prepared according to an optimized protocol, by subjecting them to immunofluorescence staining with antibodies directed against selected surface antigens: CD81 and CD90. Additionally, in order to investigate the influence of polymers on EVs structural integrity, samples were stained with RNA SELECT dye.

The analysis of the obtained results shows that the freezing of the samples resulted in a higher percentage of RNA SELECT-positive objects when compared to the unfrozen samples (FIG. 38). As with previous experiments, this result may indicate that the freeze-thaw procedure disintegrates non-vesicular objects (including debris), thereby increasing the percentage of RNA SELECT-positive objects in the sample. Importantly, the addition of the tested polymers to EVs samples subjected to long-term cryopreservation significantly improves the stability of EVs, as evidenced by the higher percentage of RNA SELECT+ objects in the polymer samples, in particular PEG46-b-PMAPTAC52+PAMPS18, compared to the control samples (FIG. 38).

Likewise, the addition of polymers does not impair the availability of surface markers on EVs. Moreover, coating of EVs with the PEG46-b-PMAPTAC52+PAMPS18 polymers causes an increase in the percentage of CD81-positive and CD90-positive targets after thawing of samples subjected to long-term cryopreservation, which also proves the EV stabilizing properties of the tested polymers (FIG. 39).

Example 21

Analysis of the Influence of Polymers on the Functional Properties of EVs Subjected to Long-Term Cryopreservation.

The influence of selected polymers on the functional properties of EVs subjected to long-term freezing was investigated. For this purpose, the functional effectiveness of these EVs on target cells was tested, using human osteoblasts (HOB) as exemplary target cells. Changes in the metabolic activity of HOB cells after their incubation with EV formulations were analyzed.

UC-MSCs-derived EVs coated with polymers and control EVs (without polymers) were added to the HOB cell culture at an optimized dose. Both unfrozen EVs and vesicles subjected to long-term freezing were tested (the description of the analyzed samples is given in Table 10). Then, 4 hours after the addition of EVs, the metabolic activity of HOB cells was analyzed using the ATPLITE kit (PERKIN ELMER).

The obtained results show that the addition of polymers improves the functional properties of unfrozen EVs. At the same time, the presence of polymers does not affect the influence of frozen vesicles on the metabolic activity of target cells (FIG. 40).

LITERATURE

1. Paolicelli, R. C.; Bergamini, G.; Rajendran, L. Cell-to-cell Communication by Extracellular Vesicles: Focus on Microglia. Neuroscience 2019, 405, 148-157, doi:https://doi.org/10.1016/j.neuroscience.2018.04.003.
2. El-Andaloussi, S.; Lee, Y.; Lakhal-Littleton, S.; Li, J.; Seow, Y.; Gardiner, C.; Alvarez-Erviti, L.; Sargent, I. L.; Wood, M. J. A. Exosome-mediated delivery of siRNA in vitro and in vivo. Nat. Protoc. 2012, 7, 2112.
3. van den Boom, J. G.; Schlee, M.; Coch, C.; Hartmann, G. SiRNA delivery with exosome nanoparticles. Nat. Biotechnol. 2011, 29, 325.
4. Sun, D.; Zhuang, X.; Xiang, X.; Liu, Y.; Zhang, S.; Liu, C.; Barnes, S.; Grizzle, W.; Miller, D.; Zhang, H.-G. A Novel Nanoparticle Drug Delivery System: The Anti-inflammatory Activity of Curcumin Is Enhanced When Encapsulated in Exosomes. Mol. Ther. 2010, 18, 1606-1614, doi:https://doi.org/10.1038/mt.2010.105.
5. Munagala, R.; Agil, F.; Jeyabalan, J.; Gupta, R. C. Bovine milk-derived exosomes for drug delivery. Cancer Lett. 2016, 371, 48-61, doi:10.1016/j.canlet.2015.10.020.
6. Almizraq, R. J.; Seghatchian, J.; Holovati, J. L.; Acker, J. P. Extracellular vesicle characteristics in stored red blood cell concentrates are influenced by the method of detection. Transfus. Apher. Sci. 2017.
7. Kusuma, G. D.; Barabadi, M.; Tan, J. L.; Morton, D. A. V; Frith, J. E.; Lim, R. To Protect and to Preserve: Novel Preservation Strategies for Extracellular Vesicles. Front. Pharmacol. 2018, 9, 1199, doi:10.3389/fphar.2018.01199.
8. Roura, S.; Vives, J. Extracellular vesicles: Squeezing every drop of regenerative potential of umbilical cord blood. Metabolism2019, 95, 102-104, doi:https://doi.org/10.1016/j.metabol.2019.02.006.
9. Sokolova, V.; Ludwig, A.-K.; Hornung, S.; Rotan, O.; Horn, P. A.; Epple, M.; Giebel, B. Characterisation of exosomes derived from human cells by nanoparticle tracking analysis and scanning electron microscopy. Colloids Surfaces B Biointerfaces2011, 87, 146-150, doi:https://doi.org/10.1016/j.colsurfb.2011.05.013.
10. Maroto, R.; Zhao, Y.; Jamaluddin, M.; Popov, V. L.; Wang, H.; Kalubowilage, M.; Zhang, Y.; Luisi, J.; Sun, H.; Culbertson, C. T.; Bossmann, S. H.; Motamedi, M.; Brasier, A. R. Effects of storage temperature on airway exosome integrity for diagnostic and functional analyses. J. Extracell. Vesicles2017, 6, 1359478, doi: 10.1080/20013078.2017.1359478.
11. Lőrincz, Á. M.; Timár, C. I.; Marosvári, K. A.; Veres, D. S.; Otrokocsi, L.; Kittel, Á.; Ligeti, E. Effect of storage on physical and functional properties of extracellular vesicles derived from neutrophilic granulocytes. J. Extracell. vesicles2014, 3, 25465, doi:10.3402/jev.v3.25465.
12. Welch, J. L.; Madison, M. N.; Margolick, J. B.; Galvin, S.; Gupta, P.; Martinez-Maza, O.; Dash, C.; Okeoma, C. M. Effect of prolonged freezing of semen on exosome recovery and biologic activity. Sci. Rep.2017, 7, 45034.
13. Bosch, S.; De Beaurepaire, L.; Allard, M.; Mosser, M.; Heichette, C.; Chrétien, D.; Jegou, D.; Bach, J.-M. Trehalose prevents aggregation of exosomes and cryodamage. Sci. Rep.2016, 6, doi:10.1038/srep36162.
14. Tegegn, T. Z.; De Paoli, S. H.; Orecna, M.; Elhelu, O. K.; Woodle, S. A.; Tarandovskiy, I. D.; Ovanesov, M. V; Simak, J. Characterization of procoagulant extracellular vesicles and platelet membrane disintegration in DMSO-cryopreserved platelets. J. Extracell. vesicles2016, 5, 30422, doi:10.3402/jev.v5.30422.
15. Yusa, S.-I.; Fukuda, K.; Yamamoto, T.; Ishihara, K.; Morishima, Y. Synthesis of well-defined amphiphilic block copolymers having phospholipid polymer sequences as a novel biocompatible polymer micelle reagent. Biomacromolecules 2005, 6, 663-670, doi: 10.1021/bm0495553.
16. Bhuchar, N.; Deng, Z.; Ishihara, K.; Narain, R. Detailed study of the reversible addition-fragmentation chain transfer polymerization and co-polymerization of 2-methacryloyloxyethyl phosphorylcholine. Polym. Chem. 2011, 2, 632-639, doi:10.1039/COPY00300J.
17. Mitsukami, Y.; Donovan, M. S.; Lowe, A. B.; McCormick, C. L. Water-soluble polymers. 81. Direct synthesis of hydrophilic styrenic-based homopolymers and block copolymers in aqueous solution via RAFT. Macromolecules 2001, 34, 2248-2256, doi:10.1021/ma0018087.
18. Yusa, S.-I.; Yokoyama, Y.; Morishima, Y. Synthesis of oppositely charged block copolymers of polyethylene glycol via reversible addition-fragmentation chain transfer radical polymerization and characterization of their polyion complex micelles in water. Macromolecules 2009, 42, 376-383, doi:10.1021/ma8021162.

The invention claimed is:

1. A method of cryopreservation of extracellular vesicles comprising the following steps:
   a) isolating extracellular vesicles;
   b) coating with a layer of a first polyelectrolyte, wherein the first polyelectrolyte is a block copolymer selected from copolymers represented by the general formulas:

$PEG_x$-b-$PMAPTAC_y$, wherein PEG is polyethylene qlycol and PMAPTAC is poly((3-(methacryloylamino)propyl)trimethylammonium chloride), x and y are degrees of polymerization in the range from 10 to 45 and from 5 to 102, respectively; and "b" denotes "block";
   c) coating with a layer of a second polyelectrolyte, wherein the second polyelectrolyte is an anionic homopolymer selected from polymers represented by the general formula:

$PAMPS_x$ wherein PAMPS is poly(2-acrylamido-2-methyl-1-propanesulfonic acid and x is a degree of polymerization ranging from 15 to 150; and
   d) freezing of the vesicles coated with the first and second layers of polyelectrolyte.

2. The method of claim 1, wherein the extracellular vesicles are secreted by human and/or animal cells.

3. The method of claim 1, wherein the first polyelectrolyte is $PEG_{46}$-b-$PMAPTAC_{52}$.

4. The method of claim 1, wherein the second polyelectrolyte is $PAMPS_{18}$.

5. The method of claim 3, wherein the second polyelectrolyte is $PAMPS_{18}$.

* * * * *